United States Patent [19]
Hogan et al.

[11] Patent Number: 5,414,809
[45] Date of Patent: May 9, 1995

[54] GRAPHICAL DISPLAY OF DATA

[75] Inventors: Patrick M. Hogan; Rhonda L. Alexander; Lars Greninger; Lloyd J. Arrow, all of Austin, Tex.

[73] Assignee: Texas Instruments Incorporated, Dallas, Tex.

[21] Appl. No.: 56,703

[22] Filed: Apr. 30, 1993

[51] Int. Cl.⁶ ............................................. G06F 15/62
[52] U.S. Cl. .................................................... 395/155
[58] Field of Search ............... 395/155, 161, 140, 141, 395/142; 345/118, 125

[56] References Cited

U.S. PATENT DOCUMENTS 5,257,349 10/1993 Alexander ........................ 395/159
5,289,568 2/1994 Hosoya et al. .................... 395/135
5,307,086 4/1994 Griffin et al. ..................... 395/146

Primary Examiner—Phu K. Nguyen
Attorney, Agent, or Firm—Robert L. Troike; Richard L. Donaldson

[57] ABSTRACT

A method of using a computer system 20 to implement a graphical interface 10. The method displays a graph 160 of data from a database system 11, and permits a user to change the data by changing the appearance of the graph 160. The graph 160 is generated from a stored graphics engine 12, which contains rules for generating graphical objects comprising the graph and the objects' attributes. The graphical objects and attributes are matched to data delivered from the database system 11. If the user manipulates a graphical object, the graphical interface 10 associates the change to a new data value, and updates both the graph 160 / and the data in the database system 11.

20 Claims, 11 Drawing Sheets

GRAPHICAL DISPLAY OF DATA

TECHNICAL FIELD OF THE INVENTION

This invention relates to computer processes, and more particularly to a method of using a computer to provide a graphics interface, which displays a graph of data and permits the user to modify the data by directly manipulating the graph.

BACKGROUND OF THE INVENTION

The use of computers to generate graphical displays, which illustrate the relationships of underlying data is well known. For example, a computer might be used to generate a bar graph to illustrate the relationship between a set of data values taken at different points in time.

A fairly recent development in computer applications is the integration of database management capabilities and graphical displays. Both types of applications deal with the same database. Various software tools have been developed to provide dynamic linkages between these different applications.

However, a common characteristic of these integrated systems is that data is entered in text form, via conventional data entry means. Even when a graphical user interface is available for permitting the user to directly manipulate objects on a display screen, these user interfaces are limited to invoking operating system tasks, such as file management, rather than for changing application data.

SUMMARY OF THE INVENTION

A simplified aspect of the invention is a method of using a computer to implement a graphical interface having a single view style for a single type of graph. More specifically, the invention is a method of using a computer to display a graph illustrating data and to permit a user to edit the data by directly manipulating the graph. The computer stores a graphics engine, comprised of a set of rules for displaying graphical objects and graphical attributes that comprise the graph. The computer also stores a local database comprised of user-specified records and fields of data, accessible by the graphics engine. The computer receives specification data from the user, in which data fields are matched to graphical attributes. The computer receives configuration data from said user specifying at least one record type of records in said local database and at least one field of said record, which are to be illustrated with the graph. The computer matches each data value of the record type with a graphical object. It also matches each data value of the fields with a graphical attribute of said graphical object. It displays a graph comprised of the graphical objects, with corresponding attributes, on a display screen. It then receives editing input from an end user, representing a change to a value of a selected field within one of the records. It matches the selected field to an attribute of a target graphical object. It changes the target graphical object in response to said editing input, and updates the local database, such that the value of said selected field is reflects said change.

One enhancement of the invention involve storing more than one view style, each having its own graphics engine. For each view style there could be multiple objects and attributes, requiring the user to specify what data values are to be matched with those objects and attributes. A message passing protocol can be set up between the graphical interface and a separate database system, which supplies data for the local database, and is updated with new data values resulting from editing of the graph. Commands may be specified so that tasks may be performed by other applications during presentation of a graph.

One technical advantage of the invention is that its graphics engines provide a degree of generality to the process of using a computer to display graphic illustrations of data. For example, for a gantt chart, the graphics engine may include certain routines that are common to all gantt charts, so that for a specific illustration of data, the user need only specify what data is to be presented.

Another technical advantage of the invention is that it permits direct manipulation of a graph to edit the underlying data represented by the graph.

BRIEF DESCRIPTION OF THE DRAWINGS

FIG. 1 illustrates the basic components of programming for implementing the method of the invention.

FIG. 2 is a computer system for executing the method of the invention.

FIG. 3 illustrates the objects comprising a view style,

FIG. 4 illustrates components of a graphics engine of FIG. 1.

DETAILED DESCRIPTION OF THE INVENTION

System Components

Figures 1, 2, 3, 4:
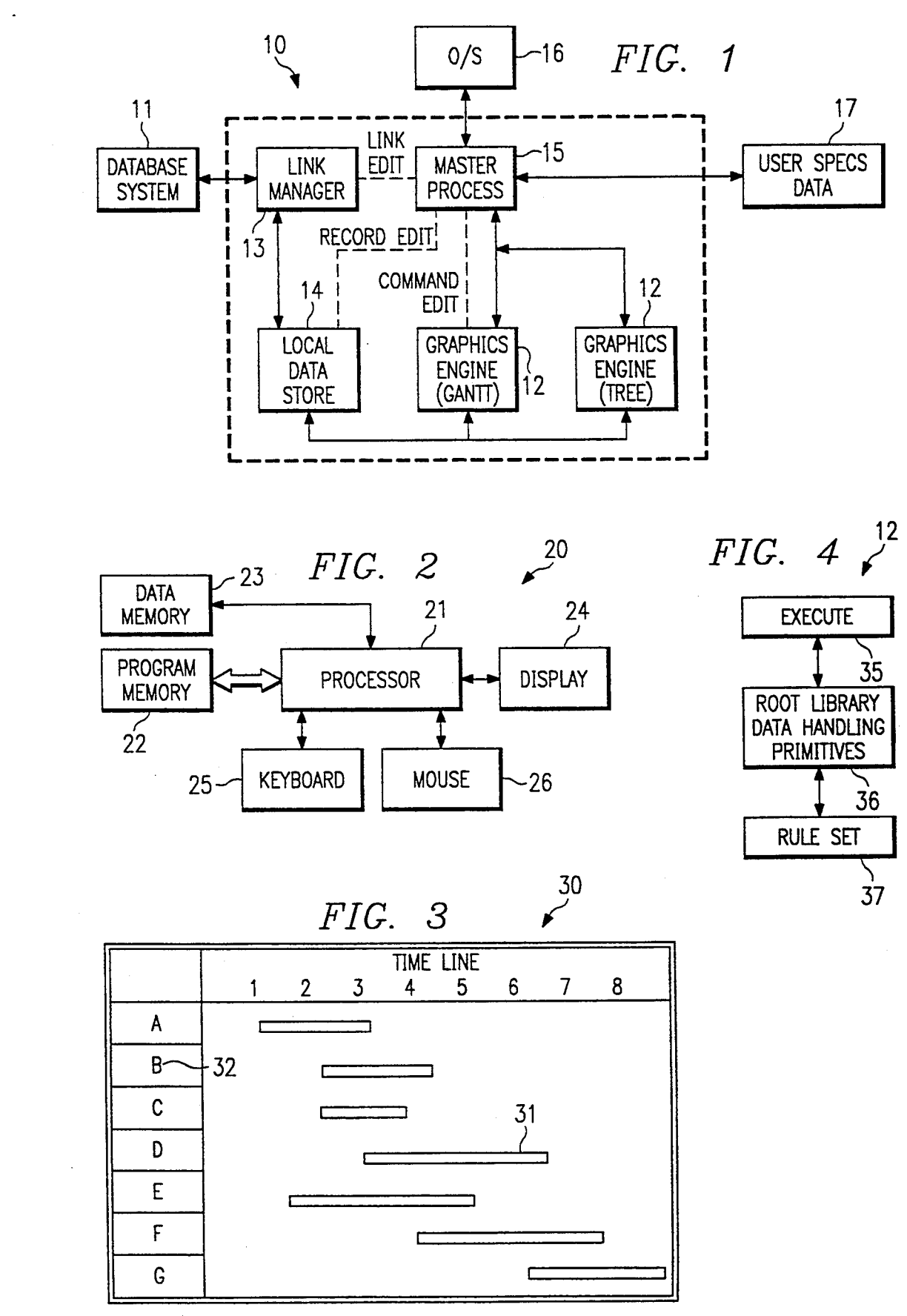
Figure 5:
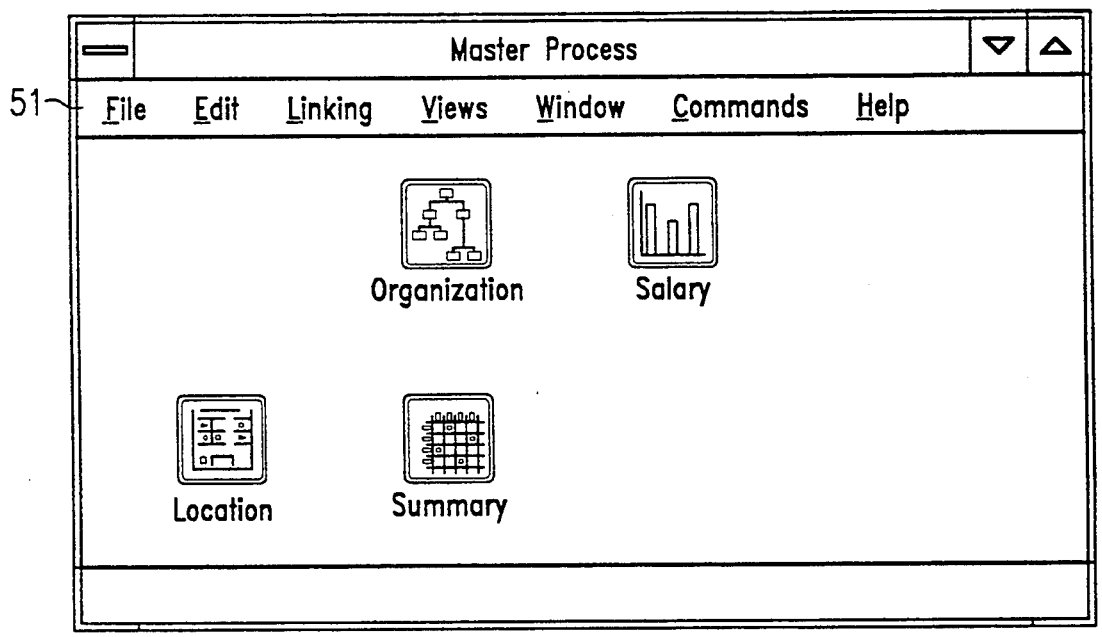
FIG. 5 illustrates a display screen with a menu line, representing menus of tasks performed by the master process of FIG. 1.

FIG. 1 illustrates the basic software components of a computer-based graphics interface 10 for graphically illustrating data retrieved from a database system 11. This software resides in the memory of a computer system, and when executed, implements the method of the invention.

FIG. 2 is a block diagram of a computer system 20 for executing the process of the invention. In general, the components of the system are conventional computer components, and include a general purpose processing unit 21, such as one based on the Intel 386 microprocessor. A program memory 22 stores program code. A data memory 23 stores data, and may include a mass memory for storing a database. The system 20 also has a bit-mapped graphics display 24 and input devices, such as a keyboard 25 and a pointing means 26.

One example of a pointing device 26 suitable for use with the invention is a trackball-type "mouse". A user moves the mouse to position a cursor on the display screen. By depressing or releasing a switch on the mouse, the user indicates to the computer when the cursor has a position that corresponds to, i.e., "points to", the user's, selection of an object on the screen. Other pointing means 26 could be used, such as a trackball with separate selection keys, or a touch screen display. By "selection" of an object or attribute as used herein, is meant to user's activity of pointing to the object or attribute and indicated his selection.

The computer system 20 operates under a "windows" type operating system 16, such as the Windows system manufactured by Microsoft Corporation. Another example of a windows operating system 16 is the UNIX operating system.

A significant feature of the operating system 16 is that it permits computer system 20 to generate multiple windows on display 24, each of which corresponds to an independent application program. Thus, it permits the graphics interface 10 and database system 11 to be in execution at the same time.

The present invention relates to the use of a computer system, such as that of FIG. 2, which stores and executes programming for the graphics interface 10 of FIG. 1. As an overview of the method of the invention, a graphics engine 12 generates a display that illustrates a set of data delivered from database system 11. A link manager 13 handles message passing between database system 11 and graphics interface 10. A local data store 14 stores data that is the subject of the current display being generated by graphics engine 12. The display is comprised of distinct graphical objects, each representing an item of data. The graphical objects have attributes, such as color and size, which also represent data. If the user desires to change the data, he may either enter new data in text form or use a pointing device to directly manipulate the appropriate graphical object. Either type of input causes local data store 14 to update its copy of the data, and causes link manager 13 to send a message to the database system 11 so that its data is updated. A master process 15 handles interactions with the user, and also permits the user to define how data will be organized in local data store 14 and to specify associations between graphical objects and data.

Database system 11 can be any type of database system, such as one in which data is organized as files, records, and fields. It is assumed that database system 11 has mass memory for storing data and some sort of data management programming. Database system 11 may be any one of a number of commercially available database application programs. However, database system 11 could be as simple as any collection of data with some means for handling data exchanges via a message protocol.

For purposes of this description, an example of a database system 11 for storing and processing employee data is used. Each employee record is organized into fields of data, each field containing an item of data relevant to that employee. Some examples of employee data fields are salary, vacation time, and length of employment.

Graphics interface 10 has at least one graphic engine 12. Each graphics engine 12 contains a description of a unique view style. Examples of view styles are gantt charts, tree charts, or bar charts. A typical graphics interface 10 will have a number of graphics engines 12, one for each view style.

In general, a view style provides for an interactive presentation of data, in which instances of user data are presented as graphical objects. Each graphical object is a rectangular area on a logical display. The primary concern of a view style is determining the size and position of these graphical objects. Typically, this determination is on the basis of a data field of a data record associated: with the graphical object. Because of this relationship between position and size and user data, a view style may constrain the kinds of data it can present. Another view style constraint is that the relationship between objects and the data should lead to some sort of intuitive means for manipulating the objects to affect the data.

FIG. 3 illustrates an example of the objects of a gantt chart view style. An example of a graphic object in the gantt chart 30 is each bar 31, which represents an interval of time. Another object is each label 32, one each of which is associated with a bar 31.

Using the example of employee data, the gantt chart of FIG. 3 is a chart of vacation times. Each object of the graph, in this case a bar 31, represents a vacation time of an employee, whose name is indicated by the label 32 of that bar 31. The position and length of the bar 31 indicate start and stop times of the employee's vacation. Thus, in FIG. 3, two graphical objects represent each employee. If Employee B's vacation time data is the value "week 2–week 4", the associated object, i.e., bar 31, would have a position and length representing that data. As an another example, a tree view style might have objects in the form of nodes in a tree hierarchy.

Each graphical object, such as a bar 31 or label 32, has one or more attributes. For example, a bar 31 of gantt chart 30 may have start position, stop position, and color attributes. Labels 32 might have attributes, such as its data string, font, or color. Each attribute is associated in some manner with data. For example, an employee who is currently on vacation might have his bar 31 displayed in a red color.

Thus, the graphics engine 12 for a view style includes a description of the view style, in terms of rules for displaying objects comprising that view style. In general, the rules for a view style determine layout, i.e., where objects go and how big they are. Appendix A sets out a number of rules for a graphics engine 12 for a gantt chart view style. Rules for other view styles may be similarly developed to create other graphics engines 12.

Creation of an instance of a view style (herein referred to as a "graph") is interactive. As explained below, the user specifies what data will be mapped to the objects and attributes, and in response, the graphics engine 12 handles the layout in the display screen.

Referring again to FIG. 1, link manager 13 enforces a message exchange protocol, which ensures the that data in local data store 14 and in database system 11 are consistent. In other words, if an item of data in one location is updated, the copy of that data in the other location is also update. If the user changes a graph, whether by means of textual input or by direct manipulation of a graphical object, link manager 13 sends a message to database system 11. This message contains the updated data so that database system 11 can update its copy of that data. Likewise, if, during presentation of a graph, the user changes data using input means of database system 11, link manager 13 sends a message containing the new data to local data store 14.

An example of a message passing protocol suitable for use with the present invention is the DDE (dynamic data exchange) protocol, developed by Microsoft Corporation, for windows operating systems. Another example is the "pipes" means for interprocess communications, as implemented on the windows interface for UNIX operating systems.

Messages communicated by link manager 13 are either data messages or executive messages. As an example of a data message, if a user changes a data value with input to graphics engine 12, a data message to database system 11 would contain the new data and permit the data to be "poked" into database system 11. Conversely, if a user changes a data value with input to database system 11, a data message from database system 11 to graphics interface 10 would contain that new data. As an example of an executive message, if a user desires to a dialog box from database system 11 to appear on a graph, this could be accomplished with a command to database system 11 and an executive message to graphics engine 12.

Local data store 14 stores data in accordance with a user-defined schema. This data is a copy of some subset of data stored in database system 11. The data in local data store are organized as record types, each record having one or more fields, and each field being a certain type. At least one field of a record type is a "key" field, whose value is unique for each occurrence of a record type. For example, each employee's key field might contain that employee's unique id number. As explained below, this organization of data in local data store 14 permits the data to be mapped to graphical objects and attributes.

A feature of local data store 14 is that it includes a routine for receiving an indication from graphics engines 12 if the user changes data of the graph, whether by textual input or by manipulating an object. If such an indication is received, local data store 14 updates its copy of the data represented by that object. Also, a particular data value might be the subject of more than one view style. For this case, local data store 14 provides notification tasks, such that when an object is changed via one graphics engine 12, other graphics engines 12 are notified.

Master process 15 handles interaction with the user. It receives user specification data, such as the organization of data in local data store 14 and directions for routing messages by link manger 13. The specification process is explained below in connection with FIGS. 5-11, as a result of which, the stored specification data 17 is accessed by master process 15. The distinction between what is user-specified, as opposed to being generated by stored programming, reflects the extent to which the programming of graphics interface 10 is reuseable. Master process 15 also handles, with the cooperation of a graphics engine 12, the presentation of any instance of a view style. The presentation and editing of graphs is explained below in connection with FIGS. 12-19.

FIG. 4 illustrates one architecture for implementing a graphics engine 12. Each graphics engine 12 has its own executive 35, which opens a window when the corresponding view style is selected by the user. It calls for routines stored in root library 36 and in rule set 37. Root library 36 is shared by all graphics engines 12, and contains routines that are common to them, such as data sorting routines. Rule set 37 contains the rules for the view style presented by that graphics engine 12.

Consistent with the architecture of FIG. 4, master process 15 calls for services by a graphics engine 12. Master process 15 and the graphics engines' executives 35 are separate but dependent processes. The root library 36 and rule sets 37 are dynamically linked libraries. In a windows environment, master process 15 and executive 35 each control their own window. Alternatively, "custom controls" features of the windows programming may be used, so that instead of a window being created by executive 35, graphs are created in a window of database system 11, which calls routines from graphics engine 12.

Figure 5A:
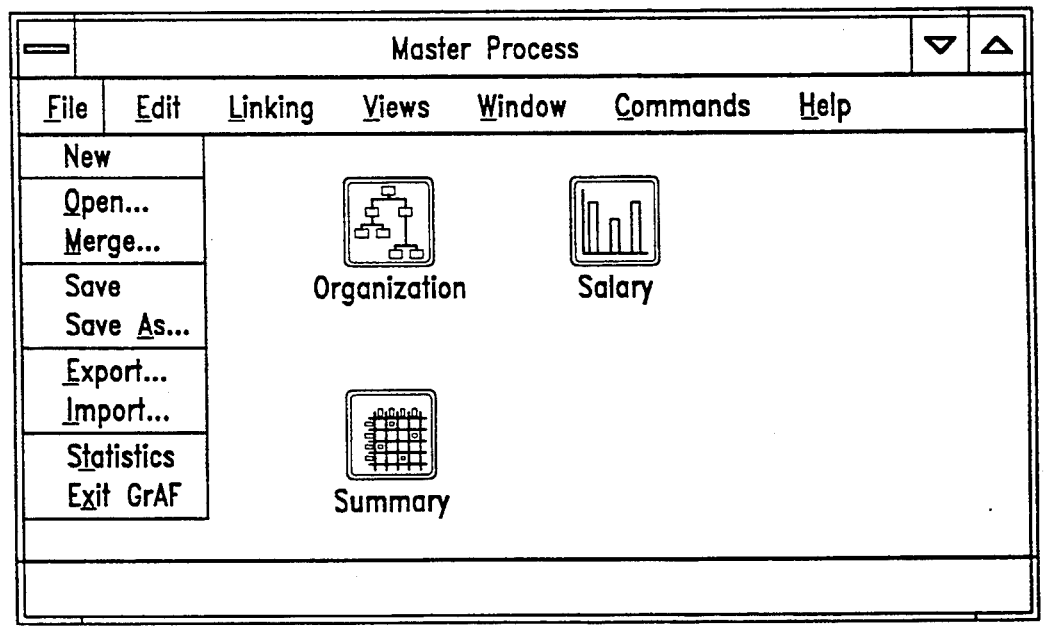
FIGS. 5A–5D illustrate menus of tasks represented by the menu line of FIG. 5.
Figure 5B:
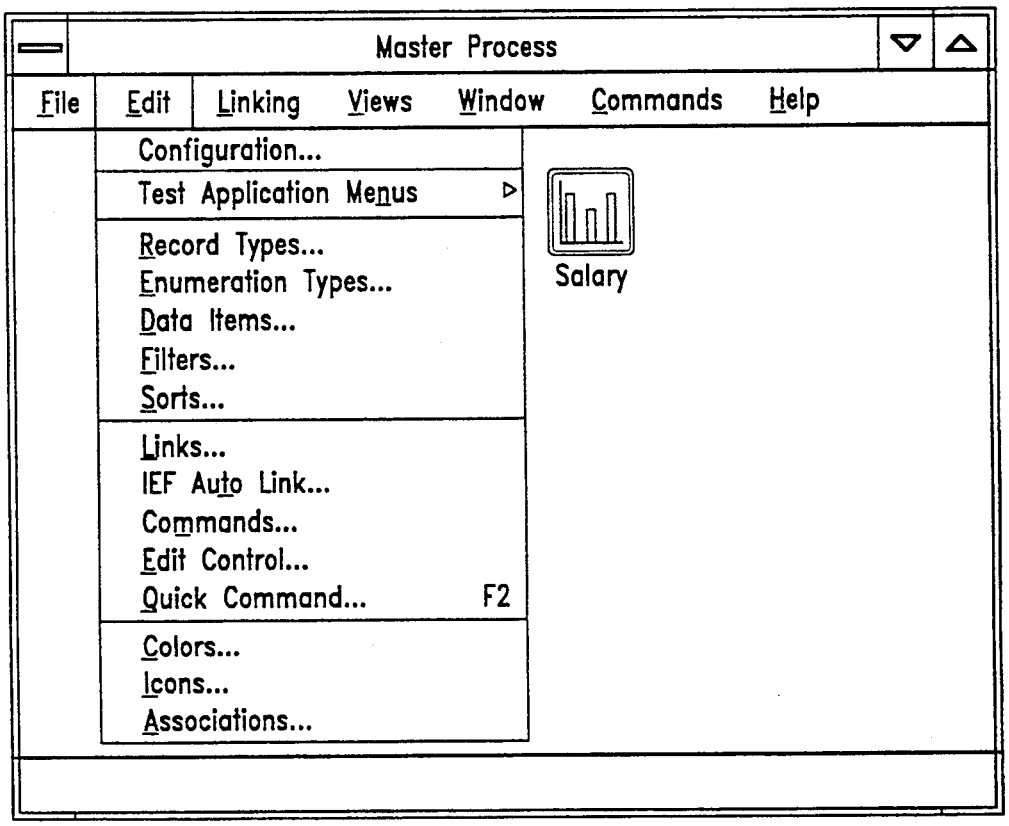
Figure 5C:
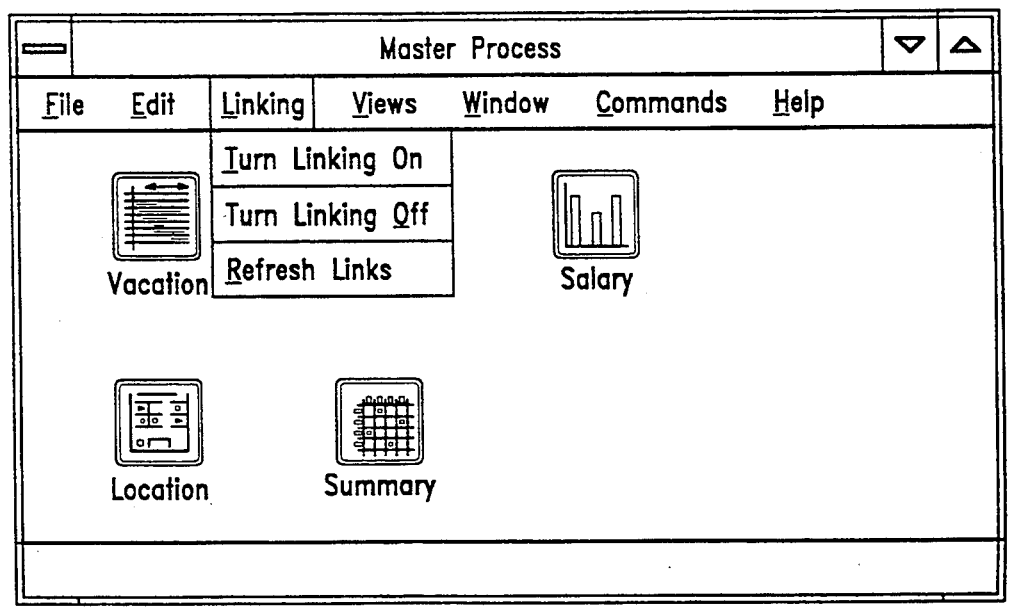
Figure 5D:
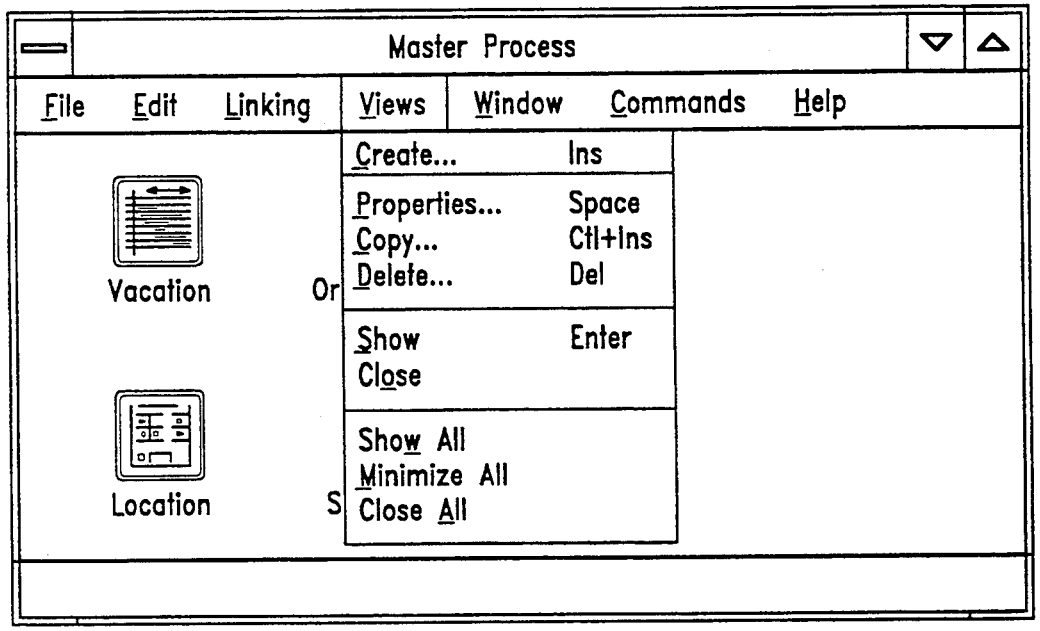

FIG. 5 illustrates a display screen 50, which presents to the user a selection of tasks performed by master process 15. FIGS. 5A-5D illustrate the pulldown menus, with selections that represent those tasks. "File" tasks, listed in FIG. 5A, are like those of conventional applications programs. "Edit" tasks, listed in FIG. 5B, are explained below in connection with FIGS. 6-11. "Linking" tasks, listed in FIG. 5C, set up links among subscribing applications. "Views" tasks, listed in FIG. 5D, are explained below in connection with FIGS. 12-20. "Commands" tasks are explained below in connection with FIG. 21. Each of these tasks is interactive, in the sense that master process 15 acts in response to user specifications. It then forwards these specifications to link manager 13, local data store 14, or graphics engine 12. In FIG. 5, display screen 50 also displays a palette of graphs already created, which may be manipulated to display those graphs.

Referring again to FIG. 1, specifications 17 represent stored input from the user, entered via the interactive "edit" tasks of master process 15. In practical use, the "user" who provides these specifications might be a software developer, who adds a layer of functionality to the graphical interface 10. This developer might be different from the "end user" who actually views graphs via the "views" tasks and makes practical use of user data from database system 11. However, for purposes of this description, the word "user" may mean either of such persons.

Specification Tasks

Figure 6:
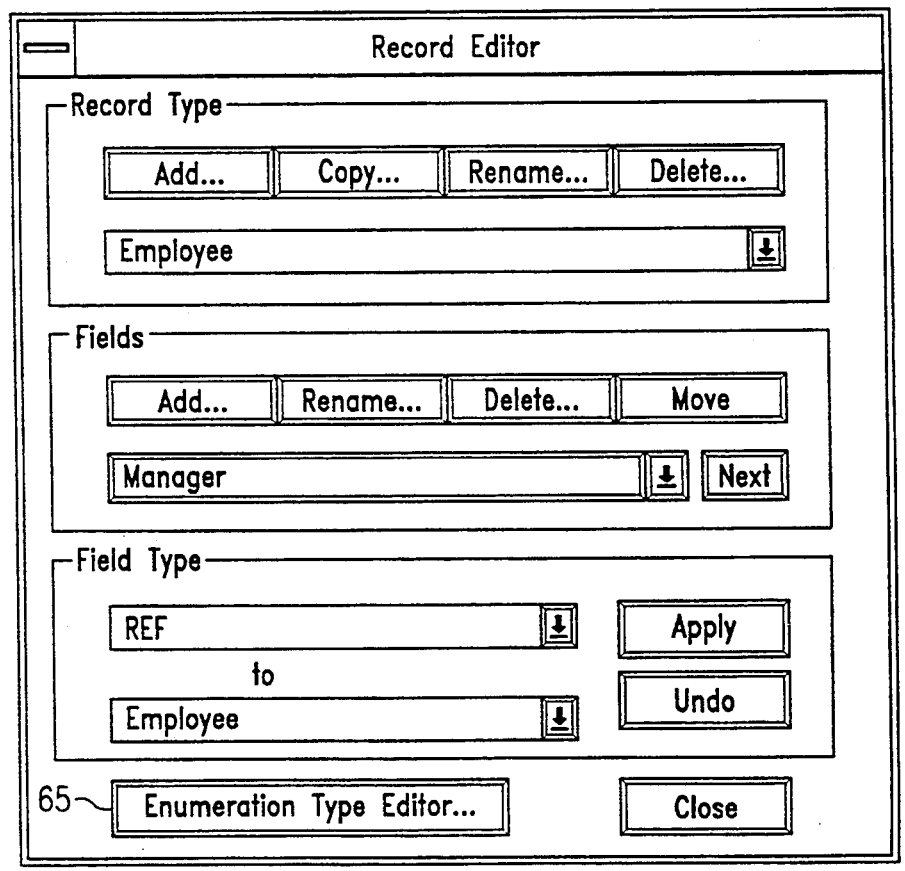
FIG. 6 is a dialog box for specifying data to be illustrated by any one or more view styles.

FIG. 6 illustrates a dialog box presented by master process 15 when the user selects the "Record Types" task from the "edit" menu of FIG. 5B. The user's textual input to dialog box 60 permits the user to specify the schema of data in local data store 14. More specifically, the user specifies a record type, the fields within each record, and the data type of each field.

In the example of FIG. 6, the user has specified an "employee" record type, with a "manager" field, of type REF. This means that an employee's record has a field that points to the record of that employee's manager, who is also an employee. This type of data would be useful for illustrating organization with a "tree" view style.

Figure 7:
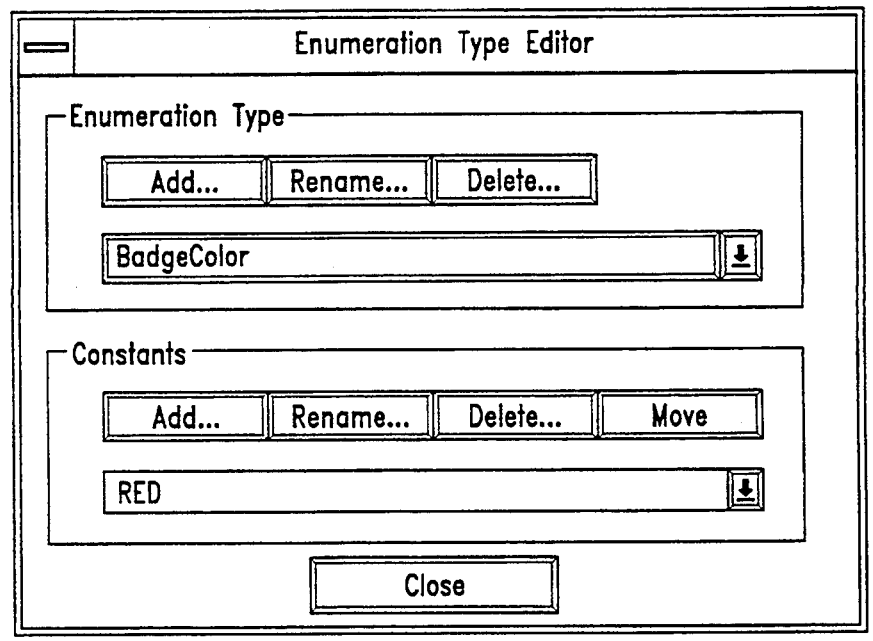
FIG. 7 is a dialog box for specifying the values of an enumeration field type.

If the field type is "enumeration", the user may specify a closed set of values that the field may have. For example, FIG. 7 illustrates a dialog box 70 that is presented by master process 15 if the user selects the field type "enumeration". The field type "badgecolor" is specified so that the field may have a value that represents one of a set of colors. These values will be constant for all instances of a view style presented by that graphics engine 12.

Figure 8:
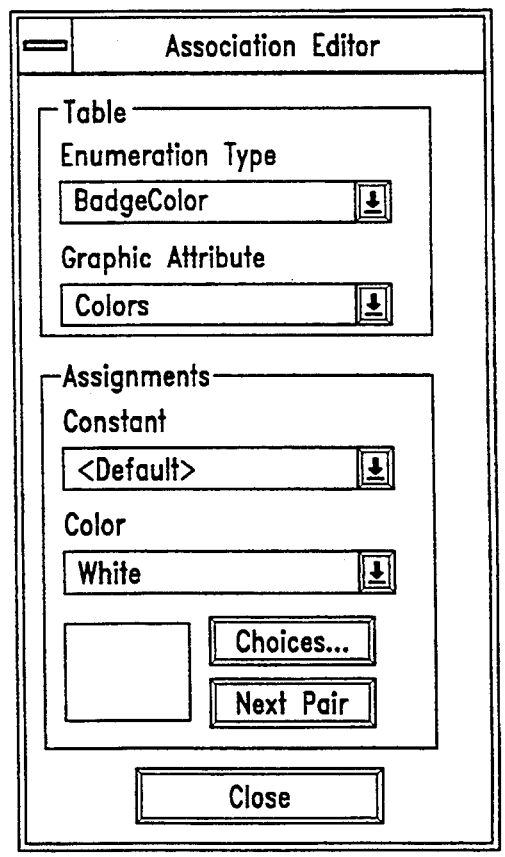
FIG. 8 is a dialog box for specifying associations between potential data values and graphical attributes.

FIG. 8 illustrates a dialog box 80 that permits the user to associate the potential data values of a field type "enumeration" to graphical attributes. Dialog box 80 is presented in response to selection of the "associations" task from the "edit" menu of FIG. 5B.

Using dialog box 80, the user first matches the enumeration type to an attribute type. Then, for each possible data value of an enumeration type, the user specifies a different instance of an attribute. This mapping is used by graphics engines 12 when presenting a graph. An object having the specified attribute will display that attribute according to the data values. For example, in a gantt chart, the bar 31 of an employee might have a color attribute that corresponds to that employee's "badgecolor" field value.

Figure 9:
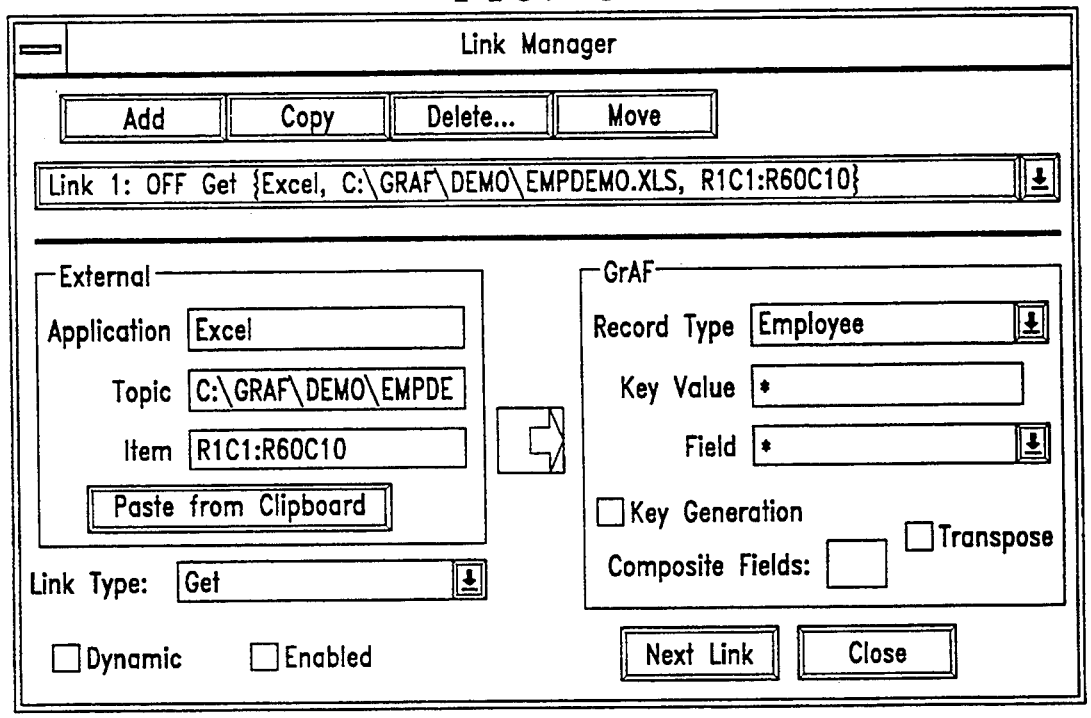
FIG. 9 is a dialog box for specifying linking instructions for the link manager of FIG. 1.

FIG. 9 illustrates a dialog box 90, presented by master process 15, if the user selects the "links" tasks from the "edit" menu of FIG. 5A. This dialog box 90 permits the user to specify the location of data, which is currently stored in database system 11, so that it may be delivered to local data store 14.

Figure 10:
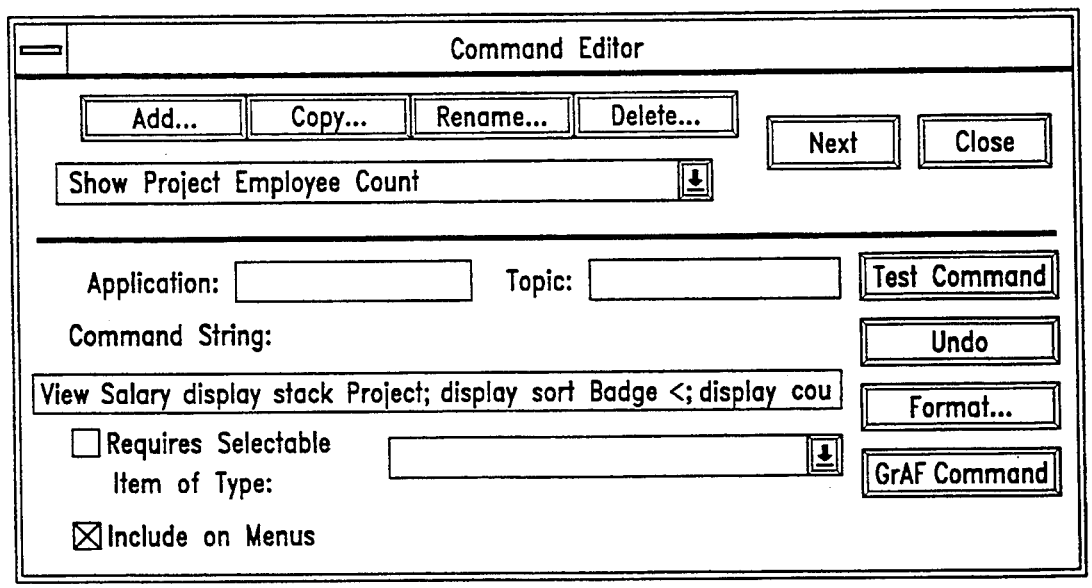
FIG. 10 is a dialog box for specifying commands that may be executed during presentation of a graph.

FIG. 10 illustrates a dialog box 100 presented by master process 15 if the user selects the "commands" task of the "edit" menu of FIG. 5B. Using dialog box 100, the user gives the command an identifier, and specifies the application to which the command is directed. The user also enters a command string, such as a DDE executive message, to be performed by that application. Once a command has been defined, its identifier will appear on the "commands" menus of either master process 15 and of all graphics engines 12, or only on the "commands" menus of certain graphics engines 12. This depends on whether the user specifies that the command is related to a specific data type. If not, the command identifier appears on all "commands" menus. If the command is related to a certain data type, the command identifier appears as a menu choice only during presentation of graphs that use the specified data type, as explained below in connection with FIG. 17. This is implemented by means of the association, during presentation of a graph, of record types and fields to objects and attributes, which in turns are associated with particular view styles. Further details of commands tasks are explained below in the section entitled "Link Manager Subscribers".

Figure 11:
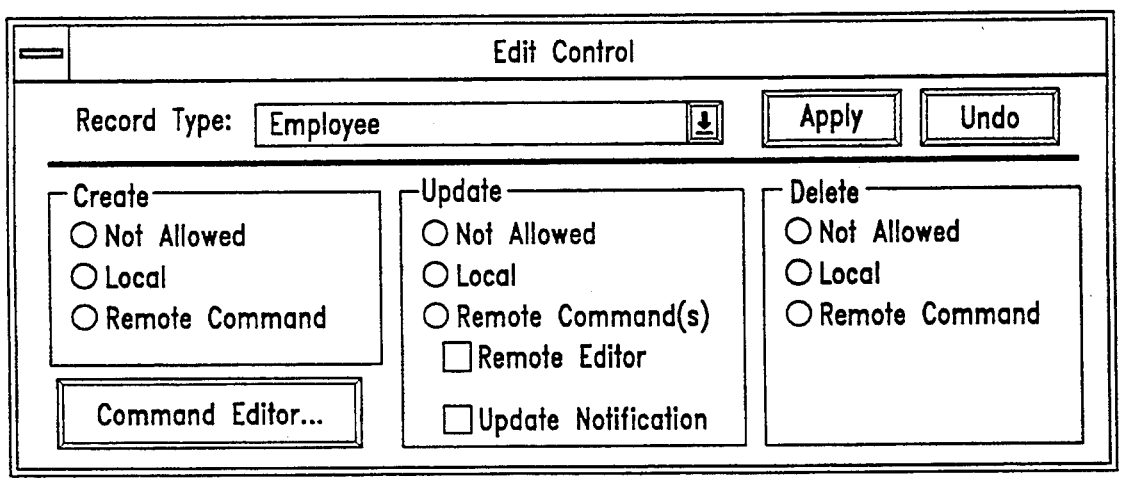
FIG. 11 is a dialog box for specifying controls that may be imposed during presentation of a graph.

FIG. 11 illustrates a dialog box 110, generated by master process 15 when the user selects the "update control" task of the "edit" menu of FIG. 5B. This task permits a user to specify controls over editing of the data of database system 11. For example, in FIG. 11 the user has indicated that certain update controls are to be imposed for the record type "employee". During presentation of a graph, these controls will prevent an end user from performing the specified updates. Dialog box 110 also permits the user to specify a remote command, such that if data is modified via graphics interface 10, database system 11 will automatically respond with some process rather than simply updating its data.

As a result of the various editing tasks described below, a user, typically a developer user, has created a file of specifications data 17. This data 17 is stored in memory 23 for use by graphics interface 10 during presentation of a graph for an end user.

Views Tasks

Figure 12:
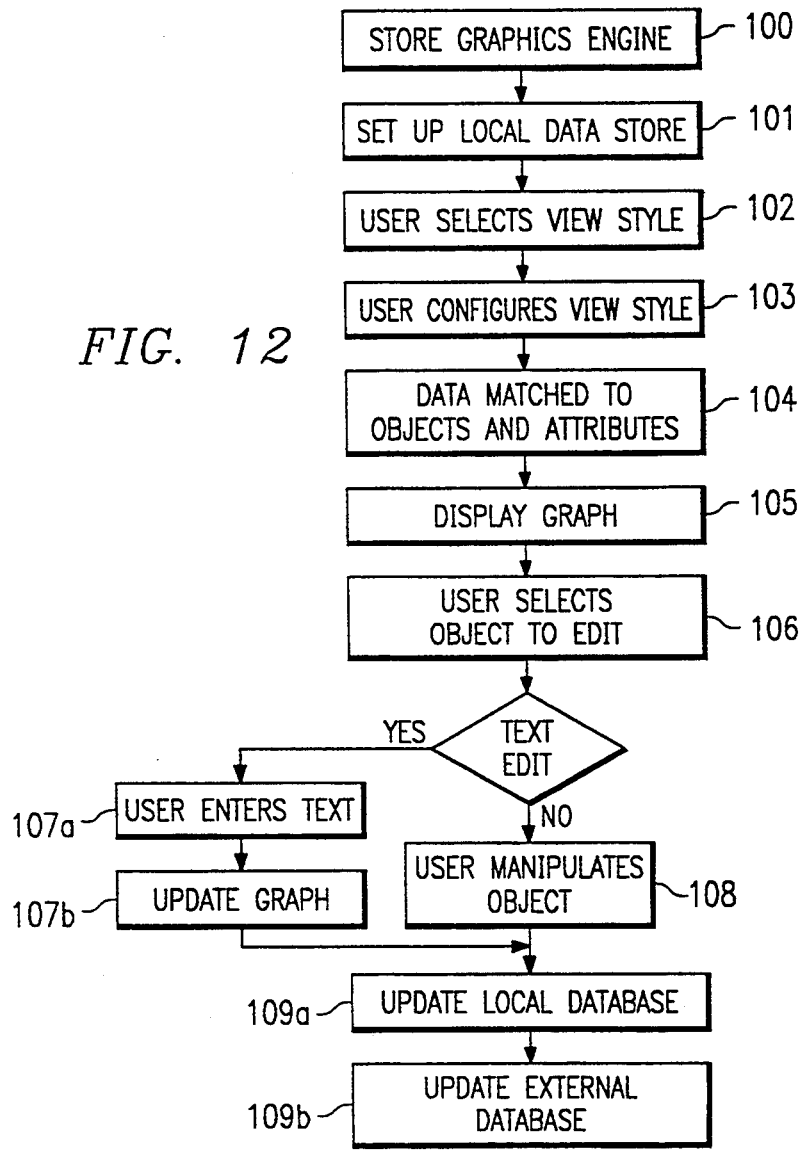
FIG. 12 lists the steps of using a computer to present a graph and to accept user manipulations in accordance with the invention.

FIG. 12 illustrates the process of displaying a graph. For purposes of FIG. 12, it is assumed that the graphics interface 10 and the database system 11 of FIG. 1 are currently in execute mode on a computer system and that a message passing protocol has been established between them. In general, this protocol includes a reciprocal notification requirement, such that when a data value is changed, link manager 13 ensures that local data store 14 and database system 11 are updated. Specifications for this message passing are supplied by a user, as discussed above in connection with FIG. 9.

For purposes of example, to illustrate the steps of FIG. 12, the user specification process of FIGS. 6–11 is assumed. The process of presented a graph is initiated by master process 15 when the user selects the "create" tasks from the "views" menu of FIG. 5D. However, it should be understood that simpler version of the invention might have view styles with single objects and/or single attributes, or predefined mappings from objects and attributes to records and fields, such that less user specification is required.

As indicated by step 100, it is assumed that at least one graphics engine 12 has been provided with the rules for a view style.

In step 101, local data store 14 is set up with user-specified record types and fields. This may be accomplished by user specification as discussed above in connection with FIG. 6. If the local data is to be supplied from database system 11, step 101 includes a data exchange from database system 11 to local data store 14.

In step 102, the user initiates a graphics engine 12 for the desired view style. This causes executive 35 of the corresponding graphics engine 12 to open a "window".

Figure 13:
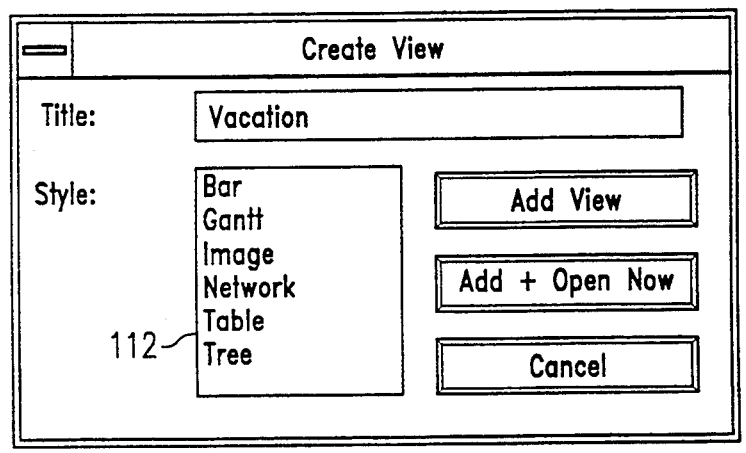
FIG. 13 is a dialog box for receiving a user's choice of view styles.

FIG. 13 illustrates a dialog box 130, generated by master process 15 in response to the user's selection of the "create" task of the menu of FIG. 5D. This dialog box permits the user to select a view style from a menu of available view styles, as stored in various graphics engines 12. The user may select any view style, such as by means of pointing device 26.

Figure 14:
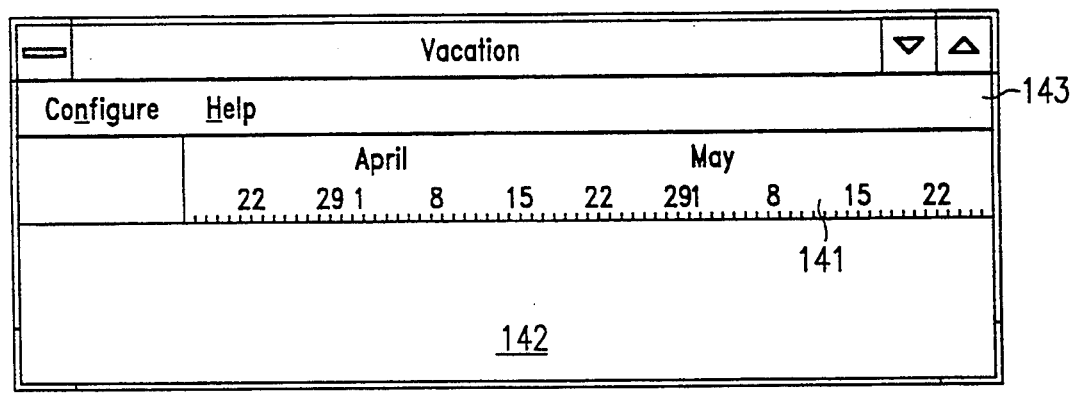
FIG. 14 illustrates a blank graph.

As a result of step 102, executive 35 takes over processing tasks from master process 15. The graphics engine 12 corresponding to the selected view style generates a "blank" graph. FIG. 14 illustrates a blank graph 140, which was generated after the user selected a gantt chart view style. The blank graph 140 has a time line 141, but the user-data area 142 is blank. A menu line 143 has a menu heading for "configure" tasks.

In step 103, the user configures the view style by specifying at least one record type and at least one field of the specified record types. Data values for this record type and field are the data to be illustrated by a graph having the selected view style. It is assumed that the specified record type and field are already part of local data store 14. However, means could be provided for dynamically passing data to local data store 14 during graphing.

Figure 15:
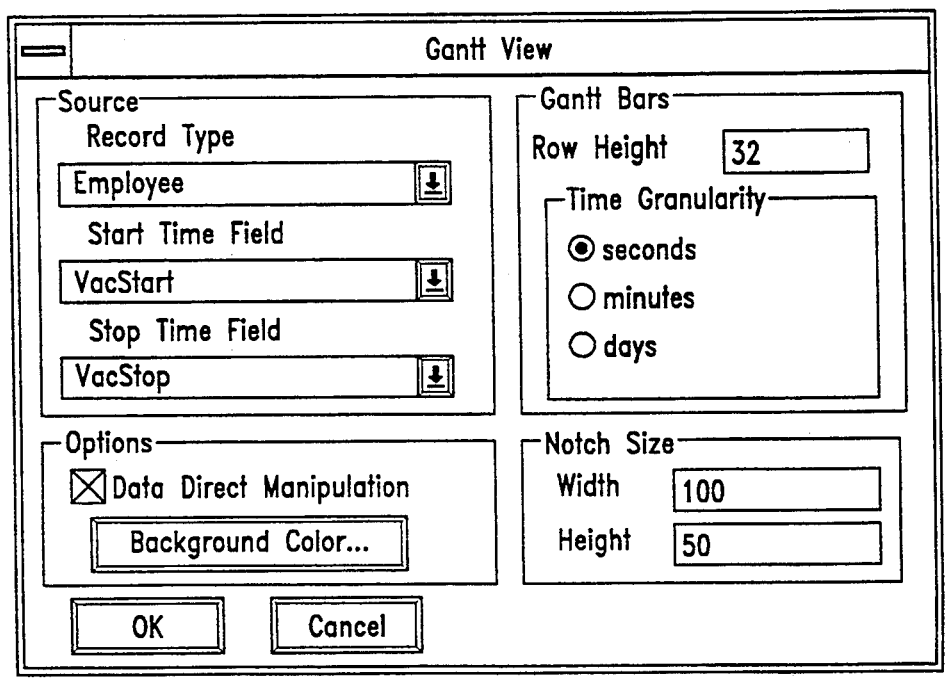
FIG. 15 illustrates a dialog box for specifying associations between data fields and view-specific graphical objects and attributes.

FIG. 15 illustrates a dialog box 150, by means of which the computer accepts the user's configuration data in step 103. This dialog box has been generated by graphics engine 12, in response to the user's selection of the "configure" task from the menu represented in FIG. 14. Using the example of employee vacation times, the user has entered a record type, "employee". Each instance of a record type, i.e., each record, represents a different employee. As explained above in connection with FIG. 3, graphics engine 12 has stored associations between the instances of each record type and one or more objects. For a gantt chart view style, each instance of a record type is associated with a bar and a label. Vacation stop and start times are fields within each record. Graphics engine 12 also has stored associations between field data and graphical attributes. For a gantt chart, the relevant attributes are the right and left positions of each bar, which are associated with start and stop fields. By means of the dialog box 150, the user specifies that the start and stop fields are vacation start and stop fields.

In step 104, graphics engine 12 matches each record specified in step 103 to a graphics object. Using the gantt chart example, graphics engine 12 matches each instance of the specified record type (each employee) to a bar 31 and a label 32. It also matches field values to attributes. For example, vacation start and stop fields (data values) are matched to left and right edge positions (attributes) of each bar 31.

In step 105, graphic engine 12 assigns each graphics object a rectangular area on the display. The attributes of the object are determined by the data in the field that belongs to the corresponding record. Graphics engine 12 thereby generates a graph of the selected data.

Figure 16:
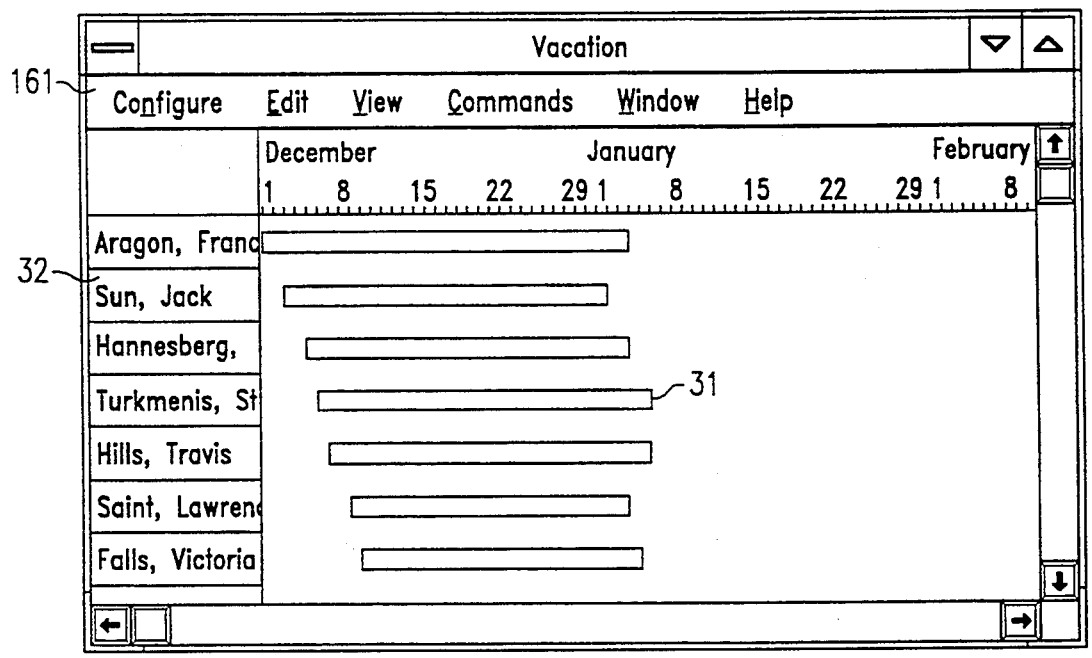
FIG. 16 illustrates a graph generated by one of the graphics engine of FIG. 1.

FIG. 16 illustrates a gantt chart 160 generated by graphics engine 12 in step 105. The gantt chart 160 has a menu line 161, whose selections are used to invoke pulldown menus of tasks performed or initiated by graphics engine 12, during presentation of the current graph. The "configure" tasks permit the user to repeat step 103, so as to change the data being displayed. For example, the user might desire to see a different gantt chart, such as one that illustrates each employee's length of employment. The "edit" tasks, illustrated in FIG. 16A, permit the user to change data via textual input, and are explained in detail in connection with steps 106–109. The "view" tasks, illustrated in FIG. 16B, permit the user to control the display, such as by re-sizing and scrolling. The "view" tasks may also be used to call various data analysis routines, such as sorting and filtering. The "commands" tasks, illustrated in FIG. 16C, permit the user to select commands that have been previously specified, as explained above in connection with FIG. 10. The "windows" tasks provide a means for accessing other windows of graphics interface 10, such as displays of other view styles.

Steps 106–109 are performed if the user desires to edit the data being illustrated by the currently displayed graph. As stated above, a feature of the invention is that the user may edit an item of data either by textual input or by manipulating the graphical object that represents that data. In either case, in step 106, the user first identifies the data item to be changed. For example, the user may select the graphical object representing that item with pointing device 26. Step 107a is performed if the user desires to edit the data by textual input. This can be accomplished by selecting the "edit" menu from menu line 161, and selecting an appropriate "edit" task. This results in placing graphics engine 12 in a state for accepting textual user input.

Figures 17, 18, 19:
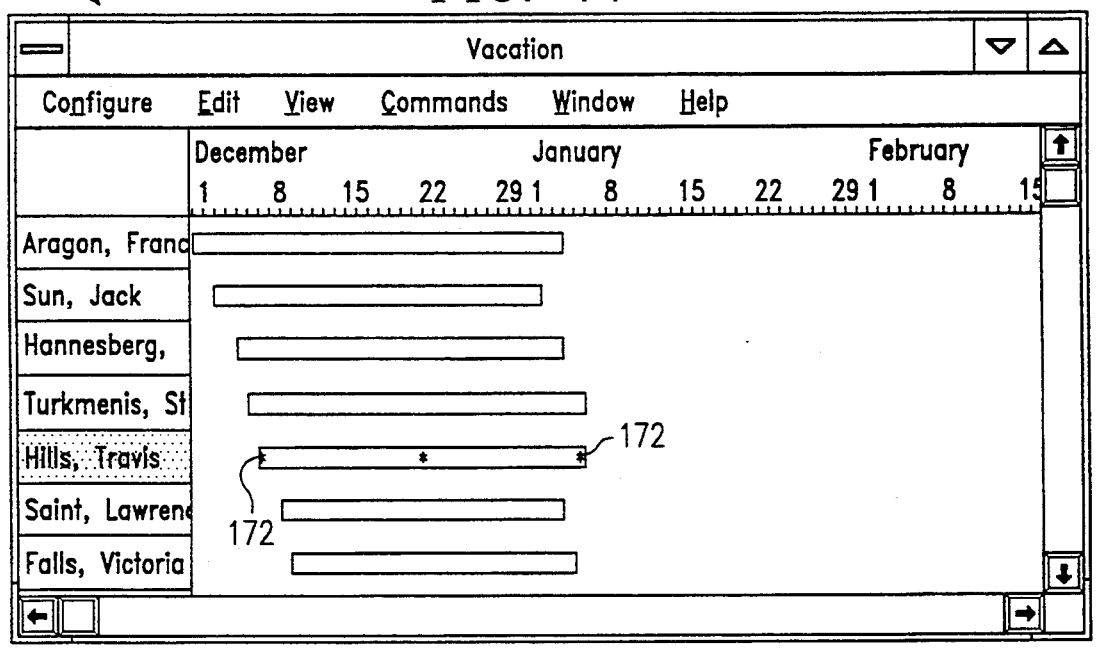
FIG. 17 illustrates a graph with a graphical object having been selected for editing.
FIG. 18 is a dialog box for receiving the user's editing input.
FIG. 19 is a second type of dialog box for receiving the user's editing input.

FIG. 17 illustrates a gantt chart 150 with employee "Travis Hills" selected for editing, in accordance with step 107. The "edit" menu is displayed in accordance with step 107a.

A feature of the invention is that editing by means of textual input can be accomplished by input means of either graphics interface 10 or of database system 11. Thus, in one embodiment of the invention, when the "edit" choice is invoked, graphics engine 12 generates a dialog box into which the user enters the new data. FIG. 18 illustrates a dialog box of this type. In an alternative embodiment of the invention, selection of the "edit" command causes link manager 13 to send an executive message to database system 11, which then generates its own dialog box. FIG. 18 illustrates a dialog box of this type. In either case, graphics engine 12 responds by updating the graph. Other type of textual input might include selection from a menu. This latter input is "textual" in the sense that the new data is represented by text rather than a change to the appearance of the graph.

Step 108 is performed to change the display by direct manipulation of a graphic object. The user moves the cursor to the object that represents the data to be modified.

Referring again to FIG. 17, for this type of editing, the edit menu would not be selected. Instead, in accordance with step 107, a specific record, i.e., Travis Hills, would be selected. This activates "hot" areas on the corresponding object, i.e., a gantt bar, to which the cursor may be moved to signify which attribute is to be changed. The user then manipulates the object, such as by moving pointing device 26.

For example, to add more time to Travis Hills' vacation, the user points to the right end of the corresponding bar, and drags the right end of the bar to lengthen it. The use of a pointing device, such as a mouse, to redraw an object on a display screen is performed by known graphics input techniques.

Other types of direct object manipulation could be used to change an object's attribute. For example, positioning a cursor on a "color" spot could result in display of a color menu to change the color of the object. Although this type of manipulation does not involve movement of the object, it is a "direct manipulation" in the sense that the object changes in response to a change to an attribute, rather than in response to a change to underlying data in text form. Appendix B describes a number of other view styles and how their graphical objects may be manipulated.

In step 109a, when the input is complete, graphics engine 12 declares a new value for the data represented by the object and writes that value into local data store 14. In response, local data store 14 notifies other graphics engines 12 that use the same data so that they will update the appearance of their graphs.

In step 109b, link manager 13 sends a data message to database system 11, informing it that its copy of the data item needs to be updated. This activity by link manager 13 is automatic as a result of its constant monitoring of local data store 14. If a value is changed, a "flag" is detected by link manager 13.

Figure 16A:
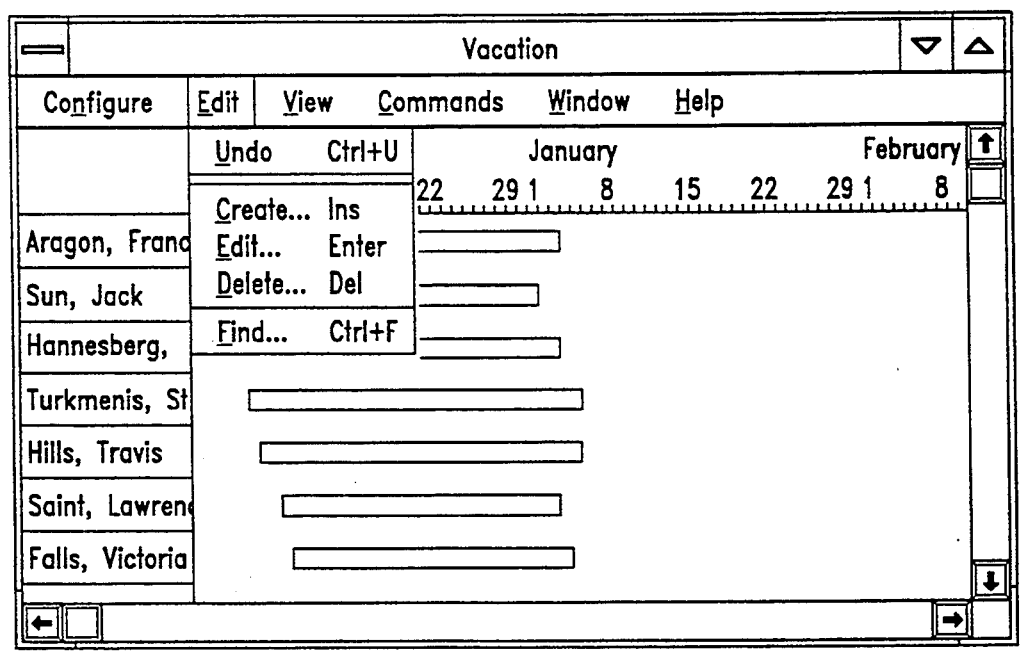
FIG. 16A illustrates the "edit" tasks performable by a graphics engine during presentation of a graph.
Figure 16B:
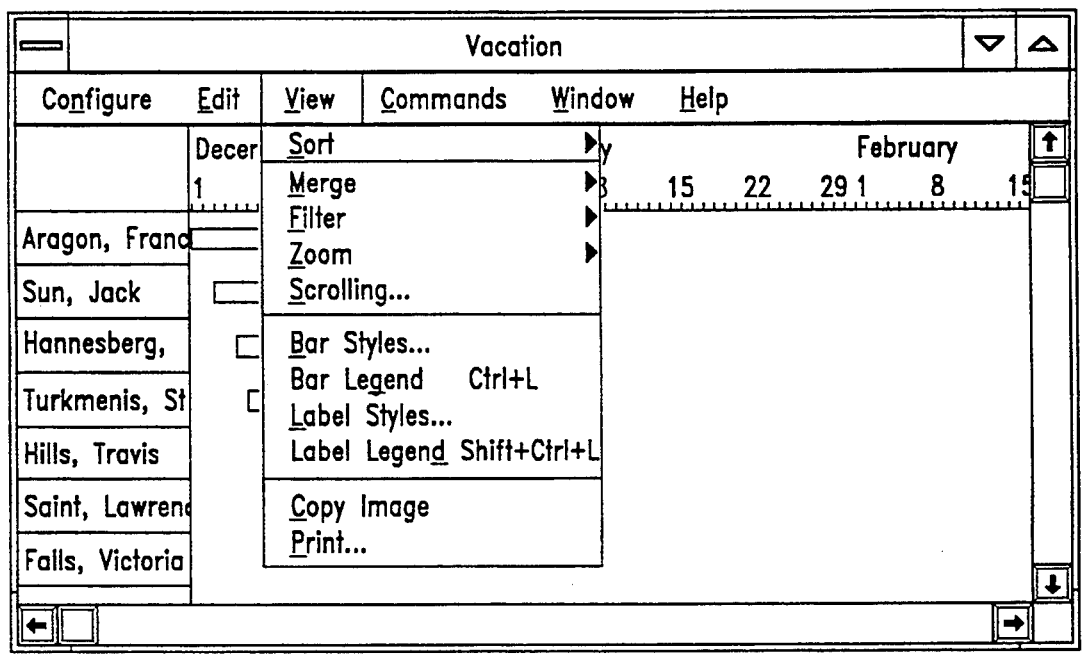
FIG. 16B illustrates the "view" tasks performable by a graphics engine during presentation of a graph.

Referring again to the "edit" menu of FIG. 16A, other tasks permit the user to select other data editing tasks, such as adding a new data item or deleting a data item. These tasks can be performed by direct manipulation or by means of dialog boxes, and in either case, result in an update of local data store 14 and a message to database system 11.

Link Manager Subscribers

As indicated above in connection with steps 107-109 of FIGS. 12, link manager 13 is automatically invoked after a user edits data during presentation of a graph. It transmits an update messages to database system 11 and to any graphics engine 12 that uses the data. Thus, database system 11 is a "subscribers" to link manager 13, as are other graphics engines 12 that use the same user data.

Figure 16C:
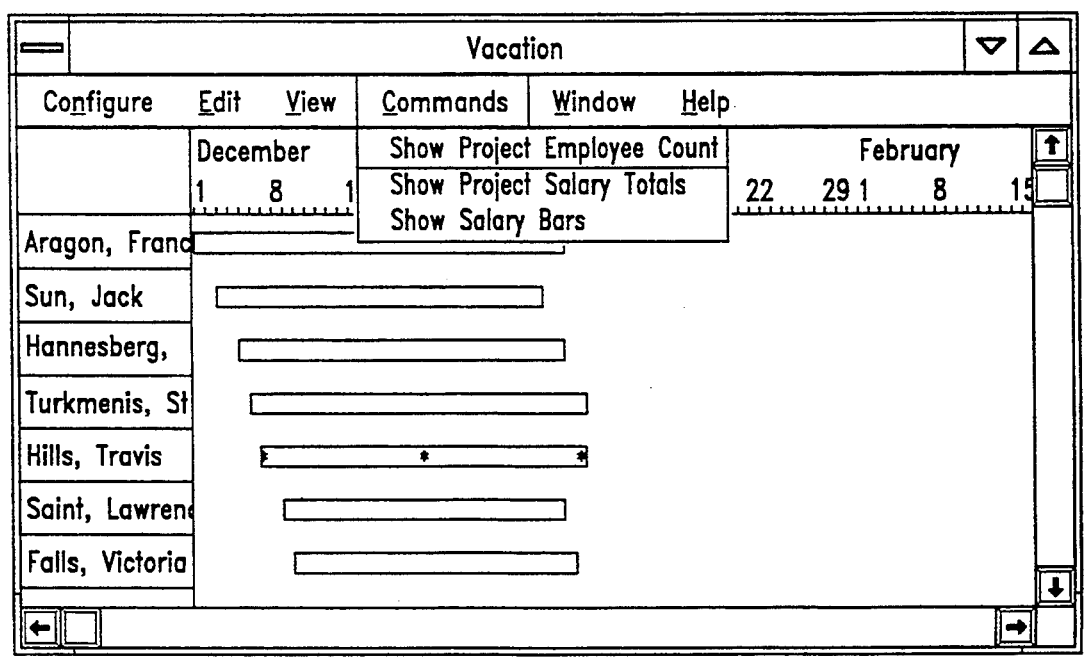
FIG. 16C illustrates the "commands" tasks performable by a graphics engine during presentation of a graph.

Another feature of the invention, discussed above in connection with FIG. 5 is that the user may specify commands to be performed by another application, such as database system 11, during presentation of a graph. Once a command has been specified, it is represented by a selection on the "commands" menu of FIG. 5. As indicated by FIG. 10, the user may also specify "include on menus", which causes the identifier to also appear on the "commands" menu of the view styles of different graphics engines 12 and invoked during presentation of a graph. FIG. 16C illustrates an example of a "commands" menu of the latter type.

Commands are preformed by means of executive message to the designated application. This designated application is thus a "subscriber" to link manager 13 for command purposes. In practical use, any type of application program could be designated to perform a command. For example, a voice synthesizer application could be commanded to generate a voice prompt if it became aware of an event affecting a graph.

The combination of link manager 13, the commands stored in graphics engines 12, and the control commands, together comprise a communications protocol for the graphics interface.

Other View Styles

Although the above description is in terms of a graphics engine 12 for a gantt chart view style, Appendix B describes other view styles. The operation of master process 15 is the same for each of these view styles. Also, the same steps of FIG. 12 are applicable. Like the above-described gantt chart view style, these view styles also permit direct object manipulation for editing data.

Other Embodiments

Although the invention has been described with reference to specific embodiments, this description is not meant to be construed in a limiting sense. Various modifications of the disclosed embodiments, as well as alternative embodiments, will be apparent to persons skilled in the art. It is, therefore, contemplated that the appended claims will cover all modifications that fall within the true scope of the invention.

APPENDIX A View Style Rules Gantt Chart

The rules for a gantt chart new style incorporate the following considerations:

The gantt view can examine records which contain two date time fields, one indicating a starting interval time and the other indicating the finishing interval time.

The display area is divided into four panes; status pane, timeline, stacked labels, and stacked bars.

The label and bar panes are logically organized according to rows.

The bar and timeline panes are logically organized according to a horizontal temporal interpretation.

There are two graphic representations per data item, a graphic label and a time interval bar.

Labels are displayed stacked in the label pane.

Bars are displayed in the stacked bars pane in the corresponding label row.

A timeline display is drawn in the timeline pane so that the user can readily interpret the indicated times.

When scrolling vertically, the time scale display does not move, but the labels and bars are moved together. When scrolling horizontally, the labels do not move but the bars and the timeline move together.

The height of a row is specified by the user as a positive number indicating the height in logical display points.

The width of the label pane is specified by the user as a positive number indicating the width in logical display points.

The size of the label object is the height of a row and the width of the label display pane.

The height of the bar is the height of the row; the width of the bar is dependent upon the temporal interpretation of the start and stop times of the data item.

When selected, the bar may exhibit three possible forms of direct manipulation. Access to direct manipulation is provided by moving the mouse over "hot points" which are located at the left edge, right edge, and in the middle of the bar. By pressing down, holding, and moving the mouse, the size of the bar changes. When the mouse button is released, the new size of the bar is back translated into new attribute values.

The left edge of the bar adjusts the start time of the interval; similarly, moving the right edge adjusts the stop time. Grabbing the middle of the bar the user adjusts both the start and stop times while keeping the amount of the interval of time constant.

Direct manipulation will not allow the user to adjust the stop time to precede the start time, nor will it allow the start time to follow the stop time.

APPENDIX B

+#$ K Introduction

GRAF, the Graphical Application Facility, provides visualization services which allow an application's data to be graphically presented and manipulated.

GrAF visualization services are provided in the form of GrAF Views, a presentation style applied to application data items. Views are available through icons in a View Palette.

View Styles

A view style provides a graphical presentation of application data items. GrAF provides a number of view styles, each emphasizing a different data dimension.

Example: Gantt View style emphasizes the time duration of data. Bar Chart View style presents data quantitatively.

View styles display application data inside view windows, which also provide a number of powerful data analysis and manipulation facilities.

Visualization Facilities

GrAF view styles provide a number of facilities to support data visualization and manipulation. Graphic Object (GrOb) styles provide graphical representations of data items, highlighting different aspects of the data through use of colors, icons, and fonts. View Zooming, Filtering, and Sorting provide data analysis capabilities by controlling the amount, type, and order of data represented. Data values can be changed in views through direct interaction with the graphic objects representing the data (data direct manipulation) or via customized Data Item Editors.

See also

| | |
|---|---|
| Visualization Facilities | Features common to all view styles |
| Views and View Styles | Present different data dimensions |
| Date Representation | Record types, fields, field types |
| View Palette | Palette of iconized views |

+unitro:1000 #VF_Overview $Introduction $^K$GrAF; View Styles; Visualization Services;

+#$ K View Styles and GrAF Views

A view style provides a graphical presentation of application data items. Each view style is designed to emphasize a different dimension of the data. GrAF provides a number of view styles, such as the Gantt View style, which emphasizes the time duration of data, and the Bar Chad View style, which presents data quantitatively.

A GrAF view is a window of one of the supported view styles, displaying data items of a particular record type.

Example: A Flight Schedule view might be a Gantt View of aiding flight data. A Salary Profile view might be a Bar Chart View of employee salary information.

All GrAF views offer a number of visualization facilities, such as sorting, filtering, and data direct manipulation, for analyzing and manipulating data.

| GrAF View Styles | |
|---|---|
| Gantt View | Time Duration |
| Bar Chart View | Quantity |
| Table View | Row/Column format |
| Image View | Location |
| Tree View | Hierarchy levels |
| Network View | Complex relationship web |

See also

| | |
|---|---|
| Visualization Facilities | Features common to all view styles |
| Data Representation | Record types, fields, field types |
| View Palette | Palette of iconized views |

+unitro:1100 #HT_ViewStyles $View Styles and GrAF Views $^K$View Styles; Visualization Services;

+#$K GrAF Data Representation

GrAF maintains the set of application data items available to its graphical views in its own internal data store.

Record Types and Data Items

In GrAF's data representation, each data item belongs to a record type defined by application design requirements.

Example: An application might display information for employee vacation schedules in a Gantt View. The record type for this Gantt View would be Employee. Each occurrence of this record type would be a particular employee data item (data object).

Record Fields

A record type (class) consists of a set of record fields (attributes), each with its own field data type. Each record type has a key field. The value of a data item's key field field must be unique across its record type.

Record field types in GrAF are:

| | |
|---|---|
| Text | Unstructured ASCII text |
| Integer | Positive or negative whole numbers |
| Date/Time | A date/time value in the format required by your system |
| Reference | Reference to another data item |
| Enumeration Type | Values taken from an ordered set of application-defined enumeration constants |

For example, the Employee record type might have the following definition:

| Key Field: | |
|---|---|
| Employee ID | Integer |
| Additional Fields: | |
| Name | Text |
| Salary | Integer |
| Project | Enumeration Type |
| | One of {Management, Sales, Development, Training} |
| Vacation Start | Date/Time |
| Vacation End | Date/Time |
| Manager | Reference to another Employee |

Date/Time Formats

Legal Date/Time values depend on the date and time formats required by your system. Month, day, and year must be present. Hours, minutes and seconds are optional, but if hours are specified, minutes must be specified also.

Example: If your system date format is MM/DD/YY and your .time format is HH:MM:SS, Date/Time values must be in the form MM/DD/YY [HH:MM:[SS]] where [] indicate optional components.

Data in GrAF Views

Each GrAF view displays graphic objects (GrObs) representing application data items belonging to one record type. (The exception is Network View, which has one record type for its Arcs and another for its Nodes.)

+uintro:1200 #VF_DataRep $GrAF Data Representation $^K$Data Representation; Record Type; Data Item; Record Field; Enumeration Type; Enumeration Constant; Date/Time Type; Reference Type; Text Type; Integer Type;

Example: An application might provide one Gantt View of employee vacation schedule information, displaying data items of the Employee record type. Another Gantt View might present airline flight schedules, displaying data items belonging to the record type Flight.

See also

| | |
|---|---|
| Graphic Objects (GrObs) | Represent data items graphically |
| Views and View Styles | Present different data dimensions |

+#$K View Style Menus

Each view window contains a View menu, Edit menu, Windows menu, and Help menu, and may optionally provide a Commands menu.

View menu

The View menu provides access to a number of visualization facilities common to most or all views. Other view-specific features may also appear for a particular view style.

| View menu items | |
|---|---|
| Sort | Specify GrOb display sequence |
| Filter | Control the data subset displayed |
| Zoom | Control GrOb size & detail |
| GrOb Styles | Alternate data item display styles |
| Legend | Color/icon associations |
| Copy Image | Copy view image to clipboard |
| Print | Print view images |

Edit menu

Edit menu items provide data item operations such as Create, Edit, and Delete. The contents of the Edit menu will differ depending on which operations are enabled in your application.

| Edit menu items (not all items appear in all views) | |
|---|---|
| Undo | Undo previous Data DM change |
| Create | Create a data item |
| Edit | Edit a data item |
| Show | Show a data item |
| Delete | Delete a data item |
| Find | Locate data item GrObs |

Commands menu

The Commands menu, if present in a view, contains items which invoke actions, such as showing details for a data item, showing a different view of the data, or bringing up a dialog to operate on the data. Commands menu items differ from view to view, depending on your application.

Windows menu

The Windows menu provides a list of the view windows available in your application. Selecting an item makes that window active. The first item on the Windows menu is always your application's main window, containing a palette of all its views. Following that item there is one Windows menu item naming each view in your application.

Help menu

The Help menu provides access to GrAF visualization services help topics. Menu items to access topics specific to your application may also be present.

See also

| Commands | Special operations (Commands menu) |
|---|---|
| View Palette | Palette of iconized views |
| View Palette Menus | View Palette menu operations |

+uintro:1300 #VF_ViewMenus $View Style Menus ^KView Styles; Visualization Services; Menus; View Style Menus;

+#$K The View Palette

The View Palette is a window containing icons representing the views in your application. The window title of the View Palette is the name of your application.

From the View Palette you can open any view by one of the following methods:
  Double click on the view icon
  Select the view icon and press Enter
  Select the view icon and choose Show from the Views menu
  Select the view name from the Window menu From inside a view you can return to the View Palette by choosing your application's name from the view's Window menu.

See also

| View Palette Menus | View Palette menu operations |
|---|---|
| Views and View Styles | Present different data dimensions |

+uintro:1400 #HT_ViewMaster $View Palatte ^KView Palette;

+#$K View Palette Menus

Your application's main window, also called the View Palette, contains a Views menu, Windows menu, and Help menu, and may optionally provide a Commands menu.

Views menu

The Views menu provides operations to show, close and minimize views.

| Views menu items | |
|---|---|
| Show | Opens or restores the selected view's window |
| Close | Closes the selected view's window |
| Show All | Opens or restores all view windows |
| Minimize All | Minimizes all view windows |
| Close All | Closes all open or minimized view windows |

Commands menu

The View Palette Commands menu, if present, contains items which invoke actions, such as showing a view sorted and filtered in a specific way.

Example: A command titled "Show Project Salary Totals" might show a Bar Chart View of employee salary bars, stacked by project category.

The contents of the Commands menu are defined by your particular application.

Windows menu

The Windows menu provides a list of the view windows available in your application. There is one Windows menu item for each view in your application. Selecting an item makes that window active.

Help menu

The Help menu provides access to GrAF visualization services help topics. Menu items to access topics specific to your application may also be present.

See also

| Commands | Special operations (Commands menu) |
|---|---|
| View Menus | Common view style menu items |
| Views and View Styles | Present different data dimensions |

+uintro:1500 #VF_VMMenus $View Palette Menus ^KView Palette; Menus; View Palette Menus;

+#$K GrAF Visualization Facilities

GrAF view styles provide a number of facilities to support data visualization and manipulation. These facilities are available in all, or most, views, although specific details of the way they work may depend on the particular view style.

Data Analysis Facilities

Facilities such as graphic objects, zooming, filtering, and sorting, provide visual analysis capabilities through control of the appearance, amount, type, and order of the data items in view.

| Graphic Objects (GrObs) | Represent data items graphically |
|---|---|
| Sorting | Specify GrOb display sequence |
| Filtering | Control the data subset displayed |
| Legend | Color/icon associations |

| | |
|---|---|
| Zooming | Control GrOb size & detail |
| Scrolling | Adjust visible portion of view |
| Find | Locate data Rem GrObs |
| Commands | Special operations (Commands menu) |
| Other View Facilities | |
| Copy Image | Copy view image to clipboard |
| Printing | Print view images |

Data Item Operations

GrAF provides a number of mechanisms for creating, modifying, and deleting data items. These facilities may or may not be available in a particular view, depending on your application's design.

| | |
|---|---|
| Data Item Operations | Create, Edit, Delete, Undo, etc. |
| Data DM | Modify data via click-and-drag direct manipulation |
| Create dialog | Create a data item |
| Data Item Editor | Edit a data item |
| Data Item Display | Show a data item |
| Delete | Delete a data item |
| Undo | Undo previous Data DM change |

See also

| | |
|---|---|
| Data Representation | Record types, fields, field types |

+vfacility:1000 #VF_VServices $GrAF Visualization Facilities $^K$Visualization Services;
+#$K Graphic Objects (GrObs)

View styles represent application data items as graphic objects (GrObs) in the view window.
   Example: Gantt View represents each data item with a time duration bar and a row label. Tree View represents data items as nodes in a tree hierarchy.
Dynamic graphic attributes Graphic objects are customized by the application view designer to emphasize various aspects of the data through the use of graphic attributes such as colors, icons, and text. These graphic attributes can be static (the same for all data items) or dynamic, reflecting different data values.
   Example: A custom set of colors and icons might represent different flight status and carrier values for airline flight data items. Then, in a Gantt View, the time duration bars might be red if the flight status is CANCELLED, yellow if it is DELAYED, or green if the flight is ON TIME. Row labels might contain an icon representing the fight's Carrier.

Legend windows, available in all views, provide tables of the dynamic associations between data values and graphic attributes.
Graphic object appearance Graphic objects can alter in appearance depending on the zoom level. At normal zoom, GrObs display with maximum level of detail. At zoom factors of 50% or more, GrObs are smaller and may contain less detail. Appearance also depends on whether the GrOb is selected.

Your application may also provide alternate GrOb Styles, emphasizing different aspects of the data. Alternate styles appear in the Choose Style dialog lists (GrOb Styles menu item, View menu).
   See also

| | |
|---|---|
| Gantt View GrObs | Time duration bars & row labels |
| Bar Chart GrObs | Value bars, count bars, and labels |
| Table View GrObs | Columns display data attributes |
| Image View Placements | Label stacks & reference markers |
| Tree View GrObs | Levels of connected nodes |
| Network GrObs | Nodes, arcs, & network layout |
| GrOb Styles | Alternate data items display styles |
| Legend | Color/icon associations |
| Zooming | Control GrOb size & detail |
| Selection | Marking an item active for operation |
| Views and View Styles | Present different data dimensions |
| Data Representation | Record types, fields, field types |

+vfacility:2000 #VF_GrObs $Graphic Objects (GrObs) $^K$GrObs;
+#$K GrOb Styles

Your application may provide alternate graphic object (GrOb) styles which emphasize different aspects of the data in a view. You select a style through the Choose Style dialog, invoked via GrOb Styles menu items (View menu).
   Example: One GrOb style for employee data items might emphasize service category by using different background colors for each service class. Another graphic object style for the same employee data might emphasize work area by using icons to represent different projects.
Small variation GrObs Any graphic object style can have a small variation defined. If present, small variations appear in the Choose Style dialog with an asterisk following their names. Small GrOb variations are automatically displayed when the view is zoomed 50% or more (when GrObs display at half their normal size or smaller).
   Example: If "Project Label" is a GrOb style emphasizing employee work areas, and "Project Label*" is the small variation of that style, the display shows the small variation "Project Label*" at zoom factors of 50% or more and "Project Label" otherwise.

Typically a small variation emphasizes the same aspect of the data as its full size counterpart, but with less detail. Small variations often make greater use of simple color and less use of graphic attributes such as text and icons. Such simpler styles are more appropriate when zooming reduces the size of graphic objects, and hence the amount of detail they can convey.
   See also

| | |
|---|---|
| Choose Style dialog | Select alternate GrOb styles |
| Zooming | Control GrOb size & detail |
| Graphic Objects (GrObs) | Represent data items graphically |
| Views and View Styles | Present different data dimensions |

+vfacility:2100 #VF_GrOb_Styles $GrOb Styles $^K$GrObs; GrOb Styles;
+#$K Choose Style The Choose Style dialog lets you display alternate graphic object styles which emphasize different aspects of the view's data.

Each view has a graphic object (GrOb) Styles menu item for each type of GrOb it displays. Selecting one of these menu items brings up the Choose Style dialog, containing a list of all the GrOb styles of that type.
   Example: Gantt View's Bar Styles menu item invokes the Choose Style dialog with a list of all defined bar styles for the view. It's Label Styles menu item invokes the same dialog with a list of all the label styles.

Dialog options

Styles list contains GrOb style names for the GrOb type. Names ending in the asterisk character (e.g., "Project Label*") are small variation GrOb styles.

The current GrOb style is highlighted in the style list. Notice when you highlight an alternate GrOb style a sample of the style is displayed in the dialog.

Tip Use the sample display to preview styles before applying one.

Display as selected Check this option to show the style's appearance if the GrOb is selected.

OK exits the dialog and applies the highlighted style to the view.

Cancel exits the dialog without changing the GrOb style.

See also

| | |
|---|---|
| GrOb Styles | Alternate data item display styles |
| Selection | Marking an item active for operation |
| Graphic Objects (GrObs) | Represent data items graphically |
| Views and View Styles | Present different data dimensions |

+vfacility:2150 #HTD_Choose_Style $Choose Style $^K$GrObs; GrOb Styles; Choose Style;

+#$K Selection

Clicking once on a graphic object (GrOb) in a view selects that GrOb's data item. A number of operations are only available when there is a selected data object, such as editing, deletion, data direct manipulation, and object-specific operations on the Commands menu such as showing details. There is at most one selected data item in a view at any given time.

Graphic Object appearance

Selection is often indicated by a change in the GrOb's appearance, such as a change in the foreground or background color, or the appearance of an icon or grabbers. When there is more than one GrOb representing a data item, one or both of them may alter appearance to indication selection.

Example: In Gantt View, where each data item is represented by both a row label and a time duration bar, clicking on either the label or the time bar will select the data item. The Delete operation (Edit menu) is only active when the item is selected. Either the bar or the label (or both) may alter in appearance to indicate selection.

Selection using the mouse

Clicking once on a graphic object in a view selects that GrOb's data item. Clicking on the background area of a view outside any graphic object removes any selection.

There is also a drag select/on mechanism: if you click and hold the mouse down on a GrOb, then drag the cursor, the selected item changes as you drag. When you drag outside a selected graphic object it becomes unselected; when you drag over an unselected GrOb it becomes selected.

In order to perform a data direct manipulation (Data DM) operation (if it is active in your view), you must first select a graphic object. Then when you move the cursor over the GrOb's hot spots, Data DM cursor cueing appears. If you click and drag the mouse when this Data DM cursor cueing is active, you start a Data DM operation.

Note If you start a drag selection on a GrOb that is already selected, and if Data DM is active in the view, you must click outside the GrOb's Data DM hot spots. Otherwise clicking and dragging a selected object starts a Data DM. (You can tell that you are in Data DM mode by the Data DM cursor cueing that appears.)

Tab and arrow keys

In many view styles, the Tab and Shift-Tab keys affect the selection. Tab generally advances the selection to the next GrOb in the sort order. Shift-Tab moves the selection back to the previous item.

The arrow keys also move the selection in some view styles.

Example: Tree View lets you can use the up and down arrows to go up and down levels of the tree.

Not all view styles implement Tab or arrow keys. For those that do, the specific meaning of the keys depends on the view design.

+vfacility:2200 #VF_Selection $Selection $^K$GrObs; Selection; Tab keys; Arrow keys;

See also

| | |
|---|---|
| Gantt Tab Keys | Selection follows rows |
| Bar Chart Tab Keys | Selection follows bar segments |
| Table View Tab Keys | Selection follows rows |
| Image View Tab Keys | Selection follows placements |
| Tree Tab & Arrow Keys | Selection across & through tree levels |
| Network Tab Keys | Selection across node/arc levels |
| Data DM | Modify data via click-and-drag direct manipulation |
| Graphic Objects (GrObs) | Represent data items graphically |
| Commands | Special operations (Commands menu) |
| Sorting | Specify GrOb display sequence |

+#$K Legends

GrAF Legend windows provide a tabular mapping of the association between graphic object icons, colors, and font styles, and the data values they represent.

Legend Table

A legend table has a row for each possible data value. The left hand column shows the icons, colors, or font styles that can appear on the graphic object (GrOb). The right hand column shows the data value associated with each.

Example: If a GrOb label representing an airline flight has an icon in the center position associated with the flight's carrier, the legend table for the center icon shows each possible carrier name on the right and the icon representing it on the left.

Some GrOb styles have no dynamic associations. Their colors and icons are simply presentation design. In this case the Legend window has no legend table, but instead indicates "no dynamic attributes".

The Legend window title names the GrOb style currently displayed.

Window options

Legends menu lists the available legend tables.

Since a GrOb can have a number of different dynamic graphic attributes it can also have a number of legend tables. The current table is checked. Each item is named for the graphic attribute and set of values it maps. Selecting a different menu item makes that legend table current.

Example: A bar GrOb representing an employee may have its background color associated with the employee's service category, and may also have an icon in the center representing the employee's project. The Legend window's Legends menu then contains two items: Background rectangle Service Category, and Center Icon Project.

Accessing Legend windows

Each view's View menu contains a Legend menu item for each of its GrOb types.
> Example: Gantt View has a Bar Legend menu item for time duration bars, and also a Label Legend menu item for row labels.

Selecting a Legend menu item displays the appropriate Legend window. Unselecting the menu item closes the Legend window. You can also dismiss the Legend using its close box.

Legend window(s) can also be toggled using the keyboard accelerator Ctrl-L (or Ctrl-Shift-L if there are two GrOb types).
> Example: If no Bar Legend is visible in a Gantt View, Ctrl-L opens one, then Ctrl-L again closes it.

See also

| | |
|---|---|
| Graphic Objects (GrObs) | Represent data items graphically |
| Data Representation | Record types, fields, field types |

+facility:2500 #HT_Legend $Legends ^KLegend;

+#$^K Zooming

Zooming controls the amount of visible data and the level of visible detail. Most views support three zoom levels: Normal, Zoom 50%, and Fit All. Each view has one or more Zoom cascade menus (View menu) listing available zoom levels.
> Zoom Normal shows graphic objects (GrObs) at their maximum size and with the largest amount of visible detail. The normal size GrOb style variation is used for display.
>
> Zoom 50% shows GrObs at 50% of their maximum size. The small variation GrOb style is used for display, if one exists. Zoom 50% may show larger or smaller GrObs than Zoom to Fit, depending on the amount of data in the view.
>
> Fit All shows GrObs at whatever size is necessary to fit them all in the current window dimensions. The small GrOb style variation is used if zooming to fit creates a zoom level of 50% or more (when GrObs display at half their normal size or smaller). Otherwise the normal size GrOb style variation is used.
>
> When zoom to fit is active, resizing the view window can make GrObs larger or smaller. Adding or removing data items from the view may also cause the GrOb size to decrease or increase.

Depending on zoom level, some data items may not be visible in the current window dimensions. In this case, scrolling can be used to adjust the visible portion of the view to bring other items into the view area.

Specific mechanisms of zooming are determined by each view style.
> Example: Gantt View, which has rows of time duration bars, applies zooming only to the vertical dimension. The horizontal (time) dimension is controlled by the Gantt Scale factor.

See also

| | |
|---|---|
| Gantt Zooming | Zooming rows |
| Bar Chart Zooming | Zoom columns |
| Table Zooming | Row & column zooming |
| Image View Zooming | Control picture image size |
| Tree Zooming | Tree zooming & scrolling |
| Network Zooming | Zoom options & scrolling |
| Graphic Objects (GrObs) | Represent data items graphically |
| GrOb Styles | Alternate data item display styles |
| Scrolling | Adjust visible portion of view |

+vfacility:3100 #VF_Zoom $Zooming ^KZooming; Scrolling;

+#$^K Scrolling

Depending on the zoom level, some data item graphic objects (GrObs) may not be visible within the current window dimensions. When some GrObs are partially or completely out of view, scroll bars appear in the appropriate dimension (horizontal or vertical). In this case, scrolling can be used to adjust the visible portion of the view to bring other GrObs into the view area.

Specific details of horizontal and vertical scrolling depend on the view style.
> Example: Gantt View, which has rows of time duration bars, uses vertical scrolling to bring additional data rows into view, and uses horizontal scrolling to shift earlier or later time Intervals into view.

See also

| | |
|---|---|
| Gantt View Scaling | Adjusts the time scale in Gantt View |
| Time Scaling & Scrolling | Adjust Gantt time scale & interval |
| Bar Chart View Scaling | Adjusts the bar meter scale in Bar Chart View |
| Quantity Scaling & Scrolling | Adjust vertical Bar scale & interval |
| Graphic Objects (GrObs) | Represent data items graphically |
| Zooming | Control GrOb size & detail |

+vfacility:3200 #VF_Scroll $Scrolling ^KScrolling;

+#$ ^K Sorting

Sorting controls the order graphic objects (GrObs) appear in a view. Most view styles implement sorting (with the exception of Network View), although the sequence subject to sorting depends on the view style.
> Example: Sorting in Tree View applies across each tree level.

Applying a Sort Criterion

A sort criterion specifies one or more record fields to use in sorting data items. Data items in a view can be sorted according to any of the sort criteria appearing on the Sort cascade menu (View menu). The current sort criterion is indicated by a check mark. Ascending and Descending options appear below the sort criteria in the cascade menu. One of the two is always checked, indicating the current sort direction. Selecting a different sort criterion or direction from the cascade menu alters the sort order of data items represented in the current view, and refreshes the view display.

Sort Order

Sort order depends on the type of the data field subject to sorting and whether ascending or descending order is selected. Integer data fields are sorted according to numeric value. Text data fields are sorted alphabetically, according to the ASCII collating sequence. Enumeration type data fields are sorted according to the order of the set of constant data values.
> Example: If the enumeration type Project is defined for employee data as the set of constant data values {Management, Administration, Development, Sales, Training}, and an ascending sort on Project is selected, employees in management come first, followed by those in administration, development, sales then training.

Simple and Compound Sorts

Sort criteria can be simple, applying to a single data field, or compound, applying to a combination of record fields (up to a maximum of three).
> Example: Salary may be a simple numeric sort for employee data items. Carrier/Status may be a compound sort for airline flight data which sorts by flight Status value within Carrier groups. Status/-

Carder may also be a compound sort for airline flight data which sorts by Carrier within flight Status categories.

See also

| | |
|---|---|
| Gantt View Sorting | Row sorting |
| Column Sorting & Grouping | Sorting stacks & grouping |
| Image View Sorting | Orders tile stack labels |
| Tree View Sorting | Sort across tree levels |
| Filtering | Control the data subset displayed |
| Selection | Marking an item active for operation |
| Data Representation | Record types, fields, field types |

+vfacility:3300; #VF_Sort $Sorting $^K$Sorting; Sort order; Sort criterion; Compound sort;

+#$$^K$ Filtering

Filtering controls the subset of data items subject to display in a view. All view styles can provide filtering facilities if your application defines filters for its data.

Filters

Filters name one or more restrictions that data items must pass in order to be subject to display. The set of items satisfying the current filter is called the filter set.

Example: "Flights through DFW" filter might describe the subset of airline flight data items that either arrive in or depart from Dallas/Fort Worth airport. "Morning flights out of DFW" might describe the flights departing before noon from Dallas/Fort Worth airport.

Applying and removing Filters

Filters are normally found on the view's Filter cascade menu (View menu). The current filter is indicated in the list with a check mark. Selecting a different filter changes the data item subset displayed. (In the Network View style, filtering has a custom dialog supporting filters for both network arcs and nodes.)

When a filter is applied the view is redisplayed containing only the filter set, ordered according to the current sort criterion.

Selecting the Show All menu item at the bottom of the filter list removes any current filter and displays all applicable data items.

See also

| | |
|---|---|
| Image View Filtering | Implicit placement filtering |
| Tree Filtering | Filtering the hierarchy |
| Network Filtering | Arc/node filter options |
| Sorting | Specify GrOb display sequence |

+vfacility:3400 #VF_Filter $Filtering $^K$Filtering; Filters;

+#$$^K$ Finding Data Items

The Find facility allows you to select data items in a view from a search subset. The search subset is determined by the view's current filter and any additional find filter you may specify. The Find dialog is invoked via the Find menu item (Edit menu).

Dialog options

Search subset drop-down list contains the data items in the current search subset, named by their key values. When an item is chosen from the search subset dropdown list, its graphic object is scrolled into view (if necessary) and selected.

Tip Once an item is selected in the drop-down list, you can use the up and down arrow keys to move through all the items in the list, selecting each in the view.

Edit (or Show) button can be used to edit the selected item or to examine it in more detail.

Tip If you select a different item when the Edit/Show window is active, the Edit/Show window contents are updated to reflect the new selection.

Choose Filter button invokes the Choose Filter dialog, which allows you to specify a find filter to use in further limiting the search subset.

Close exits the Find dialog.

Specifying the Search Subset

When the Find dialog first comes up no find filter is active. The data items in the search subset are those satisfying the current view filter. This subset is described underneath the search subset drop-down.

Example: If there is no filter on a view of airline flight data, the search subset description might read "Flight ID. [38 data items]". The drop-down list would contain Flight IDs for all 38 know Flight data items. If the view filter were "Flights through DFW", the search subset description might read" . . . from the set of Flights through DFW [21/38]". The drop-down list would contain the 21 data items out of the set of 38 that pass the "Flights through DFW" filter.

In addition to the view's filter, you can apply a find filter to further limit the search subset. The items in the search subset must then pass both the view filter and the find filter. You specify a find filter via the Choose Filter dialog.

Example: If the current view filter is "Flights through DFW", and a find filter named "PM arrivals" is selected, the search subset description might read" . . . from the set of Flights through DFW AND PM arrivals [15/38]". The drop-down would contain the 15 flights through DFW that arrive in the afternoon.

See also

| | |
|---|---|
| Arc/Node Find | Finding Network items |
| Choose Filter | Specify filter for the Find operation |
| Filtering | Control the data subset displayed |
| Selection | Marking an item active for operation |
| Data Item Editor | Edit a data item |
| Data Item Display | Show a data item |

+vfacility:4100 #HTD_Find $Finding Data Items $^K$Find dialog; Find; Find filter; Search subset;

+#$$^K$ Choose Filter Dialog

The Choose Filter dialog allows you to specify a filter for use in Find operations. This find filter is combined with the current view filter (through a logical AND operation) to determine the search subset.

Dialog options

Filter drop-down list contains names of filters already defined for this record type. This list resembles the filter names on the view's Filter cascade menu. You can choose one of these existing filters, or define a temporary find filter of your own.

To remove a previously specified find filter, use the No Filter button.

Next Filter button selects the next filter name in the filter drop-down list. When you make a selection from the filter drop-down list the filter description appears in the Filter definition area.

Filter definition options allow you to define a temporary find filter. To define a filter you choose a record field (First Operand), an operator, and a data value (Second Operand).

Example: To define a find filter for airline flights with more than 100 passengers, the First Operand names the Passengers record field, the Operator is ">" and the Second Operand data value is 100. Or, to select only those flights whose status is not "ON TIME", the First Operand would be the Flight Status field, the operator ">", and the Second Operand value "ON TIME".

First Operand drop-down contains a list of record fields to choose from.

Operator lists the six relational operators to choose from (<, <=, <>, =, >, >=).

Second Operand box is for specifying data values. It acts as a text typein window if the selected record field's data type is text, integer, reference, or date/time. In this case you simply type in the desired match value. If the selected record field is an enumeration type, the Second Operand box is a drop-down list of the legal enumeration constant values, one of which can be selected from the list.

OK exits the dialog and returns to the Find dialog with the selected find filter in effect.

Cancel exits the dialog without selecting a find filter.

No Filter removes any previously selected find filter and exits the dialog.

See also

| Find | Locate data item GrObs |
|---|---|
| Filtering | Control the data subset displayed |
| Data Representation | Record types, fields, field types |

+vfacility:4200 #HTD_Filter_Choices $Choose Filter $^K$Find; Filters; Choose Filter; Find filter;

+#$K Commands

In many applications, a Commands menu appears in view windows or in the View Palette. Commands menus, if present, contain items which invoke various application-specific operations and actions. Showing details of a data item, showing a different view of the data, or bringing up a dialog to operate on a data item, are all examples of commands.

Commands menu items differ from view to view, and depend on your application.

In view windows, Commands menu items fall into two categories:

General commands are always active.

Example: A command that shows a Bar Chad View profile of employee salaries is a general command.

Data specific commands appear dimmed unless a data item is selected.

Example: A command to show details of an employee would only be applicable if an employee graphic object is selected.

If both data specific and general commands are provided, they are separated by a divider on the Commands menu, and data specific commands follow any general ones.

In the View Palette's Commands menu, only general commands appear, since data items do not appear in the View Palette.

Default action when double clicking on a GrOb

One of the data-item-specific operations on the Commands menu may be defined as the view's default action. This command is invoked when you double click on a data item's graphic object. The default action is marked on the Commands menu with a check mark.

See also

| Arc/Node Commands | Network arc & node commands |
|---|---|
| Selection | Marking an item active for operation |
| View Palette | Palette of iconized views |
| View Palette Menus | View Palette menu operations |
| View Menus | Common view style menu items |
| Graphic Objects (GrObs) | Represent data items graphically |

+vfacility:6500 #VF_Commands $Commands $^K$Commands; Commands menu; Default action;

+#$K Copy Image

The Copy Image menu item (View menu) copies a bitmap image of the view to the system clipboard. From there you can paste the bitmap into paint programs, word processors, and other applications that accept the bitmap format.

The view's bitmap image consists of the entire view area. Its dimensions contain all graphic objects subject to display, even those not currently visible because of zoom or scroll settings. This includes all data items in the current filter set.

See also

| Printing | Print view images |
|---|---|
| Graphic Objects (GrObs) | Represent data items graphically |
| Zooming | Control GrOb size & detail |
| Scrolling | Adjust visible portion of view |
| Filtering | Control the data subset displayed |

+vfacility:7100 #VF_Copying $Copy Image $^K$Copy Image; Clipboard;

+#$K Printing

The Print menu item (View menu) allows you to print views to any printer device supported by your system. The print dialog allows you to control print image layout on the page or pages.

The view's print image consists of the entire view area. Its dimensions contain all graphic objects subject to display, even those not currently visible because of zoom or scroll settings. This includes all data items in the current current filter set.

Print settings and target print device

The Print/Output Layout dialog allows you to control such familiar print settings as page margins, number of copies, and draft quality. A Setup button brings up printer-specific dialog(s) where additional settings such as page orientation and size can be specified.

The target print device is your system's current default printer. To use a different print device for output, you should change the system's default printer.

Page layout adjustment

The Print/Output Layout dialog also permits you to adjust the print image layout on the page or across pages. The Printable Output area displays a scale outline of the print page or pages with a rectangle bounding the area where the view's image will be printed. The presence of a grid of dotted lines indicates multiple pages. These page indicators appear when you adjust the image dimensions to span pages.

You can adjust the print image dimensions through direct manipulation. The entire bounding area can be moved around on the page(s) by clicking inside the rectangle and dragging. You can adjust the print width and height by clicking and dragging on the rectangle's side grabbers.

When the Keep Aspect Ratio option is selected in the Image Coordinates settings area (the default is on), the outline width and height automatically move in tandem as required to maintain width-to-height ratio. If Keep Aspect Ratio is not selected, print area width and height move independently.

Sizing the print image

When the Print dialog first comes up the print area is sized to represent the view's print image at a resolution of 300 dots per inch (dpi). The actual dimensions of this area (in inches, for instance) can be read in the Image Coordinates settings area.

Tip Print area dimensions are considerably smaller than the area occupied by the image on most display monitors (which have resolutions in the neighborhood of 72 dpi). Hence it is often desirable to increase the print area to produce a more readable image. A good rule of thumb is to increase the width of the print area by a factor of 2 to 3, while maintaining aspect ratio.
+vfacility:7200 #HTD_Print $Printing $^K$Printing;

Print image appearance

The print image appearance matches the display image appearance except for the view background color. In order to improve contrast among the printed graphic objects, the background color of the print image is always set to white. This normally will not affect the fidelity of the print image. However, if graphic objects use white text against the colored view background for contrast, the white text will not appear against the white print background. In such cases you should temporarily adjust the color scheme for printing, by selecting a different graphic object style, for example.

See also

| Print Error Conditions | Table of print error codes |
| --- | --- |
| Copy Image | Copy view image to clipboard |
| Graphic Objects (GrObs) | Represent data items graphically |
| GrOb Styles | Alternate data item display styles |
| Zooming | Control GrOb size & detail |
| Scrolling | Adjust visible portion of view |

+#$K Data Item Operations

GrAF provides a number of mechanisms for creating, modifying, and deleting data items. Each of these data item operation facilities may or may not be available in a particular view depending on application design.

Create, Edit, Delete menu Items

Views can provide Create, Edit, and Delete operations through menu items on the Edit menu. Applications that offer such facilities can do so either by using GrAF dialogs or by providing their own custom interfaces.

Editing data items can be done by using GrAF data item editors, customized for the data in specific views. Alternatively, an application may provide its own editing interface. Creating data items can also occur through the GrAF Create dialog, or through application-specific processing.

Data Direct Manipulation

In addition to Edit menu items, most view styles support the modification of some data value through direct click-an-drag interaction with graphic objects (data direct manipulation).

Example: Gantt View Data DM allows modification of start and end time data values.

See also

| Data DM | Modify data via click-and-drag direct manipulation |
| --- | --- |
| Create dialog | Create a data item |
| Data Item Editor | Edit a data item |
| Data Item Display | Show a data item |
| Delete | Delete a data item |
| Undo | Undo previous Data DM change |

+vfacility:8000 #VF_DataOps $Data Item Operations $^K$Data Item Operations;
+#$K Data Direct Manipulation Most view styles support the modification of one or more data values through data direct manipulation (Data DM), direct click-an-drag interaction with graphic objects.

Example: Gantt View allows modification of start and end time values through dragging the selected data item's time duration bar.

Data DM may or may not be enabled in a particular view, depending on application requirements.

In some views where Data DM is supported, an Undo facility may also be available on the Edit menu. Undo cancels the effect of the previous Data DM operation.

Data DM mechanics

In order to perform a data direct manipulation operation (if it is active in your view), you must first select a data item's graphic object (GrOb). When you move the cursor over the selected GrOb's hot spots, Data DM cursor cueing appears. If you then click and drag the mouse when this Data DM cursor cueing is active, you start a Data DM operation.

Note You generally click twice on an item to perform Data DM, once to select it and again to start the Data DM. If the view has a Commands menu with a default action defined, you must be careful not to click too fast. Otherwise it will look to the system like you are double clicking, which invokes the default action on the item.

Specific details of Data DM, such as the location of GrOb hot spots, and what occurs when you click and drag the cursor, depend on the view style.

See also

| Gantt Data DM | Change start & end times |
| --- | --- |
| Bar Chart Data DM | Change quantity value |
| Image View Data DM | Change location value |
| Tree View Data DM | Change parent relationship |
| Network Data DM | Create/change nodes, arcs, connections |
| Data Item Operations | Create, Edit, Delete, Undo, etc. |
| Undo | Undo previous Data DM change |
| Selection | Marking an item active for operation |
| Commands | Special operations (Commands menu) |

+vfacility:8100 #VF_DataDM $Data Direct Manipulation (Data DM) $^K$Data DM; Data Item Operations;
+#$K Undo In some views where data direct manipulation (Data DM) is supposed to change data values through click-and-drag interaction with graphic objects, an Undo facility may also be available on the Edit menu. Undo cancels the effect of the previous Data DM operation.

Multiple levels of Undo are possible. Each time you invoke Undo it cancels an earlier Data DM operation. When there are no earlier operations remaining the menu item becomes dimmed.

Undo does not affectany changes made through the Create, Edit, or Delete operations on the Edit menu.

See also

| Data Item Operations | Create, Edit, Delete, Undo, etc. |
| --- | --- |

| Data DM | Modify data via click-and-drag direct manipulation |
|---|---|

⁺vfacility:8200 #VF_Undo $Undo ᴷUndo; Data Item Operations;

+#$ᴷ Data Item Editor

Data item editors am windows containing menu items which can be used to change data item field values. The mechanism for editing depends on the data type of the field.

The Data Item Editor title displays information identifying the item being edited, and the display area may contain additional details.

Editor window

You can move and resize a data item editor as with any window. Since the data item editor is not a subordinate window, it can be positioned outside the bounds of the view it belongs to. Changes you make to its position and size are remembered while your application is running.

The editor can be dismissed using its close box. If the view it belongs to is closed or minimized, so is the data item editor.

Tip Even when the data item editor is the active window, you can still use keystroke accelerators for the underlying view, such as Tab and Shift-Tab for changing the selection, and Ctrl-L for invoking Legends.

If you change the selected item when a data item editor is visible (by clicking on another graphic object, or using the Tab key, for example), the editor window contents are refreshed to reflect the new selection. If a field editing dialog is active when the selection changes, that edit dialog is cancelled without making any changes.

Window options

Menus Clicking on a menu invokes a data dependent field editor, such as a typein box or a pull down menu.

When you make a change using a field editor, the corresponding data item value is changed immediately. The data item editor itself is a true window, not a dialog with confirm and cancel options.

Editing text fields invokes a typein box. Input may be up to 1024 characters of unstructured text (no validation is performed). The text typein box contains a Multiple Lines button which expands the typein area for lengthy input.

Editing Integer fields invokes a typein box. Input should consist of an integer, with or without a leading minus sign. A warning dialog appears if the input is not valid.

Editing date/time fields invokes a typein box. Legal Date/time values depend on the date and time formats required by your system. Month, day, and year must be present. Hours, minutes and seconds are optional, but if hours are specified, minutes must be specified also.

Example: If your system date format is MM/DD/YY and your time format is HH:MM:SS, Date/Time values must be in the form MM/DD/YY [HH:MM:[SS]] where [] indicate optional components. Examples of valid date/time data in this format include: 02/10/93, 02/10/93 14:28, and 02/10/92 14:28:02.

If date/time input data is not in an appropriate form a warning dialog appears.

Editing enumeration type fields usually drops down a menu of the legal data values. The current value, if any, is checked on the list. If the set of legal constants is large, a drop-down list box appears instead, with the current value showing in the value window.

⁺vfacility:8300 #ᴴᵀ_Edit_Box $Data Item Editor ᴷData Item Editor; Edit; Data Item Operations;

Editing reference fields invokes a drop-down list. The list contains data items of the referenced record type, named by their key values.

Filtering and sorting considerations for edited data items

The graphic object(s) representing an edited data item remain in the view provided that they still pass any current filter in effect. This includes explicit filters found on the Filter menu, but can also depend on implicit filtering, such as whether a placement is defined for the item's location category in an Image View, or whether it qualifies as an orphan in a Network View which has Show Orphans disabled.

Example: If the current filter is "Flights departing DFW", and a flight is edited to depart from ORD instead of DFW, its graphic objects (GrObs) will be removed from the view. Additionally, if the flight's Gate value changes from 20 to 21 in an Image View containing placements only for flight gates 1-20, its Label GrOb is removed from the view (even if the flight departs from DFW).

Even if an item is removed from the view (because of editing changes affecting its filter status), the data item editor still displays the item's information until you make another selection in the view.

When a data item field used in the current sore:criterion is changed, its GrObs are not automatically sorted. The current sort criterion must be re-selected from the Sort cascade menu to update the sort order. Other display options, such as merging (Gantt View), stacking (Bar Chart View), and categorization (Tree View) may also need to be reselected after a data item is edited.

Accessing Data Item Editors

Depending on your application, an Edit menu item may exist on a view's Edit menu. If present, this item can invoke a data item editor on the selected item. (The Edit menu item is dimmed unless a graphic object is selected.) You may also have access to Edit facilities through your Find or Create dialogs.

You can also invoke editing facilities by selecting a graphic object and using the keyboard accelerator ENTER, in views that support editing. A mouse-only access method also exists. After selecting a graphic object, left click and hold, then right click.

Some applications provide their own editing interface tied to the Edit menu item. In this case the editing process is entirely application dependent.

See also

| | |
|---|---|
| Data Representation | Record types, fields, field types |
| Data Item Operations | Create, Edit, Delete, Undo, etc. |
| Create dialog | Create a data item |
| Data Item Display | Show a data item |
| Delete | Delete a data item |
| Sorting | Specify GrOb display sequence |
| Filtering | Control the data subset displayed |
| Selection | Marking an item active for operation |
| Gantt View Merging | Combine related items into rows |
| Column Stacks | Bar Chart category stacks |
| Relationship/Category Trees | Tree View display styles |
| Arc/Node Editing | Editing Network arcs & nodes |

+#$ᴷ Data Item Display

Data item display windows appear much like data item editor windows, but without field editing capabilities. The window title displays information identifying the data item, and the display area may contain additional details.

You can move and resize a data item display window as with any window, and it can be dismissed using its close box.

If you change the selected item when a data item display window is visible (by clicking on another graphic object, or using the Tab key, for example), the data item display window contents are refreshed to reflect the new selection.

Accessing Data Item Display windows

Depending on your application, a Show menu item may exist on a view's Edit menu. If present, this item invokes a data item display window on the selected item. (The Show menu item is dimmed unless a graphic object is selected.) You may also have access to Show facilities through your Find or Create dialogs.

See also

| | |
|---|---|
| Show Arcs/Nodes | Show for nework arcs & nodes |
| Data Item Operations | Create, Edit, Delete, Undo, etc. |
| Data Item Editor | Edit a data item |
| Create dialog | Create a data item |
| Find | Locate data item GrObs |
| Selection | Marking an item active for operation |

+vfacility:8400 #$^{HT}$_Show_Box $Data Item Display Windows $^K$Data item Display window; Show; Data Item Operations;

+#$K Create Dialog

The Create dialog lets you create new data items, allowing you to provide a key value and other initialization options.

Dialog options

Typein area lets you enter a key field value for the new data item. If no key value is input, one will be automatically generated.

Create button creates a new data item with all field values uninitialized.

Create+Copy creates a new item with all field values (except the key field) matching the selected item in the Copy Source drop-down list.

Copy Source drop-down list consists of all data items of the creation record type, named by their key values. If a data item was selected when the Create dialog was invoked, it appears as the default Copy Source.

Details lets you display field name/value pairs for the source data item before using it as a Copy Source. The Details button is active when there is a highlighted item in the Copy Source drop-down.

Edit or Show After creating a new data item you can use this button to invoke a data item editor (Edit) or display window (Show) for the new item.

Close exits the Create dialog.

Filtering and sorting considerations for new data items

Graphic object(s) for the new data item will appear in the view only if they pass any current filter in effect. This includes explicit filters found on the Filter menu, but can also depend on implicit filtering, such as whether a placement is defined for the item's location category in an Image View, or whether it qualifies as an orphan in a Network View which has Show Orphans disabled.

Example: If the current filter is "Flights departing DFW", and a newly created airline flight does not have DFW as its From City, no graphic objects (GrObs) will appear representing the new item. Additionally, if the flight is created in an Image View containing placements for flight gates 1–20, and the new flight's Gate value is 21, no Label GrOb is displayed (even if the flight departs DFW).

New data items are not automatically sorted. The current sort criterion must be re-selected from the Sort cascade menu to update the sort order.

Accessing the Create dialog

Depending on your application, a Create menu item may exist on a view's Edit menu. If present, this item can invoke the Create dialog.

Some applications provide their own data item creation interface tied to the Create menu item. In this case the create process is entirely application dependent.

+vfacility:8500 #HTD_Create_Inst $Create Dialog $^K$Create dialog; Create; Copy source; Data Item Operations;

See also

| | |
|---|---|
| Network Create options | Create arcs & nodes |
| Data Item Operations | Create, Edit, Delete, Undo, etc. |
| Data Item Editor | Edit a data item |
| Data Item Display | Show a data item |
| Delete | Delete a data item |
| Sorting | Specify GrOb display sequence |
| Filtering | Control the data subset displayed |
| Selection | Marking an item active for operation |

+#$K Deleting Data Items

Many applications allow you to delete data items. Deleting a data item generally brings up a confirm dialog, or an application-specific delete utility of some type. When a data item is successfully deleted, its graphic object(s) are removed from the view.

The Delete menu item (Edit menu)

Views provide deletion facilities through the Delete menu item (Edit menu). If present, this item is dimmed unless a graphic object is selected in the view, since the delete operation applies to a specific data item.

See also

| | |
|---|---|
| Data Item Operations | Create, Edit, Delete, Undo, etc. |
| Selection | Marking an item active for operation |

+vfacility:8600 #HTD_Delete_Inst $Deleting Data Items $^K$Delete; Data Item Operations;

+#$K Gantt View Style

Gantt View provides a visualization style for data items with a time duration (a start time and an end time). Gantt View is typically used to present schedule information, such as vacation schedules, project schedules, and so forth.

Each data item is represented by two graphic objects: a time duration bar and a row label. A Gantt View row may display a single data item, or multiple items can be merged in a single row, based on some common characteristic.

| | |
|---|---|
| Gantt View GrObs | Time duration bars & row labels |
| Time Scaling & Scrolling | Adjust time scale & interval |
| Gantt Scrolling Metrics | Control time period |
| Gantt Zooming | Zooming rows |
| Merging | Combine related items into rows |
| Gantt View Sorting | Row sorting |
| Gantt Tab Keys | Selection follows rows |
| Gantt Data DM | Change start & end times |

See also

| Visualization Facilities | Features common to all view styles |
|---|---|

+gantt:1000 #HT_Gantt $Gantt View Style ^KGantt View;View Styles;
+#$K Gantt View Bars and Labels In a Gantt View, each application data item is represented by two graphic objects (GrObs): a time duration bar and a row label. A Gantt View row may display a single data item, or multiple items can be merged in a single row, based on some common characteristic.

Time duration bars and row labels

Time duration bars appear in the time display area, the window region underneath the time scale and to the right of the row label column. A bar's left edge indicates the start of the data item's time duration and its right edge marks the finish time. The width of the bar thus indicates the total time span.

The row label always appears at the far left of a row. It often contains information which identifies the data item. Row labels remain visible even when the time display area contents change through time scrolling.

The Time Scale

Time duration values can be read using the time scale at the top of the Gantt View window. This scale is adjustable through direct manipulation and via the Gantt Scrolling Metrics dialog.

Row Merging

Normally one row in Gantt View contains a row label and a time duration bar for one data item. However if merging has been used on rows, several data items my occupy one row. In this case multiple bars may be visible in one row, and the row label follows the selected bar.

See also

| Time Scaling & Scrolling | Adjust time scale & interval |
|---|---|
| Gantt Scrolling Metrics | Control time period |
| Merging | Combine related items into rows |
| Graphic Objects (GrObs) | Represent data items graphically |

+gantt:1100 #Gnt_GrObs $Gantt View Bars and Labels ^KGantt View; GrObs; Bars; Labels;
+#$K Gantt View Time Scrolling and Scaling At the top of the Gantt View window a time scale appears, marked with notches and text showing the current time units, such as months, days, or hours. The visible portion of the time line indicates the current time period in view.

Time Scrolling

Data items whose time spans fall in the current time period are visible in the time display area underneath the time scale. Earlier time periods can be viewed by scrolling left; later time periods by scrolling right.

Example: The time scale may indicate you are looking at the time period March 1992 to September 1992 in time units of months. Data items with time spans starting and/or ending between March and September 1992 would be wholly or partially visible in the time display area. Data items ending in February 1992 could be viewed by scrolling to the left. Data items starting in October 1992 could be viewed by scrolling to the right.

When a Gantt View first comes up, a computed time interval based on the data values is used to set the horizontal scroll bar range. This initial time interval is accessible by dragging the scroll bar thumb control from leftmost to rightmost. In other kinds of scrolling, when the thumb is all the way to the left or right, no further scrolling can occur. However in time scrolling, you can further "extend" the accessible time interval by clicking on the left or right scroll bar arrow button when the thumb is up against it.

You can also adjust the time period through the Gantt Scrolling Metrics dialog.

Time Scaling

The current time units can be changed by adjusting the time scale through direct manipulation. First click on the time scale. Notice the background color changes to white and cursor appearance changes to the scale cursor. Now clicking and dragging right or left changes the time scale units.

To see a finer time granularity (hours instead of days, for example), drag the scale to the right after scale cursor cueing appears.

To see a coarser time granularity (years instead of months, for example), drag the scale to the left after cursor cueing appears.

See also

| Gantt Scrolling Metrics | Control time period |
|---|---|
| Gantt Zooming | Zooming rows |
| Scrolling | Adjust visible portion of view |

+gantt:1300 #Gnt_Scale $Gantt View Time Scrolling & Scaling ^KGantt View; Time Scale; Time Scaling; Scaling; Time Scrolling; Scrolling; DM;
+#$K Gantt Scrolling Metrics Gantt View's Scrolling Metrics dialog lets you control the time period displayed. The dialog is invoked via the Scrolling menu item (View menu).

Tip You can also adjust the time scale interval and units through a combination of time scrolling and time scaling.

Dialog options

Scan Data If you select Scan Data, Gantt View automatically displays an appropriate time interval based on the time duration values of the data when the view is first opened. (You can later adjust the time interval and units through time scrolling and scaling.)

Example: For a Gantt View displaying one day's worth of airline flight information, the Scan Data time interval would be about a day and the time units would be hours. For an employee winter vacation schedule, the time interval might be 3 months and the units weeks or days.

Constant Interval lets you specify the time interval you want to see. The interval defaults to the data's entire time span.

Example: You can choose to view the portion of a winter vacation schedule between Dec. 15, 1992 and Jan. 1, 1992, even though the data spans a longer time interval.

From typein field lets you enter the start of the constant time interval.

To typein field lets you enter the end of the constant time interval.

Legal Date/Time values depend on the date and time formats required by your system. Month, day, and year must be present. Hours, minutes and seconds are optional, but if hours are specified, minutes must be specified also.

Example: If your system date format is MM/DD/YY and your time format is HH:MM:SS, Date/Time values must be in the form MM/DD/YY

[HH:MM:[SS]] where [] indicate optional components.

OK exits the dialog and redisplays the view using the selected options.

Cancel exits the dialog without any changes.

See also

| Time Scaling & Scrolling | Adjust time scale & interval |
|---|---|
| Scrolling | Adjust visible portion of view |

+gantt:1400 #HTD_Gnt_Scrolling $Gantt Scrolling Metrics ^KGantt View; Time Scale; Time Scaling; Scaling; Scrolling;

+#$K Gantt View Zooming

Since the time scale settings determine Gantt View's horizontal characteristics, zooming affects only the vertical dimension.

Gantt View's Zoom 50% and Fit all rows menu items apply to row heights in the display (not width). If zooming is normal or 50%, and all rows do not fit in the time display area height, a vertical scroll bar appears. Zooming to Fit all rows removes the vertical scroll bar.

Zooming does not affect the horizontal scroll bar, which controls the time period.

See also

| Time Scaling & Scrolling | Adjust time scale & interval |
|---|---|
| Zooming | Control GrOb size & detail |
| Scrolling | Adjust visible portion of view |

+gantt:1450 #Gnt_Zoom $Gantt View Zooming ^KGantt View; Zooming; Scrolling;

+#$K Merging Gantt View Rows

Gantt View's Merge facility lets you combine data items sharing some common characteristic onto one row of the Gantt chart.

Example: In a Gantt View of airline flight data, merging on Carrier would display all flights offered by each carrier on a row. Then, in addition to showing the individual flight intervals, the merged bars show graphically what hours of the day the carrier's planes are in the air.

Merging and unmerging rows

The Merge cascade menu (View menu) lists data item characteristics you can use for merging. The current merge field (if any) is indicated by a check mark. Selecting a menu item applies the merge characteristic.

To unmerge rows, remove the current merge characteristic by again choosing the checked menu item.

Merged row appearance

Time duration bars in merged rows overlap if they share a time span. When an item in a merged row is selected its time duration bar is drawn "on top" of any others while the selection is active.

While there may be several time duration bars visible in a row, only one row label is displayed. The label reflects either the first item in the row's sort order (if there is no selection in the row) or the selected item.

When rows are merged, the current sort criterion is applied to data after they are merged. The resulting sod order establishes the sequence followed by the Tab and Shift-Tab keys and also determines which graphic object will be "on top" in the case of overlapping time spans (in the absence of a selection).

See also

| Gantt View GrObs | Time duration bars & row labels |
|---|---|
| Gantt Tab Keys | Selection follows rows |
| Sorting | Specify GrOb display sequence |
| Selection | Marking an item active for operation |

+gantt:1500 #Gnt_Merge $Merging Gantt View Rows ^KGantt View; Merging;

+#$K Gantt View Sorting

Sorting in a Gantt View determines the order of rows when no merging is in effect.

When rows are merged, the current sort criterion is applied to data after they are merged. Sort order establishes the sort sequence followed by the Tab and Shift-Tab keys and also determines which graphic object will be "on top" in the case of overlapping time spans (in the absence of a selection).

Note that sort order within a merged row does not determine the placement of bars in merged rows. That is based on their time spans.

Example: If airline flights are merged on Carrier and the current sort is flight number (ascending), flights with lower numbers come before higher numbered ones in the sort order. Tabbing across a row will first select the lowest numbered flight then advance to higher numbered ones. However the leftmost time duration bar in a row still represents the flight with the earliest departure.

While there may be several time duration bars visible in a row, only one row label is displayed. The label reflects either the first item in the row's sort sequence (if there is no selection in the row) or the selected item.

See also

| Merging | Combine related items into rows |
|---|---|
| Gantt View GrObs | Time duration bars & row labels |
| Sorting | Specify GrOb display sequence |
| Selection | Marking an item active for operation |

+gantt:1550 #Gnt_Sort $Gantt View Sorting ^KGantt View; Sorting;

+#$K Tab Keys in Gantt View

You can use the Tab and Shift-Tab keys to move the selection forward or backwards, following the current sort order.

If rows are not merged. Tab advances the selection to the next row and Shift-Tab moves selection back to the previous row.

When rows are merged, Tab advances the selection across the items in a row, following the current sort order. When the end of a row is reached the selection goes to the next row. Shift-Tab moves the selection backwards in a similar fashion.

See also

| Gantt View Sorting | Row sorting |
|---|---|
| Merging | Combine related items into rows |
| Sorting | Specify GrOb display sequence |
| Selection | Marking an item active for operation |

+gantt:1600 #Gnt_Tab $Tab Keys in Gantt View ^KGantt View; Tab keys;

+#$K Gantt View Data Direct Manipulation

Data direct manipulation (Data DM) in Gantt View allows you to change a data item's start-time, its end time, or its time span by clicking and dragging the time duration bar.

Data DM may or may not be enabled in a particular Gantt View, depending on your application.

Cursor cueing

The first step in Data DM is to select the time duration bar. Often you will see grabbers appear in the center and at the ends of the bar when it is selected. These grabbers mark the hot spots for Data DM. When your cursor moves over one of the hot spots, its appearance changes to one of the Data DM cursors, indicating that you can now perform Data DM operations.

Changing a start or end time

To change a data item's start time, click on its time duration bar to select it. When you move the cursor over the left end of the bar it changes to the Data DM left arrow. Now clicking and dragging the left part of the bar changes the start time. Dragging to the left moves the start time earlier; dragging it right moves it later. Changing the end time is similar, except you will see the Data DM right arrow for cursor cueing.

Changing time span

To change a data item's time span (both the start and end time simultaneously), click on the item's time duration bar to select it. When you move over the center of the bar, Data DM left/right arrow cursor cueing appears. Now clicking and dragging the center of the bar changes the time span. Dragging to the left gives an earlier time span; to the right a later one.

See also

| | |
|---|---|
| Gantt View GrObs | Time duration bars & row labels |
| Data DM | Modify data via click-and-drag direct manipulation |
| Undo | Undo previous Data DM change |
| Selection | Marking an item active for operation |

+gantt:1700 #Gnt_DM $Gantt View Data DM <sup>K</sup>Gantt View; Data DM;

+#$K Bar Chart View Style

The Bar Chart View style represents data quantitatively in bar columns. You can use Bar Charts to compare individual data items (one data item per bar column) or combine related data segments into stacks to provide category comparisons.

A data item is represented by a bar segment and a column label. The bar segment can either be proportional in height to some integer-valued property of the data item (Value mede) or be of uniform height (Count mede). In count mode, bar segments are stacked to total data items by category.

| Bar Chart View topics | |
|---|---|
| Bar Chart GrObs | Value bars, count bars, and labels |
| Quantity Scaling & Scrolling | Adjust vertical scale & interval |
| Bar Chart Scrolling Metrics | Control meter scale |
| Bar Chart Zooming | Zoom columns |
| Column Stacks | Aggregate items by category |
| Column Sorting & Grouping | Sorting stacks & grouping |
| Bar Chart Tab Keys | Selection follows bar segments |
| Bar Chart Data DM | Change quantity value |

See also

| | |
|---|---|
| Visualization Facilities | Features common to all view styles |

+bar:1000 #HT_Bar $Bar Chart View Style <sup>K</sup>Bar Chart View; View Styles;

+#$K Value Bars, Count Bars, and Labels Count Bars; Count Stack;

Each Bar Chart View data item is represented by two graphic objects (GrObs): a bar segment and a column label. Bar Chart offers two display medes for bar segments: Value bars and Count bars. Value bars are proportional in height to some integer-valued property of the data item. Count bars are of uniform height and are stacked to total data items by category.

Value bars and Count bars

Value bars represent integer quantities in proportional columns.

> Example: For employee data items a with salary field, the height of each value bar is proportional to the employee's salary.

In count bar mode, each data item displays as one uniform-size column segment. Stacking is used to accumulate related items into columns for category comparisons.

> Example: Count bar stacks might profile all employees by job type. A "Manager" count stack would have one segment for each manager; its height would indicate the total number of managers in the organization.

You can tell if you are looking at count bars or value bars in one of two ways. If the bar segments you see am all of uniform height, they am probably count bars if they are of different heights they are value bars. Also, if the Count Stack menu item at the bottom of the Stack cascade menu (View menu) is absent, or if it is present and checked, the view is in count bar mede.

Toggling between Value bars and Count bars

Bar Charts often support both value bar and count bar medes, using the Count Stack menu item to toggle between them (Stack cascade menu, View menu). However, the Count Stack menu item is not present if the Bar Chad does not represent some integer value of the data items. In such charts the display is always in count bar mode and cannot be toggled to value bar mode.

> Example: If an employee data item consists of just a name field and a project assignment, a Bar Chart representing employees could display count stacks of employee by project, but could not toggle to value bar mode for the data. If employee data also included an integer valued salary field, employee salaries could then be represented by value bars.

Column stacks

Value bars may be viewed either stacked or unstacked. When unstacked (one data item per column), the height of the column represents the data item's integer value.

> Example: For value bars representing airline flight passenger counts, each column shows the passenger count for a single flight.

When value bars are stacked (multiple data items in a column), the column height represents the total value of all stacked data items.

> Example: If value bars representing aiding flight passenger counts are stacked by Carrier, the column height represents the total passenger count for all the carrier's flights.

+bar:1100 #Bar_GrObs $Value Bars, Count Bars and Labels <sup>K</sup>Bar Chart View; GrObs; Bars; Bar Segments; Column Labels; Labels; Value Bars;

Column labels

Each data item has an associated label. When no stacking is in force, each column represents a data item, with a bar segment and a label for that item. When columns are stacked, the column label represents either the selected data item, or the first data item in the column's sort order (the bottom bar segment) if there is no selection.

See also

| | |
|---|---|
| Column Stacks | Aggregate items by category |
| Column Sorting & Grouping | Sorting stacks & grouping |
| Quantity Scaling & Scrolling | Adjust vertical scale & interval |
| Graphic Objects (GrObs) | Represent data items graphically |

+#$K Bar Chart Quantity Scaling and Scrolling DM;

The vertical axis in Bar Charts represents quantity, either integer value quantities or count totals. The current quantity scale and interval are visible on the meter scale, which appears when you click on the view's background outside any graphic object. The meter scale further divides the vertical area with short hatch marks and numbers indicating quantity values (such as 5, 10, 15, 20, or 1000, 2000, 3000, 4000).

Scrolling the quantity interval

Vertical scrolling may be enabled when one or more columns extends above the column display area or below the column base line. When present, the vertical scroll bar can be used to adjust the visible portion of the bar columns up or down.

When the vertical scroll bar is visible, a computed quantity interval based on the column heights is used to set the vertical scroll bar range. This quantity interval is accessible by dragging the scroll bar thumb control from top to bottom. In other kinds of scrolling, when the thumb is all the way to the top or bottom, no further scrolling can occur. However in quantity scrolling, you can further "extend" the accessible quantity interval by clicking on the up or down scroll bar arrow button when the thumb is up against it.

> Note If the "Lock vertical scale" check box in the Scrolling Metrics dialog is selected, the vertical scroll bar will not appear even though portions of columns may extend above or below the column display area, You can turn on the vertical scroll bar in this situation by unchecking "Lock vertical scale" in the Scrolling Metrics dialog.

Adjusting the Meter Scale

If scale adjustments are enabled, the current quantity granularity can be changed through direct manipulation. First click on the Bar Chart background outside any graphic object in order to display the meter scale. When you move over the meter's vertical axis, cursor appearance changes to the meter scale cursor. This cursor cueing indicates you can now adjust the quantity granularity.

To see a finer quantity granularity (single units instead of fives, for example), click and drag the meter scale upwards. This stretches out the bar columns.

To see a coarser quantity granularity (hundreds instead of twenties, for example), click and drag the meter scale downwards. This compresses the bar columns.

The meter scale can also be adjusted through the Bar Chart Scrolling Metrics dialog.

> Note Meter scale cursor cueing does not occur if scale adjustments have been disabled by checking the "Lock vertical scale" item in the Scrolling Metrics dialog. You can enable scale adjustments by unchecking that choice.

The Meter Scale for Value and Count Bars

The units displayed on the meter scale units depend on whether you are viewing value bars or count stacks. When you are displaying value bars, if there is only one value bar per column (no stacking), meter units measure the quantity value of each data items. When value bars are stacked, the column height is the total quantity value for all data items in the stack.

When count stacks are displayed, the meter units simply count the number of items in the column.

+bar:1300 #Bar__Scale $Bar Chart Scaling and Scrolling $^K$Bar Chart View; Meter Scale; Quantity Scrolling; Scrolling; Quantity Scaling; Scaling;

See also

| | |
|---|---|
| Bar Chart Scrolling Metrics | Control meter scale |
| Bar Chart Zooming | Zoom columns |
| Column Stacks | Aggregate items by category |
| Scrolling | Adjust visible portion of view |

+#$K Bar Chart Scrolling Metrics

The Bar Chart Scrolling Metrics dialog allows you to control the quantity interval represented along the vertical axis and whether vertical scale adjustment is enabled. The dialog is invoked via the Scrolling menu item (View menu).

The current quantity scale interval and units are visible on the meter scale, which appears when you click on the view's background outside any graphic object.

Tip You can also adjust the quantity scale interval and units through a combination of quantity scrolling and quantity scaling.

Dialog options

Value Interval options provide two methods for specifying the quantity interval: Scan Data and Constant Interval. Whichever method is chosen, you can directly adjust the quantity interval later via quantity scrolling and scaling (unless you have disabled them via the Lock vertical scale option).

Scan Data If you choose Scan Data, the quantity interval is determined by scanning for maximum and minimum quantity values.

In value bar mode, the Scan Data interval is computed by finding the largest and smallest integer value quantities (or totals, if bars are stacked). In count stack mode it is based on the height of the tallest column stack.

Reset margins to 10% automatically leaves a margin above the tallest column of about 10% of the tallest column's height. If you check this option, you cannot specify margins explicitly via the top margin and bottom margin typein fields.

Top margin typein field lets you specify the number of logical points to leave above the tallest column (as a positive integer). The default value is the current top margin. This option is active only if you have not chosen Reset margins to 10%.

Bottom margin typein field lets you specify the number of logical points to leave below the minimum column value (as a positive integer). The default value is the current bottom margin. This option is active only if you have not chosen Reset margins to 10%.

Constant Interval The quantity interval is determined by the values entered in the maximum and minimum typein fields.

Maximum specifies the highest interval value. It defaults to the maximum value determined by scanning the data.

Minimum specifies the lowest interval value. It defaults to the minimum value determined by scanning the data.

Lock vertical scale When checked, quantity interval adjustments via direct manipulation of the meter scale are disabled, and the vertical scroll bar does not appear.

To enable direct scale adjustments and vertical scrolling, uncheck this option.

OK exits the dialog and redisplays the view using the selected options.

Cancel exits the dialog without any changes.

+bar:1400 #HTD_Bar_Scrolling $Bar View Scrolling Metrics $^K$Bar Chart View; Meter Scale; Quantity Scaling; Scaling; Scrolling;

See also

| | |
|---|---|
| Quantity Scaling & Scrolling | Adjust vertical scale & interval |
| Column Stacks | Aggregate items by category |
| Scrolling | Adjust visible portion of view |

+#$K Bar Chart Zooming

Since the quantity scale settings determine Bar Chart View's vertical characteristics, zooming affects only the horizontal dimension.

Bar Chart's Zoom 50% and Fit all columns menu items apply to bar column width in the display (not height). If zooming is normal or 50%, and all bar columns do not fit in the current display area width, a horizontal scroll bar appears. Zooming to Fit all columns removes the horizontal scroll bar.

Zooming does not affect the vertical scroll bar which controls the quantity interval displayed.

See also

| | |
|---|---|
| Quantity Scaling & Scrolling | Adjust vertical scale & interval |
| Zooming | Control GrOb size & detail |
| Scrolling | Adjust visible portion of view |

+bar:1450 +#Bar_Zoom $Bar Chart Zooming $^K$Bar Chart View; Zooming; Scrolling;

+#$K Column Stacks

The Stack facility lets you combine Bar Chart data items sharing some common characteristic into one column.

Example: In a Bar Chart of airline flight data, stacking by Carrier displays one column for each carrier having any flights. Each column stack contains bar segments for all of the carrier's flights.

Stacking and Unstacking Columns

The Stack cascade menu (View menu) lists data item characteristics that you can use for stacking. The current stack field (if any) is indicated by a check mark. Selecting a menu item creates stacks based on that characteristic.

To unstack columns, remove the current stack characteristic by again choosing the checked menu item.

Toggling between count stacks and value stacks

The Count Stack menu item on the Stack cascade menu (View menu) lets you toggle between value bars and count bars. If the Count Stack menu item is present and checked, the display is in count bar mode. To toggle to value bar mode, unselect the Count Stack menu item. If the Count Stack menu item is absent, or if it is present but not checked, you are looking at value bars. To toggle to count stack mode, select the Count Stack menu item, if it is present.

The Count Stack menu item is not present on the Stack cascade menu if the Bar Chart View does not represent some integer value field of the data items. In this case you are always looking at count bars and cannot toggle to value bar mode.

Example: If an employee data item consists of just a name field and a project assignment, a Bar Chart representing employees could display count stacks of employee by project, but could not toggle to value bar mode for the data. If employee data also included an integer valued salary field, employee salaries could then be represented by value bars.

Sort Order in Column Stacks

The current sort criterion is applied to data items after they are stacked. For an ascending sort, items with lower sort value appear at the bottom of a stack, followed by items with higher sort values on top. (See Bar Sorting & Grouping for more information on sorting in stacked columns.)

Example: If airline flights are stacked by ETD (ascending), each carriers flights are stacked from earliest at the bottom to latest at the top.

Visualizing subtotals in column stacks

By choosing a sort criterion and a bar style that complement one another you can produce column stacks with layers that convey subtotal information graphically.

Example: Suppose aiding flight data items are Stacked according to Carrier and sorted by Flight Status (ascending) where Flight Status can be one of the ordered set of enumeration values {ON TIME, DELAYED, CANCELLED}. A carrier's on time flights would be stacked first in the column, followed by the delayed flights, then cancelled flights. If the current bar style represents flight status with colors ON TIME=green, DELAYED=yellow, CANCELLED=red, you will see layers composed of green, yellow and red segments in the carrier columns. If you are looking at count bars, the relative proportion of the layers tells you graphically how many flights fall into each status category for a carrier. If you are looking at value bars representing the passenger count for each flight, the relative proportion of the layers indicates graphically how many passengers are on time, delayed, and on cancelled flights.

Column stack labels

While there may be several bar segments in a column, only one column label is displayed. The label reflects either the first data item in the column's sort sequence (if there is no selection in the column) or the selected item.

Stacked Column appearance

Each bar segment in a column stack represents a data item. The height of the column conveys different meaning, depending on whether value bars or count bars are displayed.

In value bar display mode, the height of each bar segment is proportional to some integer-valued property of the data item, such as an airline flight's passenger count. The column height then represents the total value of all the data items in the stack.

Example: If value bars representing airline flight passenger counts are stacked by Carrier, each column's height represents the total passenger count for all a carrier's flights.

In count stack mode, each bar segment is of uniform size, and column height counts the number of data items in the stack category.

Example: The height of a column of airline flights stacked by Carrier represents the total number of flights by that carrier.

See also

| | |
|---|---|
| Bar Chart GrObs | Value bars, count bars, and labels |
| Column Sorting & Grouping | Sorting stacks & grouping |

-continued

| | |
|---|---|
| GrOb Styles | Alternate data item display styles |
| Sorting | Specify GrOb display sequence |
| Selection | Marking an item active for operation |

⁺bar:1500 #Bar_Stack $Column Stacks ᴷBar Chart View; Stacking; Column Stacks; Count Stacks;

+#$ᴷBar Chart Sorting and Grouping

Sorting in the Bar Chart View orders columns left to right (when there is no stacking) or to order column stack segments (when stacking is in force). Additionally, the Group feature separates related columns when columns are unstacked.

Sort order with unstacked columns

When columns are not stacked, sorting determines the left to right order of data item columns.

Example: If value bars representing airline flight passenger counts are sorted by Passenger Count, (ascending), the flight with the fewest passengers appears leftmost, followed by flights with more passengers to the right.

Sort order in Column Stacks

The current sort criterion is applied to data items after they are stacked. For an ascending sort, items with lower sort value appear at the bottom of a stack, followed by items with higher sort values on top.

Example: If airline flights are stacked by Carrier and sorted by ETD (ascending), each carrier's flights are stacked in a column from earliest at the bottom to latest at the top.

Visualizing subtotals in Column Stacks

By choosing a sort criterion and a bar style that complement one another you can produce column stacks with layers that convey subtotal information graphically.

Example: Suppose airline flight data items are stacked according to Carrier and sorted by Flight Status (ascending) where Flight Status can be one of the ordered set of enumeration values {ON TIME, DELAYED, CANCELLED}. A carrier's on time flights would be stacked first in the column, followed by the delayed flights, then cancelled flights. If the current bar style represents flight status with colors ON TIME=green, DELAYED=yellow, CANCELLED=red, you will see layers composed of green, yellow and red segments in the carrier columns. If you are looking at count bars, the relative proportion of the layers tells you graphically how many flights fall into each status category for a carrier. If you are looking at value bars representing the passenger count for each flight, the relative proportion of the layers indicates graphically how many passengers are on time, delayed, and on cancelled flights.

Left to right order of Column Stacks

The sort criterion applies only to bar segments within a column stack. The left to right order of the stacks depends on the collating sequence of the stack field type. Simple text field stacks are ordered alphabetically, date/time stacks are ordered earliest to latest, integer stacks are ordered lowest to highest, and enumeration constant stacks appear in the order the constants are defined.

Example: If airline flights are stacked by Carrier, and Carder is an enumeration type field, column stacks representing carriers appear in the order the set of valid carrier constants is defined. Within a stack, data item bar segments are ordered according to the current sort criterion. If the flights were stacked by destination city (a simple text field), the columns would be ordered alphabetically by city name.

⁺bar:1600 #Bar_Sort $Bar Chart Sorting and Grouping ᴷBar Chart View; Sorting; Grouping;

Grouping

When columns are not stacked, you can use the Group menu item at the bottom of the Sort cascade menu (View menu) to group bar columns sharing the same primary sort field value.

Example: If bare representing airline flight passenger counts are sorted by Carrier, selecting the Group menu item separates the flight bars for each carrier with extra space between the groups. The same spacing would appear if the sort were Carrier/Passenger Count since Carrier is the primary sort criterion, but in this case bars are also sorted by Passenger Count within Carrier groups.

See also

| | |
|---|---|
| Bar Chart GrObs | Value bars, count bars, and labels |
| Column Stacks | Aggregate items by category |
| GrOb Styles | Alternate data item display styles |
| Sorting | Specify GrOb display sequence |
| Selection | Marking an item active for operation |

+#$ᴷTab Keys in Bar Chart View

You can use the Tab and Shift-Tab keys to move the selection forward or backwards, following the current sort order.

If columns are not stacked, Tab advances the selection to the next column to the right and Shift-Tab moves selection back to the previous column to the left.

When columns are stacked, Tab advances the selection from the bottom segment in a column stack to the topmost, following the current sort order. The selection then goes to the bottom of the next column to the right. Shift-Tab moves the selection backwards in a similar fashion.

See also

| | |
|---|---|
| Column Stacks | Aggregate items by category |
| Sorting | Specify GrOb display sequence |
| Selection | Marking an item active for operation |

⁺bar:1700 #Bar_Tab $Tab Keys in Bar Chart View ᴷBar Chart View; Tab keys;

+#$ᴷBar Chart Data Direct Manipulation

Data direct manipulation (Data DM) in Bar Charts allows you to change a data item's integer value quantity by clicking and dragging its value bar. (There is no Data DM defined for count bars.)

Data DM may or may not be enabled in a particular Bar Chart View, depending on your application.

Changing the quantity value

The first step in Data DM is to select the value bar or bar segment. Often you will see grabbers appear at the top of the bar when it is selected. This grabber marks the hot spot for Data DM. When the cursor moves over the hot spot, cursor appearance changes to the Data DM up/down arrow cursor, indicating that you can now perform Data DM operations.

Once cursor cueing has appeared, clicking and dragging the bar upwards increases the quantity value. Clicking and dragging the bar downwards decreases the quantity value.

Negative quantity values

Note that a stacked bar segment's value cannot be dragged below its zero line. Thus, if you wish to adjust a value bar segment to be a negative quantity via Data DM, you must first unstack the columns.

See also

| Column Stacks | Aggregate items by category |
|---|---|
| Bar Chart GrObs | Value bars, count bars, and labels |
| Data DM | Modify data via click-and-drag direct manipulation |
| Undo | Undo previous Data DM change |
| Selection | Marking an item active for operation |

+bar:1800 #Bar_DataDM $ Bar Chart Data DM $^K$Bar Chart View; Data DM;
+#$K$Table View Style The Table View style presents a row/column display of data items similar to a spreadsheet.

As with a spreadsheet, each Table View row represents one data item, and columns am associated with the item's attributes. Unlike a spreadsheet, however, a Table View column may represent multiple attributes of the data.

Table View does not provide any data direct manipulation (Data DM) facilities.

| Table View topics | |
|---|---|
| Table View GrObs | Columns display data attributes |
| Table Column Operations | Create, change, move columns |
| Inserting Columns | Create new columns |
| Column Titles | Naming columns |
| Deleting Columns | Remove columns from display |
| Table Zooming | Row & column zooming |
| Table View Tab Keys | Selection follows rows |

See also

| Visualization Facilities | Features common to all view styles |
|---|---|

+table:1000 #HT_Table $Table View Style $^K$Table View; View Styles;
+#$K Table View Column Styles In a Table View, each application data item is represented by a row. Each row has one or mere Column graphic objects (GrObs) representing the item's attributes.

Column Styles

Table View columns represent data values via graphic attributes. Not only can one or more text fields be displayed in a column graphic object, but column styles can also use colors and icons to represent data attributes.

> Example: A column style in a Table View displaying airline flight data might show the departure time in the top half of the cell, the arrival time in the bottom half, and might have its background color represent the flight status (OK=green, DELAYED=yellow, CANCELLED=red).

The Column Styles menu item (Views menu) brings up the Choose Style dialog, listing all the column styles defined for your Table View. (This menu item is active only when a column is selected). Not all the defined styles are necessarily assigned to existing columns. You can use the Choose Style dialog to assign any of the column graphic object styles to the selected column You can also use Table View's column creation and insertion facilities to add new columns or change existing ones.

Table Header row

The first row of a Table View is a header row, showing a title for the data in each column. The header row remains fixed when you scroll rows. You can use direct manipulation on the header row to adjust its height or to change column widths.

When the cursor moves over the right edge of a column in the header row, it changes to the right/left arrow. Clicking and dragging the edge to the right enlarges the column; dragging to the left makes it smaller.

When the cursor moves over the bottom edge of the header row it changes to the up/down arrow. Clicking and dragging the edge down makes the header row taller; dragging the edge up makes it shorter.

See also

| Table Column Operations | Create, change, move columns |
|---|---|
| Inserting Columns | Create new columns |
| Column Titles | Naming columns |
| Deleting Columns | Remove columns from display |
| Graphic Objects (GrObs) | Represent data items graphically |
| GrOb Styles | Alternate data item display styles |

+table:1100 #Tab_GrObs $Table View Column Styles $^K$Table View; GrObs; Columns; DM;
+#$K$Table Column Operations Table View lets you add new columns to the display, change what is in current columns, or move existing columns to different positions. None of these operations affects the underlying data items in the rows; they simply affect what attributes of the data are displayed.

Creating a new column

You can use Insert Column (View menu) to create a new, empty column. First select a column next to where you want the new column. The Insert Column dialog lets you specify whether the new column is placed to the left or to the right of the selected column. The dialog also lets you give the column a name and specify its width.

You can now assign a column style to the column. First select the new column then select a style from the Choose Style dialog (Column Styles menu item, View menu). Each column style displays different data item values, or uses different graphic attributes (icons, colors, text) to display the data values.

Changing the contents of a column

You can change what is displayed in a column by first selecting the column then selecting a different column style from the Choose Style dialog (Column Styles menu item, View menu).

When column contents change you may also wish to change the column title. You can use the column Edit dialog (column Title menu item, View menu) to change a column title.

Moving a column

To move an existing column, first use Insert Column to create an empty column and give it a title. Then assign the appropriate column style to the new column. Finally, select the old duplicate column and use Delete Column (View menu) to remove it from the display.

You can determine which column style is assigned to a column by selecting the column and seeing which column style name is selected when you invoke the Choose Style dialog. You can also use the Choose Style dialog to preview alternate styles by clicking on style names in the style list.

Tip You can also determine the name of a column style by bringing up the column's legend (select a column, then use the Ctrl-L keyboard accelerator). The legend window's title is the column style name.

See also

| | |
|---|---|
| Inserting Columns | Create new columns |
| Column Titles | Naming columns |
| Deleting Columns | Remove columns from display |
| Table View GrObs | Columns display data attributes |
| GrOb Styles | Alternate data item display styles |
| Legend | Color/icon associations |

+table:1200 #Tab_ColOps $Table column Operations $^K$Table View; Insert Column; Delete Column; Column Titles;

+#$^{SK}$Inserting Table Column

The Insert Column dialog lets you add a new, empty column to a Table View. Once the column is added, you can assign a column style to display in it using the Choose Style dialog (Column Styles menu item, View menu).

The Insert Column menu item (View menu) is only active if a column is selected.

Dialog options

Column Title specifies a column name.

Column Width specifies the column width in logical points (a positive integer). If this entry is blank a default width is used.

Left of <column name> creates the new column to the left of the selected column.

Right of <column name> creates the new column to the right of the selected column.

OK exits the dialog and redisplays the view including the new, empty column.

Cancel exits the dialog without any changes.

Changing column header dimensions

When a new column is added, you may need to adjust the height or width of the column in order to make it more readable.

You can adjust a column's width either by typing in a new value in the Column Title dialog, or through direct manipulation. When the cursor moves over the right edge of a column in the header row, it changes to the right/left arrow. Clicking and dragging the edge to the right enlarges the column; dragging to the left makes it smaller.

You can also adjust the height of the header row through direct manipulation. When the cursor moves over the bottom edge of the header row it changes to the up/down arrow. Clicking and dragging the edge down makes the header row taller; dragging the edge up makes it shorter.

See also

| | |
|---|---|
| Table Column Operations | Create, change, move columns |
| Column Titles | Naming columns |
| Deleting Columns | Remove columns from display |
| Table View GrObs | Columns display data attributes |
| GrOb Styles | Alternate data item display styles |

+table:1400 #HTD_Tab_Insert_Col $Inserting Table Columns $^K$Table View; Insert Column;

+#$^{SK}$Table Column Titles

You can give a title to a new column or change the title of an existing one via the Column Edit dialog invoked from the Column Title menu item (View menu).

The column header must first be selected by clicking anywhere in the column.

Dialog options

Column Title specifies a column name.

Column Width specifies the column width in logical points (a positive integer). If this entry is blank a default width is used.

OK exits the dialog and redisplays the view using the values provided.

Cancel exits the dialog without any changes.

Changing column header dimensions

When a column name is changed, you may need to adjust the height or width of the column in order to make the column title more readable.

You can adjust a column's width either by typing in a new value in the Column Title dialog, or through direct manipulation. When the cursor moves over the right edge of a column in the header row, it changes to the right/left arrow. Clicking and dragging the edge to the right enlarges the column; dragging to the left makes it smaller.

You can also adjust the height of the header row through direct manipulation. When the cursor moves over the bottom edge of the header row it changes to the up/down arrow. Clicking and dragging the edge down makes the header row taller; dragging the edge up makes it shorter.

See also

| | |
|---|---|
| Table Column Operations | Create, change, move columns |
| Inserting Columns | Create new columns |

+table:1500 #HTD_Tab_Col_Title $Table Column Titles $^K$Table View; Column Titles; DM;

+#$^{SK}$Deleting Table Columns

To remove a Table View column, first select the column header by clicking anywhere in the column, then choose the Delete Column menu item (View menu). A dialog prompts you to confirm the column deletion.

Deleting a column does not affect the underlying data in any way. It simply removes the column a graphic object from the Table View display.

The column style displayed in the deleted column is not affected. It still appears in the style list in the Choose Style dialog (Column Styles menu item, View menu), and can be assigned to another column at a future time.

See also

| | |
|---|---|
| Table Column Operations | Create, change, move columns |
| GrOb Styles | Alternate data item display styles |

+table:1600 #Tab_DelCol $Deleting Table Columns $^K$Table View; Delete Column;

+#$^{SK}$Table View Zooming and Scrolling

Table View provides zooming and scrolling controls for both rows and columns.

Zooming

Table View provides both Zoom Rows and Zoom Columns menu items (View menu).

Both zoom dimensions offer the standard three levels of zoom: Normal, 50% and Fit all.

Tip Leaving rows at normal zoom and zooming columns to fit is a convenient configuration if your Table just over a screen wide, but has a large number of rows.

When columns are in zoom to fit mode, adding a new column causes existing columns to shrink, rather than adding a scroll bar.

Scrolling

Table View has both horizontal and vertical scrolling. A horizontal scroll bar appears when there am more columns than will fit in the current window width (unless the Table columns are being zoomed to fit). Similarly, a vertical scroll bar appears when there are more rows than will fit in the current window height, unless rows are being zoomed to fit.

A Table View may have one or more fixed columns on the left, right, or bottom of the view. Such fixed columns will not move when horizontal or vertical scrolling occurs.

> Example: A wide table with 12 columns might be set up with 2 fixed columns on the left. These columns, containing the information identifying the item contents, would remain fixed in the left part of the window. Scrolling would then affect which of the other 10 columns were in view.

See also

| | |
|---|---|
| Zooming | Control GrOb size & detail |
| Scrolling | Adjust visible portion of view |

+table:1700 #Tab_Zoom $^S$Table View Zooming and Scrolling $^K$Table View; Zooming; Scrolling;

+#$^K$Tab Keys in Table View

You can use the Tab and Shift-Tab keys to move the selected row, following the current sort order;

Tab moves the selection to the next row down, scrolling it into view if necessary. Shift-Tab moves to the previous row in a similar fashion. The current column selection (if any) is unaffected by the Tab keys.

See also

| | |
|---|---|
| Sorting | Specify GrOb display sequence |
| Selection | Marking an item active for operation |

+table:1800 #Tab_Tab $^S$Tab Keys in Table View $^K$Table View; Tab keys;

+#$^K$Image View Style

The Image View style represents data item placement against a picture image background. An Image View is commonly used to display some sort of location information, such as an employee's office location on a floor plan, or aircraft gate location at a flight terminal.

Data items in Image View are represented by label graphic objects (GrObs). Labels for data items sharing the same location field value are displayed in a tile stack. Label areas can optionally be connected to reference markers which may act as hot spots for data direct manipulation (Data DM).

| Image View topics | |
|---|---|
| Image View Placements | Label stacks & reference markers |
| Image View Zooming | Control picture image size |
| Image View Filtering | Implicit placement filtering |
| Image View Sorting | Orders tile stack labels |
| Image View Tab Keys | Selection follows placements |
| Image View Data DM | Change location value |

See also

| Visualization Facilities | Features common to all view styles |
|---|---|

+image:1000 #HT_Map $^S$Image View Style $^K$Image View;View Styles;

+#$^K$Image View Placements

Data items in Image View are represented by label graphic objects (GrObs). Labels are arranged against a picture image background in placement areas, based on the location field value of the data items.

Normally an Image View's background is a picture (bitmap) image, but some Image Views place data item labels against a simple colored background.

Placement areas for data locations

A placement is an area of an Image View display representing data items with a particular location field value.

> Example: An Image View might use the Office field value of employee data items to represent where an employee sits on a floor plan.

Placements consist of a position for displaying data item label(s), optionally connected to a reference marker.

> Example: A label representing an employee might be connected to a marker indicating the employee's office.

Label tile stacks

Labels for data items sharing the same placement field value are displayed in an overlapping tile stack. The order of labels in the stack depends on the current sort criterion.

> Example: Two employees sharing an office would be represented as two labels in a tile stack. The labels might be connected to the reference marker in their shared office.

Reference markers

Reference markers on your Image act as hot spots for Data DM. The appearance of the reference markers depends on your application, but they are often represented with icons.

> Example: A small desk or chair icon might be the reference marker for employee offices. When you connect an employee's label graphic object to an office reference marker, you "move" the employee to that office.

See also

| | |
|---|---|
| Image View Filtering | Implicit placement filtering |
| Image View Sorting | Orders tile stack labels |
| Image View Data DM | Change location value |
| Graphic Objects (GrObs) | Represent data items graphically |

+image:1100 #Img_GrObs $^S$Image View Placements $^K$Image View; GrObs; Labels; Placements; Reference markers; Tile stacks;

+#$^K$Image View Zooming and Scrolling

Zooming in Image View acts both on the graphic objects (GrObs) and the background picture image.

Zoom Normal or 50%

Zoom Normal displays the image at its regular dimensions, and Zoom 50% scales the picture to haft its normal size. Data item labels and reference markers are also scaled appropriately. Scroll bars appear as necessary in the horizontal and vertical dimensions.

Zoom to Fit

Zoom to Fit scales the image so that all the defined placements fit inside the current window dimensions, while preserving the width to height ratio of the picture image (if one is present).

When an Image View is zoomed to fit, it may shrink the image and its graphic objects, or it may expand them. Image View is the only view where Zoom to Fit can enlarge GrObs beyond their Normal zoom dimensions.

Image scaling is a compute-intensive operation. When you select Zoom 50% or Zoom to Fit, or when you re-size a zoomed to fit window, it takes a moment to scale the picture image.

See also

| Zooming | Control GrOb size & detail |
| Scrolling | Adjust visible portion of view |

+image:1200 #Img__Zoom $Image View Zooming $^K$Image View; Zooming;

+#$K$Image View Filtering

Image View offers the standard filtering facilities available across all view styles. In addition, Image View has an implicit filter based on the placements defined for the view.

Implicit filtering through placements

The subset of data items displayed in an Image View depends both on the current filter and on the placements defined for the view. Even if there is no filter ("Show All"), all data items of the record type may not be visible. Only those data items located in the defined placements will be displayed.

Example: An Image View might represent employee office location on a building floor plan. Placements would be defined for all office locations on this floor, but some employees may have offices on other floors. Even if you select Show All on the Filter cascade menu, only the employees with offices on this floor will appear in the view.

See also

| Image View Placements | Label stacks & reference markers |
| Filtering | Control the data subset displayed |

+image:1300 #Img__Filter $Image View Filtering $^K$Image View; Filtering; Implicit Filtering;

+#$K$Image View Sorting

Sorting in the Image View acts on data items sharing a location field value. Labels for data items with lower sort values are drawn first, at the "bottom" of the tile stack. Labels for items with higher sort values are drawn later, on the "top" of the tile stack.

Example: If there are five flights at an airline terminal gate, and the current sort criterion is departure time, labels for the earlier flights are drawn first, with the later flights stacked on top of them in the tile stack.

Selecting an item in a sorted tile stack uncovers its label, but does not affect the sort order.

See also

| Image View Placements | Label stacks & reference markers |
| Sorting | Specify GrOb display sequence |

+image:1400 #Img__Sort $Image View Sorting $^K$Image View; Sorting;

+#$K$Tab Keys in Image View

You can use the Tab and Shift-Tab keys to advance the selection across the placement categories. Within a placement category selection follows the sort order, Tab moves the selection to the "next" placement area, scrolling it into view if necessary. The "next" placement area is determined by the field type of the location field. Within a placement area, the selection follows the current sort order.

Example: In an Image View using an employee's zip code (an integer field) as the location field, Tab advances the selection from lower zip cedes to higher ones. Within a zip code, if the current sort criterion is last name (ascending), Tab advances the selection to the next employee in alphabetical order.

Shift-Tab moves to the previous placement area in a similar fashion, and to the previous sort order item in a tile stack.

See also

| Sorting | Specify GrOb display sequence |
| Selection | Marking an item active for operation |

+image:1500 #Img__Tab $Tab Keys in Image View $^K$Image View; Tab Keys;

+#$K$Image View Data Direct Manipulation

Data direct manipulation (Data DM) in Image View lets you change a data item's location field value by clicking and dragging the item's label to a different placement reference marker.

Data DM may or may not be enabled in a particular Image View, depending on your application.

Changing the location field value

The first step in Data DM is to select a data item's label GrOb. When you move the cursor over the label's center, cursor appearance changes to the Data DM up arrow cursor. This cursor cueing indicates that you can start a Data DM operation.

Once the Data DM up arrow appears, you can connect the label to another placement reference marker to change the location field value. Clicking and dragging the mouse drags out a new connection from the label GrOb. When you are over a reference marker the cursor cueing changes to the Data DM crosshairs cursor. If you release the mouse button over such a Data DM target, the placement field value changes and the label is redrawn in the new placement area. (Note that if you let up on the mouse button while the Data DM up arrow cursor is still visible, no change occurs.)

Example: In an Image View representing flights at airline terminal gates, you might wish to move a flight from gate 10 to gate 20. To do this you would select the flight at gate 10 and drag out a new connection to gate 20. When you are over gate 20 Data DM crosshair cursor cueing appears. Now when you let up the mouse button, the flight's Gate field value changes to gate 20, and the flight label is redrawn in the placement area for that gate.

Previewing the location value change

Sometimes you cannot easily tell what location value is associated with a reference marker just from looking at the picture image. In such situations, Image View can provide you with a preview of the location value change so you can see what the new location will before completing the Data DM. if the label style represents the location value via some graphic attribute, that attribute will change during Data DM when you are over a Data DM target.

Example: Suppose you are moving an airline flight from gate 10 to gate 20, and that the current label style shows the gate number in the upper left corner of the label. As your cursor moves over the reference marker for gate 20 during Data DM, the gate text changes to "20". No actual change to the data is made, though, until you let go of the mouse and complete the Data DM.

See also

| | |
|---|---|
| Image View Placements | Label stacks & reference markers |
| Data DM | Modify data via click-and-drag direct manipulation |
| Undo | Undo previous Data DM change |
| Selection | Marking an item active for operation |
| GrOb Styles | Alternate data item display styles |

+image:1500 #Img_DataDM $Image View DataDM $^K$Image View; Data DM;

+#$$^K$Tree View Style

The Tree View style represents data items in a hierarchy of connected nodes. Nodes are organized into levels of a tree structure, with each node having at most one parent.

There are two kinds of Tree View display styles: Relationship Trees and Category Trees. Relationship Trees use a data item's relationship to another data item to connect levels of the tree. An employee organization hierarchy is an example of a relationship tree.

Category Trees represent each category of data items as a branch in the tree.

Example: You might display a project tree, where all employees working on a project appear as a tree branch.

| Tree View topics | |
|---|---|
| Tree View GrObs | Levels of connected nodes |
| Relationship/Category Trees | Tree display styles |
| Tree Orientations | Orientation & leaf node options |
| Expand/Contract Nodes | Show or hide tree levels |
| Setting the Root Node | Focus on a subtree |
| Tree Zooming | Tree zooming & scrolling |
| Tree Filtering | Filtering the hierarchy |
| Tree View Sorting | Sort across tree levels |
| Tree Tab & Arrow Keys | Selection across & through tree levels |
| Tree View Data DM | Change parent relationship |

See also

| | |
|---|---|
| Visualization Facilities | Features common to all view styles |

+tree:1000 #HT_Tree $Tree View Style $^K$Tree View; View Styles;
+#$$^K$Tree View Nodes and Hierarchy Each Tree View data item is represented by a tree node graphic object (GrOb). Nodes are organized into a connected hierarchy of tree levels. The tree structure depicts a strict parent/child relationship where each node has at most one parent node.

Connections between two nodes either represent a relationship between the nodes (Relationship Tree mode) or membership in a category of nodes (Category Tree mode).

Roots, branches and leaf nodes

A node which has one or more descendent (child) nodes underneath it is called a branch node. Nodes with no further descendants are termed leaf nodes. A tree root is a node which has no ancestor (parent).

Relationship and Category trees

In relationship tree mode, all visible nodes represent actual data items, and connections between nodes represent the parent/child relationship between the data items.

Example: An employee organization hierarchy is a relationship tree, where a connection from an employee to his manager represents the "works for" relationship. Nodes at all levels of the tree represent employees; branch nodes represent managers of employee groups.

In category tree mode, only leaf nodes represent actual data items. Branch nodes represent category groupings and connecting lines represent membership in the category.

Example: A tree of airline flight data items categorized by Carrier would contain a branch label for each carrier. All the flights for a carrier would appear as leaf nodes connected to the branch label.

You can tell whether you are looking at a relationship tree or a category tree in one of two ways. If all the nodes have a similar appearance, displaying the same fields of information, all representing actual data items, it is a relationship tree. If the branch nodes appear different from the leaf nodes and only the leaf nodes represent actual data items, it is a category tree. Also, if any menu item is checked on the Categorize cascade menu (View menu), the display is in category mode.

Toggling between Relationship and Category trees

Tree Views often support both relationship and category tree styles, where selecting a category from the Category cascade menu (View menu) displays a category tree, and unselecting the current category criterion returns the display to relationship mode. However, some Tree Views may represent data that has no hierarchical relationship property. In such Tree Views, the display is always in category mode and cannot be toggled to relationship mode. Unselecting the current category criterion has no effect on the tree display.

Example: If an employee data item consists of just a name field and a project assignment, a Tree View representing employees could display categories of employees, but could not display any relationships. If employee data also included a Manager field, the "works for" hierarchy could then be depicted in a relationship tree.

Multiple trees

In relationship tree mode, multiple trees can be visible at one time. Each tree may have its own subtree hierarchies, or they may be isolated root nodes.
+tree:1100 #Tre_GrObs $Tree View Nodes and Hierarchy $^K$Tree View; GrObs; Nodes; Relationship Trees; Category Trees;

Actions such as filtering and setting the root node can affect how many relationship trees appear in the display.

In category tree mode, only one category tree appears in the display.

Category tree display

A category tree can have one, two, or three branch levels, depending on whether a simple category criterion (such as Carrier) is selected, or a two or three-part categorization is chosen (such as Carrier/Flight Status, or Carrier/Flight Status/To City).

In addition to the branch levels, category trees always have a single root node representing the filter subset currently in view.

Example: If no filter is in force for an airline flight category tree, the root represents all flights. If the filter "Flights through DFW" is in force, the root is labeled with the text "Flights through DFW", and only leaf nodes passing that filter will appear in the tree.
See also

| | |
|---|---|
| Relationship/Category Trees | Tree display styles |
| Tree Orientations | Orientation & leaf node options |
| Expand/Contract Nodes | Show or hide tree levels |
| Setting the Root Node | Focus on a subtree |
| Tree Filtering | Filtering the hierarchy |
| Graphic Objects (GrObs) | Represent data items graphically |

+#$K Tree Orientation Options

The Orientation cascade menu (View menu) provides a number of options for controlling the tree display. You can choose one of the five orientation options (top/down, bottom/up, left/right, right/left, indented) to control the direction of the tree. In addition, you can choose to display leaf nodes in a stack if the display is in top/down or bottom/up orientation.

Top/down, Bottom/Up, Left/Right and Right/Left orientations

The top/down orientation draws the root(s) at the top of the view with subsequent tree levels in rows below. The bottom/up orientation reverses this order.

Left/right orientation draws the root(s) on the left in the view, with subsequent tree levels in columns to the right. Right/left orientation reverses this order.

The Indented orientation

The indented orientation uses a left to right ordering of node levels, but each level is indented only slightly under the previous level. It is rather like a "depth first" display, where all leaf nodes and nested branch nodes for a branch are stacked before the next branch starts. As a result, for the same number of nodes, an indented display is taller, but much narrower than a left/right display.

The indented drawing algorithm conserves horizontal space at the expense of vertical space. As a result, indented orientation is most appropriate when tree nodes are wide and can take advantage of the horizontal area.

Stacked leaf nodes

The Stacked leaf nodes option lets you draw leaf nodes in a column stack rather than in a left to right level. Stacking leaf nodes only applies if you choose the top/down or the bottom/up orientation.

Stacking leaf nodes conserves horizontal space for bushy, balanced trees. It is usually the best choice for maximizing use of screen real estate for top/down and bottom/up orientations.

Only leaf nodes at the lowest tree level are stacked.

Example: In a top/down orientation if there is one root, 5 leaves and one branch node below the root, and then 10 children of the branch node, only the 10 branch node children will be stacked. The 5 leaf nodes of the root are drawn in a level with the branch node.

See also

| | |
|---|---|
| Tree View GrObs | Levels of connected nodes |

+tree:1300 #Tre_Orient $Tree Orientation Options $^K$Tree View; Orientation; Stacked leaf nodes;

+#$K Expanding and Collapsing Tree Levels

You can expand or collapse tree levels in order to display more or less of the tree hierarchy. This can be done either via the Expand/Collapse All menu item (View menu) or through direct manipulation.

When a node has descendants that am not currently visible, a branching icon appears at an appropriate position on the node (at its bottom edge if in top/down orientation, at the right for left/right orientation, and so forth). This branching icon indicates the tree can be further expanded below the node.

Expand/Collapse via direct manipulation

Direct manipulation lets you expand the tree one level at a time, or collapse entire branches.

To expand a tree level by direct manipulation, first select a node that has a branch indicator icon. When you move the cursor over the branch icon, cursor appearance changes to a tree cursor. After the tree cursor cueing appears, a single click expands the tree one level.

To collapse a subtree, select a node that has descendants. When you move the cursor over the connecting line coming from the node, cursor appearance changes to a tree cursor. After the tree cursor cueing appears, a single click hides all tree levels under the selected node.

Expand/Collapse all menu item (View menu)

The Expand/Collapse all menu item lets you hide or show the entire tree structure, or expand or collapse an entire subtree.

To expand the entire subtree underneath a node, first select a node that has a branch indicator icon then select the Expand/Collapse all menu item (or use the CtrI-E keyboard accelerator). To collapse a subtree, select a node that has descendants then use the CtrI-E keyboard accelerator, or select the Expand/Collapse all menu item.

You can hide or show entire tree(s) by using Expand/Collapse all when no node is selected. If no node is selected and a tree is partially or fully expanded, Expand/Collapse all collapses the tree to its root. If you invoke Expand/Collapse all when only the root is visible, the entire tree is expanded. Similar behavior occurs if there is more than one tree visible.

See also

| | |
|---|---|
| Tree View GrObs | Levels of connected nodes |
| Tree Orientations | Orientation & leaf node options |
| Setting the Root Node | Focus on a subtree |

+tree:1400 #Tre_Expand $Expanding/Collapsing Tree Levels $^K$Tree View; Expand; Collapse; DM;

+#$K Setting the Tree Root

You can use the Set Root Node facility (View menu) to focus on one particular subtree of interest. When you designate a node as the root, only it and its subtree are displayed in the view. Other parts of the tree are temporarily removed from the display.

Setting and unsetting the tree root

To focus in on a subtree of interest, first select the branch node of the subtree, then select the Set Root Node menu item. The selected branch node now appears as the artificial root of the tree display.

To return the view to displaying the actual tree root node(s), select the Set Root Node menu item when no node is selected.

The view will also be returned to displaying the actual tree root node(s) if a filter is applied, if you select an item from a different subtree in the Find dialog, or if you categorize the tree.

Tab and Arrow key behavior when the root is set

When part of the tree hierarchy is not currently displayed because the root is set to an artificial root, using the Tab or Shift-Tab keys may change the subtree being displayed, and using the arrow keys may change the visible potion of the tree hierarchy. See Tree Tab & Arrow Keys for more information.

See also

| | |
|---|---|
| Tree View GrObs | Levels of connected nodes |
| Relationship/Category Trees | Tree display styles |
| Tree Tab & Arrow Keys | Selection across & through tree levels |
| Find | Locate data item GrObs |
| Filtering | Control the data subset displayed |

+tree:1500 #Tre_SetRoot $Setting the Tree Root <sup>K</sup>Tree View; Set Root;
+#$K Tree View Zooming and Scrolling You can use zooming in Tree View to control the amount of the tree in view and the appearance of horizontal and vertical scroll bars.

If the view is in Zoom Normal or Zoom 50% mode and the entire tree structure does not fit in the visible window area, horizontal and vertical scroll bars may appear. You can use these scroll bars to adjust the visible portion of the tree.

When the Fit all nodes zoom setting is active, tree components are automatically resized so that the entire tree fits in the display area. Automatic resizing eliminates the need for scroll bars. In Fit all nodes mode, any action that changes the tree structure (such as categorization, filtering nodes, or a node's parent via Data DM) can cause the tree size to change so that the modified structure fits in the display.

See also

| | |
|---|---|
| Tree View GrObs | Levels of connected nodes |
| Relationship/Category Trees | Tree display styles |
| Tree View Data DM | Change parent relationship |
| Zooming | Control GrOb size & detail |
| Scrolling | Adjust visible portion of view |
| Filtering | Control the data subset displayed |

+tree:1600 #Tre_Scroll $Tree View Zooming & Scrolling; <sup>K</sup>Tree View; Zooming; Scrolling;
+#$K Relationship Trees and Category Trees There are two kinds of Tree View styles: Relationship Trees and Category Trees. While both styles produce a parent/child hierarchy, the meaning of the hierarchy is different for the two modes.

Relationship trees

Relationship trees use a data item's relationship to another data item to connect the levels of the tree.

Example: An employee organization hierarchy is a relationship tree, where the connection between a node and its parent represents the "works for" relationship.

In relationship trees all tree nodes (branches, roots, leaf nodes) represent data items.

Example: In an employee organization tree, managers are branch and root nodes, and non-manager employees are leaf nodes.

Category Trees

Category Trees represent each category of data items as a branch in the tree.

Example: A tree of airline flights categorized by Carrier would have one branch for each carrier. All the carrier's flights would appear as the carrier branch node's descendants.

In category trees, only leaf nodes represent actual data items. Branch nodes in a category tree are simply category markers.

Example: In an airline flight carrier category tree, each branch node represents a carrier and is labeled with the carrier's name. But the node does not itself represent a data item.

The Categorize cascade menu (View menu)

The Categorize cascade menu provides a list of criteria that can be used to categorize the tree similar to the single and multiple sort criteria found on the Sort cascade menu. A category tree will have one, two, or three branch levels, depending on whether a simple category criterion (such as Carrier) is selected, or a two or three-part categorization is chosen (such as Carrier/Flight Status, or Carrier/Flight Status/To City).

Selecting an item from the Categorize cascade menu displays the tree using that categorization. Unselecting the current categorize item may return the display to relationship tree mode, if it is possible to do so.

Toggling between Category trees and Relationship trees

If data items have a relationship that can be displayed in a relationship tree, you can toggle the display back and forth between relationship and category tree modes using the Categorize menu item. In this case selecting a category criterion from the Categorize cascade menu toggles to category mode, and unselecting the current category criterion returns the display to relationship mode.

However, if there is no displayable relationship among the data nodes, unselecting the current criterion on the Categorize cascade menu will have no effect. The display will remain in category mode and cannot be toggled to relationship mode.

Example: If an employee data item consists of just a name field and a project assignment, a Tree View representing employees could display categories of +tree:1650 #Tre_Categorize $Relationship & Category Trees; <sup>K</sup>Tree View; Relationship Trees; Category; Categorize; employees, but could not display any relationships. If employee data also included a Manager field, the "works for" hierarchy could then be depicted in a relationship tree.

Branch and root nodes in category trees

A category tree can have up to three branch levels in addition to the tree root, depending on the categorization criterion you choose. Selecting a simple category criterion (such as Carrier for airline flights) creates a category tree with a root, one level of branch nodes (one for each Carrier), and then data item leaf nodes (flights).

Selecting a compound category criterion (such as Carrier/Flight Status) creates a tree with a root, a branch level representing the primary category (Carrier) and a second branch level representing the secondary category (Right Status). Each branch on the primary category level can have descendent branches representing all values of the secondary category level.

Example: In a Carrier/Flight Status compound categorization, each Carrier branch node can have multiple branch nodes underneath it containing flights that are on time, delayed, cancelled, and so forth (flight status values).

Branches of leaf nodes in two-level category hierarchies are groupings of the secondary category criterion.

Example: In a Carrier/Flight Status compound categorization, leaf node branches are groups of delayed flights for one carrier, cancelled flights for that carrier, delayed flights for another carrier, and so forth.

In addition to the branch levels, category trees always have a single root node representing the filter subset currently in view.

> Example: If no filter is in force in our airline flight category tree example, the root represents all flights. If the filter "Rights through DFW" is in force, the root is labeled with the text "Flights through DFW", and only leaf nodes passing that filter will appear in the tree.

See also

| Tree View GrObs | Levels of connected nodes |

+#$K Tree View Filtering

As in other views, you can use filtering in Tree View to control the subset of data items displayed in the tree. However filtering in Tree View has special consequences for the appearance of the tree hierarchy in relationship tree mode.

Applying a filter may also change the current expansion state of the tree.

Filtering Relationship trees

When a filter is applied to a relationship tree, the filter may filter out nodes that act as branch points in the hierarchy. If nodes underneath these eliminated branches pass the filter, they appear as isolated root nodes in the filtered view.

> Example: Suppose a relationship tree representing an employee organization has two levels of managers, then the employees reporting to the managers as leaf nodes. If a filter "Not a manager" is applied to this view, only the leaf node employees pass the filter. Since the managers acting as branch nodes are eliminated by the filter, all the non-manager employees appear as isolated root nodes.

Filtering Category trees

Filtering category trees does not isolate nodes because filters do not apply to branch category marker nodes. However, filtering category trees can eliminate entire branches, if all leaf nodes in the branches are eliminated by the filter criterion. Also, applying a filter will change the text displayed in the category tree root node to reflect the name of the filter.

See also

| Tree View GrObs | Levels of connected nodes |
| Relationship/Category Trees | Tree display styles |
| Filtering | Control the data subset displayed |

+tree:1700 #Tre_Filters $Tree View Filtering ^KTree View; Filtering;
+#$K Tree View Sorting You can use sorting in Tree View to arrange data items in the tree levels. Sorting in relationship trees In relationship trees, each level of the tree represents data items related to items at higher and lower levels. When you sort a relationship tree, each level is individually sorted according to the sort criterion.

> Example: If a tree representing an organization hierarchy of employees is sorted by name, the first level managers are sorted, each group of level two managers is ordered by name, and then the employees reporting to the managers are sorted by name.

Sorting in category trees

Category trees only have data items as leaf nodes. Branch nodes in category trees are merely category groups markers and do not represent actual data. Hence the sort criterion applies only to leaf node groups in category trees.

Levels of category marker nodes are arranged in the collating sequence appropriate to the data type of the category. Date/time category marker nodes are ordered earliest to latest, simple text categories are ordered alphabetically, integer categories are ordered from lowest to highest, and enumeration constant category nodes appear in the order the constants are defined.

> Example: If airline flights are categorized in a tree by Carrier, and Carrier is an enumeration type field, the level of marker nodes representing carriers appear in the order the set of valid carrier constants is defined. Underneath each carrier node, data item nodes are ordered according to the current sort criterion. If the flights were categorized by destination city, a simple text field, the category nodes would be ordered alphabetically.

Sort order in the different tree orientations

Top/down and Bottom/up tree levels sort levels left to right, except for stacked leaf nodes, where the sort orders are top to bottom and bottom to top respectively. Left/right, right/left, and indented trees sort their levels top to bottom.

See also

| Tree View GrObs | Levels of connected nodes |
| Relationship/Category Trees | Tree display styles |
| Sorting | Specify GrOb display sequence |

+tree:1800 #Tre_Sorting $Sorting in Tree View ^KTree View; Sorting;
+#$K Tab and Arrow Keys in Tree View Tree View supports use of Tab and Shift-Tab to affect the current selection across tree levels. In addition, the arrow keys can be used to navigate the tree hierarchy.

Tab and arrow key navigation

You can use the Tab key to advance the selection to the next tree node on a level, following the current sort order. Shift-Tab moves the selection to the previous item in the sort order across tree levels.

Tab and Shift-Tab do not change levels of the tree. To go up to the next tree level towards the root, use the up arrow key. To descend to the next tree level, use the down arrow key.

The right and left arrow keys behave just like Tab and Shift-Tab unless an artificial root node is selected (see below).

Tab and Arrow key behavior when the root is set

When part of the tree hierarchy is not currently displayed because the root is set to an artificial root, using the Tab or Shift-Tab keys may change the subtree being displayed, and using the arrow keys may change the visible portion of the tree hierarchy.

If an artificial root node is selected and that node has siblings in the tree hierarchy, the Tab key will advance the selection to the next sibling in its level, following the current sort order. At the same time the previous subtree is removed from the display. This has the effect of displaying a different subtree at the given level each time Tab is used. Shift-Tab has the same effect, except that the order in the subtree level followed is reversed. That is, Tab follows the left to right subtree level order (assuming top/down or bottom/up orientation), while Shift-Tab would move the selection from right to left on the level.

If an artificial root node is selected and that node has siblings in the tree hierarchy, the right arrow key will also advance the selection to the next sibling in its level (following the current sort order) and the entire tree hierarchy will come back into view. The left arrow key behaves in a similar fashion, except it moves the selection to the previous item in the sort order.

See also

| | |
|---|---|
| Tree View GrObs | Levels of connected nodes |
| Setting the Root Node | Focusing on a subtree |
| Tree View Sorting | Sort across tree levels |
| Sorting | Specify GrOb display sequence |

+tree:1900 #Tre_Tab $Tab and Arrow Keys in Tree View ^K^Tree View; Tab keys; Arrow keys;

+#$K Tree View Data Direct Manipulation

For relationship trees, data direct manipulation (Data DM) allows you to change a data item's parent by selecting a node and dragging out a new node connection. Tree View Data DM can be used either to change the parent of a node to a different node, or to unparent a node (set its parent to null).

Data DM is not supported if the view is in category tree mode. In addition, Data DM may or may not be enabled in a particular relationship tree view, depending on your application.

Changing a node's parent

The first step in Data DM is to select a node graphic object. When you move the mouse over the center of a selected node, cursor appearance changes to the Data DM up arrow cursor. This cursor cueing indicates you can start a Data DM operation.

Once the Data DM up arrow appears, clicking and dragging the mouse drags out a new connection line from the node. When you move over another node, cursor cueing changes to the Data DM crosshairs cursor. If you release the mouse button over this target node, the target node becomes the parent for the selected node. The selected node and its entire subtree are moved underneath the new parent.

When you click and drag a new connection line over empty background, cursor cueing changes to the Data DM plus cursor. If you release the mouse button when this cueing is active, the selected node is set to have no parent. It will then appear at the root level along with any other tree roots.

See also

| | |
|---|---|
| Relationship/Category Trees | Tree display styles |
| Tree View GrObs | Levels of connected nodes |
| Data DM | Modify data via click-and-drag direct manipulation |
| Undo | Undo previous Data DM change |
| Selection | Marking an item active for operation |

+tree:2000 #Tre_Data DM $Tree View Data DM ^K^Tree View; Data DM;

+#$K Network View Style

The Network View provides a visualization style for complex, non-hierarchical, interrelated data. The Network consists of a web of data items (nodes) and their connecting relationships (arc).

Example: A Network View might represent an airline flight route, with cities displayed as nodes and flights between the cities as arcs.

Unlike Tree View, Network View can represent multiple connecting relationships between nodes. Also unlike Tree View, the connecting relationships are themselves associated with a type of data item and have their own graphic object representation.

Network view does not implement sorting or the Tab keys.

| Network View topics | |
|---|---|
| Network GrObs | Nodes, arcs, & network layout |
| Network Orientations | Specify arc flow direction |
| Network Zooming | Zoom options & scrolling |
| Network Filtering | Arc/node filter options |
| Network Tab Keys | Selection across node/arc levels |
| Arc/Node Operations | Find, Commands, Create/Edit |
| Network Data DM | Create/change arcs, nodes, connections |
| Network Data DM Summary | Data DM quick reference tables |
| Create Arc/Node Dialog | Data DM create dialog |

See also

| | |
|---|---|
| Visualization Facilities | Features common to all view styles |

+#$K Arcs, Nodes, and the Network Layout

The Network consists of a web of arcs and nodes. Nodes represent one class of data items, and arcs represent the relationships between the nodes.

Example: A Network View might represent an airline flight route, with cities displayed as nodes and flights between the cities as arcs.

Arc and Node graphic objects

Both arcs and nodes have graphic object (GrOb) representations in Network View. A node is represented simply as a label. Arcs have both a label and two connecting line segments. One line segment represents the arc's predecessor (its "from" relationship) and the other segment represents its successor (its "to" relationship).

Example: In an airline flight mute Network View, arcs representing airline flights connect city nodes. Each flight arc has a predecessor (a From City) and a successor (a To City).

Arcs and nodes usually have distinct appearances so that you can tell them apart. One common convention is to draw node GrObs as rectangles and arc GrObs as circles or ellipses.

Interpreting a network diagram

Because of the non-hierarchical nature of networks, it takes a bit of practice to interpret them visually. It is often helpful to think of the network as a series of node rows, with rows of arcs connecting them. (For purposes of this discussion, assume a top/down orientation of the network.) A row of arcs represents a group of relationships from nodes in the previous row to nodes in the next row.

Example: A row of flight arcs can connect rows of departure and arrival cities.

One node pair can be connected by multiple arcs in the intervening arc row.

Example: There can be several flights between two cities.

On the whole, relationship arcs "flow" from the top of the display down towards the bottom.

Sometimes an arc cannot be drawn consistent with this top/down flow. Such "counter flowing arcs" are marked with a black dot on their "upstream" connection segment to indicate that the normal relationship flow is reversed. The upstream segment, normally its predecessor, connects to its successor instead. The downstream segment, normally its successor, connects instead to its predecessor.

Counter flowing arcs indicate that there is a cycle in the network.

Example: If airline flight #1 goes from Dallas to Chicago, and flight #2 goes from Chicago to Dallas, there is a cycle between Dallas and Chicago. One of the flight arcs must be drawn as a counter flowing arc.

While the general pattern is to have rows of nodes with arc rows between them, Sometimes arc GrObs appear in the same row as node GrObs. Such "long arcs" occur when there is both a direct and an indirect relationship between two nodes.

Example: You might be able to fly from Dallas to Chicago directly on flight #101 (one long arc), or indirectly through St. Louis on flights #202 and #303 (two short arcs).

+network:1100 #Net__GrObs $Arcs, Nodes, and the Network Layout $^K$Network View; GrObs; Arcs; Nodes; Network layout;

The network layout algorithm

Network View uses a powerful, efficient layout algorithm designed to draw the network in as small an area as possible. The algorithm minimizes the number of arc and node levels: the number of arc crossings, the number of counter flowing arcs, and the number of long arms which need to be drawn. Even so, network refresh times are quite fast.

See also

| Network Orientations | Specify arc flow direction |
|---|---|
| Network Zooming | Zoom options & scrolling |
| Arc/Node Operations | Find, Commands, Create/Edit |
| Graphic Objects (GrObs) | Represent data items graphically |

+#$K Network Orientation Options

The Orientation cascade menu (View menu) lets you choose an orientation option for displaying the network. The network orientation controls whether arc relationships flow from the top down or left to right.

The top/down orientation draws arc flows vertically. By default an arc in top/down orientation is drawn with its predecessor node above it and its successor below. An arc which cannot be drawn following this ordering (a "counter flowing arc") is marked with a black dot on its upper connection segment. This marker indicates the normal relationship flow for the arc's two connection segments is reversed: the node above is its successor and the one below is its predecessor.

The network layout algorithm minimizes the number of counter flowing arcs that must be drawn. However, the topology of the network may require that some be drawn.

The left/right orientation draws arc flows horizontally. By default an arc in left/right orientation has its predecessor node to its left and its successor to its right. Counter flowing arcs are marked with a black dot on their left hand connection.

See also

| Network GrObs | Nodes, arcs, & network layout |
|---|---|

+network:1200 #Net__Display $Network Orientation Options $^K$Network View; Orientation;

+#$K Network View Zooming and Scrolling

You can use zooming in Network View to control the amount of the network in view and the appearance of horizontal and vertical scroll bars.

If the view is in Zoom Normal or Zoom 50% mode and the entire network structure does not fit in the visible window area, horizontal and vertical scroll bars may appear. You can use these scroll bars to adjust the visible portion of the network.

When the Fit all zoom setting is active, network components are automatically resized so that the network fits in the display area. Automatic resizing eliminates the need for scroll bars. In Fit all mode, any action that changes the network structure (such as filtering or changing network connections via Data DM) can cause the network size to change so that the modified structure fits in the display.

See also

| Network GrObs | Nodes, arcs, & network layout |
|---|---|
| Network Data DM | Create/change arcs, nodes, connections |
| Zooming | Control GrOb size & detail |
| Scrolling | Adjust visible portion of view |
| Filtering | Control the data subset displayed |

+network:1300 #Net__Scroll $Network View Zooming and Scrolling $^K$Network View; Zooming; Scrolling;

+#$K Network Filtering

As with other views, you can use filtering to control the subset of data items displayed in the network. However in Network View, special facilities exist for specifying separate arc and node filters, and for determining whether or not to display unconnected graphic objects ("orphans").

You select Network filtering options in the Network Filters dialog, invoked via the Filters menu item (View menu). The network display after filtering depends on your choices for Arc filter, Node filter, and whether showing orphan arcs or nodes is enabled.

Dialog options

Arc Filter drop-down list contains names of filters defined for the arc record type. Selecting an arc filter applies that filter to the set of arc data items. If Show Orphan Arcs is checked, the resulting filter set is displayed in its entirety. If showing orphan arcs is turned off, only fully connected arcs in the filter set are displayed.

To remove the arc filter, select the <Show All> entry from the top of the drop-down list.

Node Filter drop-down list contains names of filters defined for the node record type. Selecting a node filter applies that filter to the set of node data items. If Show Orphan Nodes is checked, the resulting filter set is displayed in its entirety. If showing orphan nodes is turned off, only nodes in the filter set with arcs attached are displayed.

To remove the node filter, select the <Show All> entry from the top of the drop-down list.

Show Orphan Arcs If Show Orphans Arcs is checked, orphans arcs in the filter set are included in the network display.

An orphan arc is one that is not fully connected; that is, it lacks either a predecessor node or a successor node, or both.

If showing orphan arcs is disabled, the orphans are excluded from the network even if they themselves pass the current filter. Hiding orphan arcs thus acts as an extra, implicit filter for Network View data items.

Show Orphan Nodes If Show Orphan Nodes is checked, orphan nodes in the filter set are included in the network display.

An orphan node is one with no arcs attached; that is, no arc has this node either as a predecessor or a successor.

If showing orphan nodes is disabled, the orphans are excluded from the network even if they themselves pass the current filter. Hiding orphan nodes thus acts as an extra, implicit filter for Network View data items.

OK exits the Network Filter dialog and applies the filter choices you have made to the view.

Close exits the Network Filter dialog without making any changes.

Orphan arcs and nodes

Often your data item set or subset contains orphan arcs or nodes that are not fully connected. The Show Orphan Arcs and Show Orphan Nodes check boxes control whether or not graphic objects for such data items are displayed in the network diagram.

+network:1400 #HTD_Net_Filter $Network Filtering $^K$Network View; Filtering; Implicit Filtering; Orphans; Showing orphans produces a more complete network display, but can clutter the display with isolated or partially connected GrObs. Turning off the Show Orphans options produces the cleanest network display, but can hide isolated or partially connected data items-which themselves pass the current filter.

Filtering considerations for creating arcs and nodes

The current choices for Network filtering can affect what you see after a create operation. If the new data item does not pass the current am or node filter, or if it qualifies as an orphan and showing orphans is disabled, the GrOb for the new data item will not be visible in the network after the create operation.

Tip To ensure that newly created data items appear in the view, it is a good idea to turn on Show Orphans when you are creating arcs and nodes, and to set the filters to Show All.

See also

| Network GrObs | Nodes, arcs, & network layout |
| Filtering | Control the data subset displayed |

+#$K Tab Key in Network View

You can use the Tab key to advance the selection to the next network node or arc on a level, proceeding from left to right (top/down orientation) or top to bottom (left/right orientation).

If the current selection is in a node level, Tab advances the selection to the next node (or long arc) in the level, then proceeds to the next node level. If the current selection is in an am level, Tab advances to the next arc in the level, then to the next arc level. Shift Tab acts in a similar fashion, but moves the selection to the previous arc or node in a level.

Recall that the arrangement of nodes or arcs in a level does not represent any sort order, since Network View does not support sorting.

See also

| Network Orientations | Specify arc flow direction |
| Network GrObs | Nodes, arcs, & network layout |

+network:1450 #Net_Tab $Tab Key in Network View $^K$Network View; Tab Keys;

+#$K Arc and Node Specific Operations

Unlike other views, Network View displays data items from two different classes. Arc and nodes in the network each represent a different record type.

Example: In a network diagram of airline flights between cities, nodes represent city data items, and the connecting arcs represent airline flight data items.

As a consequence the two different types of data, the execution of certain operations is slightly different in Network View. Examples of such operations include finding data items, executing a data-item-specific Command, creating or editing data items, and filtering the network (discussed elsewhere).

Find dialog in Network View

When you invoke the Find dialog in Network View (Edit menu) you must specify whether you want the search subset to apply to arc data items or to node data items. The Find dialog in Network view has an extra drop-down list titled Record, listing the names of the arc and node record types. When a data type is selected the contents of the search subset (in the Data Item drop-down list) is updated to reflect the choice, based on the current view filter and find filter selections. The search subset description at the top of the Find dialog is also updated when a new record type choice is made.

Arc and Node Commands

Since there are two different types of data items in Network View, there may also be two different sets of data-item-specific commands. Hence, the Commands menu in a Network View, if present, may contain separate cascade menus for Arc commands and Node commands. There can also be different default actions for arcs and nodes, marked on the Arc commands and Node commands cascade menus with a check mark.

Example: In a Network diagram of airline flights (arcs) between cities (nodes), a command to show a City's weather status on a weather map would apply only if a City node were selected. This command would appear in the Node commands cascade menu, but not on the Arc commands cascade menu. Similarly, a command to show a flight's gate location at its airline terminal would only apply to flight arcs.

Creating arcs and nodes

If the creation of arc and node data items is supposed in your application, Network View's Edit menu will contain two Create menu items, one for arcs and the other for nodes. Each of these menu items may bring up a GrAF Create Dialog, or an application-specific dialog.

The current choices for Network filtering can affect what you see after a create operation. If the new data item does not pass the current arc or node filter, or if it is an orphan and showing orphans is disabled, the GrOb for the new data item will not be visible in the network after the create operation.

Tip To ensure that newly created data items appear in the view, it is a good idea to turn on Show Orphans when you are creating arcs and nodes, and to set the filters to Show All.

Editing arcs and nodes

For applications using GrAF data item editor or display windows, even though there are two types of data in Network View, there is only one editor or display window belonging +network:1500 #Net_Data $Arc and Node Specific Operations $^K$Network View; Record Types; Find dialog; Commands menu; Create; Data Item Editor; to the view. The contents of the window will change, however, when an arc or a node is selected, since the underlying data is different.

Similarly, if application-specific edit dialogs are invoked by Edit or Delete operations, their appearance will probably differ depending on whether an arc or a node is being edited.

See also

| | |
|---|---|
| Network Filtering | Arc/node filter options |
| Network GrObs | Nodes, arcs, & network layout |
| Find | Locate data item GrObs |
| Commands | Special operations (Commands menu) |
| Data Item Operations | Create, Edit, Delete, etc. |
| Data Item Editor | Edit a data item |
| Data Item Display | Show a data item |

+#$K Network View Data Direct Manipulation

Network View offers a rich set of data item operations through data direct manipulation (Data DM). You can change an arc's predecessor or successor by clicking on a node or an arc and dragging out a new connection. Additionally, Network View may be set up to support creating both new nodes and new arcs via Data DM.

The result of a Data DM operation in Network View depend on where the operation starts (arc, node, empty space) and where it ends (am, node, empty space). Use the Network Data DM summary table for quick reference.

Note These default Data DM operations may or may not be enabled for your Network View(s). In addition, your application may define different meanings for Network Data DM operations.

Cursor cueing

The first step in Data DM is to select an arc or node graphic object, or to click and drag in empty space outside any graphic object. When the cursor moves over the center of a selected arc or node, or when you click and drag in empty space, cursor appearance changes to the Data DM up arrow cursor. This cursor cueing indicates that you can start a Data DM operation.

As you click and drag out new connections, the cursor's appearance changes, depending on the context. The crosshairs and plus sign cursors signal Data DM targets. If you let up the mouse button when the cursor is in one of these states a Data DM operation will be initiated. However, if the cursor appears as the Data DM up arrow, no Data DM takes place.

| Changing an arc's predecessor or successor | | |
|---|---|---|
| Start | Stop | Result |
| Arc | Node | Update Arc successor = Node |
| Node | Arc | Update Arc predecessor = Node |

To change an arc's successor, you connect the arc to a new successor node. First select the arc GrOb and move over its center to initiate Data DM up arrow cursor cueing. Click and drag out a new connection to the node you wish to be the new successor. Cursor cueing changes to the Data DM crosshairs cursor over the node. Releasing the mouse button changes the arc's successor to this node and the network is redrawn.

To change an arc's predecessor, you connect the new predecessor node to the arc. First select the node you want to be the new predecessor and move over its center to initiate Data DM up arrow cursor cueing. Click and drag out a new connection to the arc you wish to update. Cursor cueing changes to the Data DM crosshairs cursor over the arc. Releasing the mouse button changes the arc's predecessor to this node and the network is redrawn.

Arc and Node creation

Network view offers a number of Data DM mechanisms for creating new arcs and nodes. When you initiate a Data DM create for an arc or node, a special Create Network Arc/Node dialog appears prompting you for information needed to create the new arc or node. This dialog appears each time you create an arc or node unless you choose the Automatic Name option by pressing the dialog's Automatic Name button. If you have +network:1600 #Net_DataDM $Network View Data DM KNetwork View; Data DM; Create Arc; Create Node; chosen to have names automatically generated, the Create Network Arc/Node dialog does not appear subsequently when a new arc or node is created (until the view is closed and re-opened).

Filtering considerations for arc and node creation

The current choices for Network filtering can affect what you see after a create operation. If the new data item does not pass the current arc or node filter, or if it is an orphan and showing orphans is disabled, the GrOb for the new data item will not be visible in the network after the create operation.

Tip To ensure that newly created data items appear in the view, it is a good idea to turn on Show Orphans when you are creating arcs and nodes, and to set the filters to Show All.

| Creating new arcs | | |
|---|---|---|
| Start | Stop | Result |
| Node 1 | Node 2 | Create Arc with predecessor = Node 1 successor = Node 2 |
| Node | Space | Create Arc with predecessor = Node successor = null |
| Space | Node | Create Arc with successor = Node predecessor = null |

To create a new arc between two existing nodes, you connect the two nodes. First select the node you want to be the new arc's predecessor and move over its center to initiate Data DM up arrow cursor cueing. Click and drag out a new connection to the node you want to be the new arc's successor. Cursor cueing changes to the Data DM crosshairs cursor over the node. Releasing the mouse button brings up the Create Network Arc dialog prompting you for a name for the new arc. Once you confirm in this dialog the new arc is created and the network is redrawn.

Note If you have selected to have names automatically generated in the Create Network Arc dialog, that dialog does not appear when a new arc is created.

You can also create a new arc with a particular node as predecessor, but with no successor. Start on the node you want as predecessor and drag out to empty space. Cursor cueing changes to the Data DM plus sign cursor over empty space. Releasing the mouse button initiates the create.

Similarly, you can create a new arc with a particular node as successor, but with no predecessor. Start the Data DM in empty space by clicking and dragging the mouse outside of any graphic object. Drag a connection to the node you want as the new arc's successor. Cursor cueing changes to the Data DM crosshairs cursor over the node. Releasing the mouse button initiates the create.

| Creating new nodes | | |
|---|---|---|
| Start | Stop | Result |
| Arc 1 | Arc 2 | Create Node and update Arc 1 successor = Node Arc 2 predecessor = Node |
| Arc | Space | Create Node and update Arc successor = Node |
| Space | Arc | Create Node and update Arc predecessor = Node |

To create a new node between two existing arcs, you connect the two arcs. First select the arc whose Successor you want to update and move over its center to initiate Data DM up arrow cursor cueing. Click and drag out a new connection to the arc whose predecessor you want to update. Cursor cueing changes to the Data DM crosshairs cursor over the arc. Releasing the mouse button brings up the Create Network Arc dialog prompting you for a name for the new node. Once you confirm in this dialog the new node is created. In addition, the first arc's successor and the second arc's predecessor are updated to point to the new node, and the network is redrawn.

Note If you have selected to have names automatically generated in the Create Network Node dialog, that dialog does not appear when a new node is created.

You can also create a new node as the successor of an existing arc. Start on the arc whose successor you want to update and drag out to empty space. Cursor cueing changes to the Data DM plus sign cursor over empty space. Releasing the mouse button initiates the create.

Similarly, you can create a new node as the predecessor of an existing arc. Start the Data DM in empty space by clicking and dragging the mouse outside of any graphic object. Drag a connection to the arc whose predecessor you want to update. Cursor cueing changes to the Data DM crosshairs cursor over the arc. Releasing the mouse button initiates the create.

Undoing a Data DM create operation

When the Undo menu item is used following a Data DM create operation, delete processing is initiated on the created arc or node. This usually brings up a dialog requesting confirmation for the delete.

Note That the Undo menu item does not undo a create performed via the Create Arc or Create Node menu Items (Edit menu).

See also

| | |
|---|---|
| Network Data DM Summary | Data DM quick reference tables |
| Create Arc/Node Dialog | Data DM create dialog |
| Network Filtering | Arc/Node filter options |
| Network GrObs | Nodes, arcs, & network layout |
| Data DM | Modify data via click-and-drag direct manipulation |
| Undo | Undo previous Data DM change |
| Selection | Marking an item active for operation |

+#$K Network View Data DM Summary

The tables below summarize the default Data DM operations available in Network View. Start indicates where the Data DM up arrow cursor appears, Stop indicates where the mouse button is released after dragging, and Result describes the Create/Update operations that result.

Note These default Data DM operations may or may not be enabled for your Network View(s). In addition, your application may define different meanings for Network Data DM operations.

| Changing an arc's predecessor/successor | | |
|---|---|---|
| Start | Stop | Result |
| Arc | Node | Update Arc successor = Node |
| Node | Arc | Update Arc predecessor = Node |

| Creating a new arc | | |
|---|---|---|
| Start | Stop | Result |
| Node 1 | Node 2 | Create Arc with predecessor = Node 1 successor = Node 2 |
| Node | Space | Create Arc with predecessor = Node successor = null |
| Space | Node | Create Arc with successor = Node predecessor = null |

| Creating a new node | | |
|---|---|---|
| Start | Stop | Result |
| Arc 1 | Arc 2 | Create Node and update Arc 1 successor = Node Arc 2 predecessor = Node |
| Arc | Space | Create Node and update Arc successor = Node |
| Space | Arc | Create Node and update Arc predecessor = Node |

See also

| | |
|---|---|
| Network Data DM | Create/change arcs, nodes, connections |
| Create Arc/Node Dialog | Data DM create dialog |
| Data DM | Modify data via click-and-drag direct manipulation |

+network:1700 #Net_DMTable $Network View Data DM Summary
KNetwork View; Data DM; Create Arc; Create Node;
+#$K Create Network Arc/Node Dialog In Network View, when you use data direct manipulation (Data DM) to create a new node or arc, a special Create Network Arc/Node dialog appears. This dialog is used to name the new data item, and optionally to request that names be generated automatically on future creates.

The Create Network Arc/Node dialog appears each time you create an arc or node through DataDM unless you enable the Automatic Names option via the dialog's Automatic Name button.

Dialog options

Name typein field lets you enter a name (a unique record key value) for the new data item. This name must be unique among data items of this record type.

Current names lists the existing data item names, to help you choose a name that is unique.

Note Selecting an item in the Current names list has no effect, since it is only for reference.

OK dismisses the dialog and creates the data item.

Cancel dismisses the dialog and no create operation takes place.

Automatic Name enables the Automatic Names option, and dismisses the dialog, completing the current create operation.

When the Automatic Name option is enabled (on arcs, for example), the Create Network Arc/Node dialog does not appear when a new arc is created via Data DM. Instead, the arc is immediately created with a system-generated name when the mouse button is released.

Closing the view disables the Automatic Names option.

> Example: Suppose you have enabled the Automatic Names options for new nodes. If you close and re-open a Network View, the option is disabled, and the Create Network Arc/Node dialog appears again on subsequent Data DM create operations. See also

| | |
|---|---|
| Network Data DM | Create/change arcs, nodes, connections |
| Network Data DM Summary | Data DM quick reference tables |
| Network GrObs | Nodes, arcs, and the network layout algorithm |
| Data DM | Modify data via click-and-drag direct manipulation |

+network:1800 #HTD_Net_DMCreate $Create Network Arc/Node Dialog ᴷNetwork View; Data DM; Create Arc; Create Node;

What is claimed is:

1. A method of using a computer to display a graph illustrating data and to permit a user to edit the data by directly manipulating the graph, comprising the steps of:
   storing a graphics engine, comprised of a set of rules for displaying graphical objects and graphical attributes;
   storing a local database comprised of user-specified records and fields of data, accessible by said graphics engine;
   receiving data specifying at least one record type of records in said local database and at least one field of said records, which are to be illustrated with said graph;
   matching each data value of said record type with a graphical object;
   matching each data value of said field with a graphical attribute of said graphical object;
   displaying a graph comprised of each of said graphical objects and said graphical objects corresponding graphical attributes;
   receiving data representing a user's selection of a data value to be changed;
   receiving editing input from said user representing a changed data value;
   changing the appearance of the graphical object that illustrates the changed data value; and
   updating said local database in accordance with said change.

2. The method of claim 1, wherein said step of storing a graphics engine is repeated for a plurality of graphics engines, each for generating a different view style, and further comprising the step of receiving a view style selection from said user.

3. The method of claim 1, wherein said step of storing a local database is in response to a step of generating a data exchange message to an external database system and retrieving said data from said database system.

4. The method of claim 1, wherein said step of receiving editing input is performed by receiving textual input from said user representing the changed data value.

5. The method of claim 1, wherein said step of receiving editing input is performed by receiving input in response to said user's manipulation of the appearance of said graphical object.

6. The method of claim 5, wherein said step of receiving editing input is in response to the user's operation of a pointing means to perform said manipulation.

7. The method of claim 6, wherein the operation of said pointing means results in re-positioning all or part of said graphical object.

8. The method of claim 1, wherein said graphical object has multiple attributes, and further comprising the step of receiving a user's specifications of associations between at least one of said graphical attributes and values of said fields.

9. A method of using a computer, having a windows operating system, to concurrently execute a database system and a graphical interface, such that said graphical interface displays a graph of data from the database system and permits a user to change data by manipulating the graph, comprising the steps of:
   storing a graphics engine, comprised of a set of rules for displaying graphical objects and graphical attributes;
   creating an active window of said computer for performing each of the subsequent steps;
   retrieving data from said database system;
   storing said data in a local database, in the form of records and fields, accessible by said graphics engine;
   receiving data from a user specifying a record type in said local database and at least one field of said record type;
   matching each data value of said record type with a graphical object;
   matching each data value of said field with a graphical attribute of said graphical object;
   displaying a graph comprised of said graphical objects and said graphical objects corresponding graphical attributes;
   receiving data representing a user's selection of a data value to be changed;
   receiving editing input in response to said user's manipulation of graphical appearance of a graphical object or graphical attribute, representing a change to one of said data values;
   updating said local database in accordance with the changed data value; and
   generating a message to said database system, such that said database system will be updated in accordance with the changed data value.

10. The method of claim 9, further comprising the step of receiving data from a user specifying commands to be delivered to and executed by said database system.

11. The method of claim 9, further comprising the step of receiving data from a user specifying a record type and a path to said record type in said database system, such that said step of generating a message to said database system automatically occurs whenever a value of said record type is changed.

12. The method of claim 9, further comprising the step of receiving editing input by receiving textual input from said user representing the changed data value.

13. A method of using a computer to display a graph illustrating data and to permit a user to edit the data by directly manipulating the graph, comprising the steps of:

storing a graphics engine, comprised of a set of rules for displaying graphical objects and graphical attributes;

storing a local database comprised of user-specified records and fields of data, accessible by said graphics engine;

receiving data specifying at least one record type of records in said local database and at least one field of said records, which are to be illustrated with said graph;

matching each data value of said record type with a graphical object;

matching each data value of said field with a graphical attribute of said graphical object;

displaying a graph comprised of each of said graphical objects and said graphical object corresponding graphical attributes;

receiving data representing a user's selection of a data value to be changed;

receiving editing input from said user, representing said user's manipulation of a graphical object or graphical attribute;

changing the appearance of the graphical object that illustrates the changed data value; and updating said local database in accordance with said change.

14. The method of claim 13, wherein said graphical objects are bars of a gantt chart, and said step of receiving editing input is in response to said user's re-positioning of a beginning or end position of one of said bars.

15. The method of claim 13, wherein said graphical objects are bars of a bar chart, and said step of receiving editing input is in response to said user's lengthening or shortening one of said bars.

16. The method of claim 13, wherein said graphical objects are columns of a table, and said step of receiving editing input is in response to said user's manipulation of the color of one of said columns.

17. The method of claim 13, wherein said graphical objects are labels of an image, and said step of receiving editing input is in response to said user's repositioning one of said labels.

18. The method of claim 13, wherein said graphical objects are nodes of a tree view, and said step of receiving editing input is in response to said user's change to one of said nodes.

19. The method of claim 13, wherein said graphical objects are nodes of a network view, and said step of receiving editing input is in response to said user's change to one of said nodes.

20. The method of claim 13, wherein said graphical attribute is the color of said graphical object and wherein said step of receiving editing input is in response to said user's change to the color of said object.

* * * * *